(12) United States Patent  
Wang et al.

(10) Patent No.: US 12,374,307 B2  
(45) Date of Patent: Jul. 29, 2025

(54) DISPLAY APPARATUS AND METHOD FOR DISPLAY APPARATUS

(71) Applicant: HISENSE VISUAL TECHNOLOGY CO., LTD., Shandong (CN)

(72) Inventors: Hao Wang, Shandong (CN); Pingguang Lu, Shandong (CN); Yinghao He, Shandong (CN); Jie Li, Shandong (CN); Yuxin Zhang, Shandong (CN); Zhenhua Pang, Shandong (CN); Yuanyang Wang, Shandong (CN); Ruiji Zhang, Shandong (CN); Tingfu Xie, Shandong (CN); Fang Liu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 250 days.

(21) Appl. No.: 18/323,073

(22) Filed: May 24, 2023

(65) Prior Publication Data

US 2023/0298539 A1 Sep. 21, 2023

Related U.S. Application Data

(63) Continuation of application No. PCT/CN2022/073400, filed on Jan. 24, 2022.

(30) Foreign Application Priority Data

Jan. 14, 2021 (CN) .......................... 202110046140.2  
Jun. 10, 2021 (CN) .......................... 202110649246.1  
(Continued)

(51) Int. Cl.  
*G09G 5/00* (2006.01)

(52) U.S. Cl.  
CPC ..... *G09G 5/006* (2013.01); *G09G 2320/0626* (2013.01); *G09G 2340/0435* (2013.01)

(58) Field of Classification Search  
CPC .......... G09G 5/006; G09G 2320/0626; G09G 2340/0435  
See application file for complete search history.

(56) References Cited

U.S. PATENT DOCUMENTS

2008/0051642 A1 2/2008 Krupnik  
2008/0055318 A1 3/2008 Glen  
(Continued)

FOREIGN PATENT DOCUMENTS

CN 101506868 A 8/2009  
CN 107948709 A 4/2018  
(Continued)

OTHER PUBLICATIONS

International Search Report, mailed Apr. 20, 2022, from PCT/CN2022/073400.  
(Continued)

*Primary Examiner* — Xin Sheng  
(74) *Attorney, Agent, or Firm* — Workman Nydegger

(57) ABSTRACT

Disclosed are a display apparatus and a method for the display apparatus. The method includes: obtaining device information of an external device in connection with the display apparatus; parsing a variable frame rate mode supported by the external device from the device information by traversing a flag bit field in the device information; controlling the display to present an interactive menu, and receiving an interactive operation from a user through the interactive menu, wherein the interactive menu includes at least one option of variable frame rate modes; setting a display  
(Continued)

parameter of the display apparatus according to a first variable frame rate mode indicated by the interaction operation.

18 Claims, 27 Drawing Sheets

(30) Foreign Application Priority Data

Jun. 21, 2021 (CN) .......................... 202110683794.6
Sep. 27, 2021 (CN) .......................... 202111135697.X

(56) References Cited

U.S. PATENT DOCUMENTS

2019/0244579 A1* 8/2019 Oh ..................... G09G 3/3291
2020/0226087 A1 7/2020 Sun
2022/0208145 A1* 6/2022 Glen .................... G06F 3/1446

FOREIGN PATENT DOCUMENTS

| CN | 108063978 | A |   | 5/2018  |            |
|----|-----------|---|---|---------|------------|
| CN | 109901901 | A |   | 6/2019  |            |
| CN | 110062186 | A | * | 7/2019  | H04N 21/4122 |
| CN | 111629259 | A |   | 9/2020  |            |
| CN | 112040305 | A |   | 12/2020 |            |
| JP | 2007251543| A |   | 9/2007  |            |

OTHER PUBLICATIONS

Chinese Office Action, mailed Aug. 2, 2022, from Chinese App. No. 202110649246.1.

* cited by examiner

DISPLAY APPARATUS AND METHOD FOR DISPLAY APPARATUS

This application is a continuation application of International Application No. PCT/CN2022/073400, filed on Jan. 24, 2022, which claims the priorities from Chinese Patent Application No. 202110046140.2 filed on Jan. 14, 2021; Chinese Patent Application No. 202110649246.1 filed on Jun. 10, 2021; Chinese Patent Application No. 202110683794.6 filed on Jun. 21, 2021, and Chinese Patent Application No. 202111135697.X filed on Sep. 27, 2021, which are hereby incorporated by reference in their entireties.

FIELD OF INVENTION

The disclosure relates to the display apparatus technology, and in particular, to a display apparatus and a method for the display apparatus.

BACKGROUND

The smart TV may be connected with a game device through an HDMI interface. When a user is using the game device, the game device outputs video data and audio data by running a game-related application. The video data and audio data can be sent to the smart TV according to HDMI protocol and output to a screen and speaker of the smart TV to play video and audio from the game device. When multiple external devices are connected with the smart TV, the user can switch a signal source to the audio and video data of the smart TV.

SUMMARY

Some embodiments of the disclosure provide a display apparatus and a method for the display apparatus.

The display apparatus is included. The method includes: a display, configured for presenting one or more images from a broadcast system or network and/or one or more user interfaces; an external device interface, configured to connect with an external device; a memory, configured to store instructions and data associated with the display; and a processor, in connection with the display, the external device interface and the memory, and configured for executing the instructions to cause the display apparatus to perform: obtaining device information of an external device in connection with the display apparatus; parsing a variable frame rate mode supported by the external device from the device information by traversing a flag bit field in the device information; controlling the display to present an interactive menu, and receiving an interactive operation from a user through the interactive menu, wherein the interactive menu includes at least one option of variable frame rate modes; setting a display parameter of the display apparatus according to a first variable frame rate mode indicated by the interaction operation; reading the first variable frame rate mode indicated by the interaction operation; in response to the first variable frame rate mode being VRR standard mode, switching a signal lock mechanism and a decoding mode to adapt to a short-period video signal; and in response to the first variable frame rate mode being free sync mode, obtaining a real-time frame rate value and presenting a video signal according to the real-time frame rate value.

In some embodiments, the processor is further configured for executing the instructions to cause the display apparatus to perform: traversing a quantity of variable frame rate modes supported by the external device; in response to the quantity of variable frame rate modes being greater than or equal to 1, adding options of the variable frame rate modes supported by the external device on the interactive menu; and in response to the quantity of variable frame rate modes being equal to 0, adding a prompt text on the interactive menu.

In some embodiments, the device information includes a first package data and a second package data, and the processor is further configured for executing the instructions to cause the display apparatus to perform: under condition that the quantity of variable frame rate modes is equal to 1, obtaining a traversal result of the traversing the flag bit field in the device information; in response to a flag bit of the first package data containing a feature field for describing the VRR standard mode, adding VRR standard option on the interactive menu; and in response to a flag bit of the second package data containing a feature field for describing the free sync mode, adding free sync option on the interaction menu.

In some embodiments, the processor is further configured for executing the instructions to cause the display apparatus to perform: in response to the first variable frame rate mode being VRR standard mode, turning off a high-delay picture quality processing function in the display apparatus; and in response to the first variable frame rate mode being free sync mode, turning off a frame buffer mechanism of a video picture, to reduce sending and receiving delays of a video signal.

In some embodiments, the processor is further configured for executing the instructions to cause the display apparatus to perform: in response to the first variable frame rate mode being free sync mode, turning off a dynamic backlight function; and adjusting a backlight brightness of the display to a highest state to improve performance effect of high dynamic range imaging (HDR) on the display apparatus.

In some embodiments, the processor is further configured for executing the instructions to cause the display apparatus to perform: detecting a switch state of a variable frame rate included in the interactive menu; in response to the switch state being on state, receiving the interactive operation from the user through the interactive menu; and in response to the switch state being off state, controlling the display to present the interaction menu to receive an action for turning on the switch state of the variable frame rate.

In some embodiments, the processor is further configured for executing the instructions to cause the display apparatus to perform: sending identification data to the external device, wherein the identification data includes a field for describing one or more variable frame rate modes supported by the display apparatus; receiving a response data packet for the identification data from the external device to obtain a current variable frame rate mode of the external device; and setting a display parameter of the display apparatus according to the current variable frame rate mode of the external device.

In some embodiments, the processor is further configured for executing the instructions to cause the display apparatus to perform: obtaining a variable frame rate mode supported by the display apparatus when the external device establishes a connection with the display apparatus for the first time; in response to the display apparatus supporting the VRR standard mode, configuring a field for describing the VRR standard mode in a first flag bit of the identification data; and in response to the display apparatus supporting the free sync mode, configuring a field for describing the free sync mode in a second flag bit of the identification data.

In some embodiments, the processor is further configured for executing the instructions to cause the display apparatus to perform: in response to detecting that a running state of the external device meets a key time point, adjusting the display parameter in time to adapt to a changed variable frame rate mode, wherein the key time point includes at least one of: a time point when the external device establishes connection with the display apparatus for the first time, a time point when a content from a media resource of the external device is changed, or a time point when the external device changes the variable frame rate mode.

A method for the display apparatus is provided, and the method includes: obtaining device information of an external device in connection with a display apparatus; parsing a variable frame rate mode supported by the external device from the device information by traversing a flag bit field in the device information; controlling a display of the display apparatus to present an interactive menu, and receiving an interactive operation from a user through the interactive menu, wherein the interactive menu includes at least one option of variable frame rate modes; setting a display parameter of the display apparatus according to a first variable frame rate mode indicated by the interaction operation; reading the first variable frame rate mode indicated by the interaction operation; in response to the first variable frame rate mode being VRR standard mode, switching a signal lock mechanism and a decoding mode to adapt to a short-period video signal; and in response to the first variable frame rate mode being free sync mode, obtaining a real-time frame rate value and presenting a video signal according to the real-time frame rate value.

DETAILED DESCRIPTION OF THE EMBODIMENTS

In order to make the purposes, embodiments and advantages of the disclosure clearer, the exemplary embodiments of the disclosure will be described clearly and completely below in combination with the accompanying drawings in the exemplary embodiments of the disclosure. Obviously, the described exemplary embodiments are a part of the embodiments of the disclosure but not all the embodiments.

Figure 1:
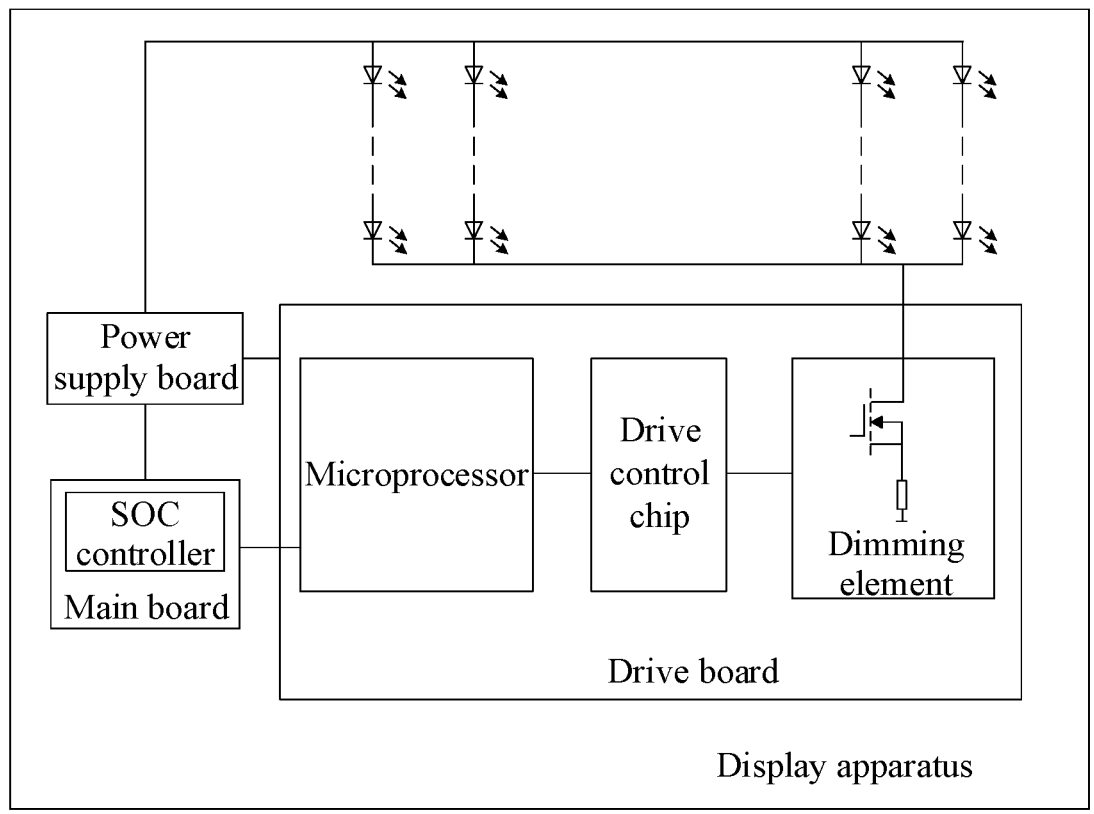
FIG. 1 is a schematic structural diagram of a display apparatus according to one or more embodiments of the disclosure.

FIG. 1 is a schematic structural diagram of a display apparatus according to some embodiments of the disclosure. As shown in FIG. 1, the display apparatus includes a display panel, a light emitting element, a main board, a power supply board, a microprocessor, a drive control chip, and a dimming element, where the dimming element is provided with a switch transistor and a sampling resistor. Here, the microprocessor, the switch transistor and the drive control chip can be arranged on a driver board inside the TV. The power supply board is used to supply power to the main board, the light emitting element, and the microprocessor and the drive control chip on the driver board. In some embodiments, a System on Chip (SOC), also called processor, is also arranged on the main board, and is used to receive image signals from an external server or optical fiber, and generate a brightness signal by processing the image signals through the SOC on the main board. Then the main board will obtain a field frequency signal and brightness signal and send them to the microprocessor on the driver board, where the field frequency signal is the screen refresh rate, and is used to represent the number of times the display screen refreshes images per second. In some embodiments, the power supply board and the main board in the display apparatus are combined into one. The microprocessor receives and then parses the field frequency signal and the brightness signal, and sends the parsed signals to the driver chip, so that the driver chip outputs a drive signal to the switch transistor connected in series with the light emitting element according to the above parsed signals. The light emitting element emits light by controlling the switch transistor.

Figure 2:
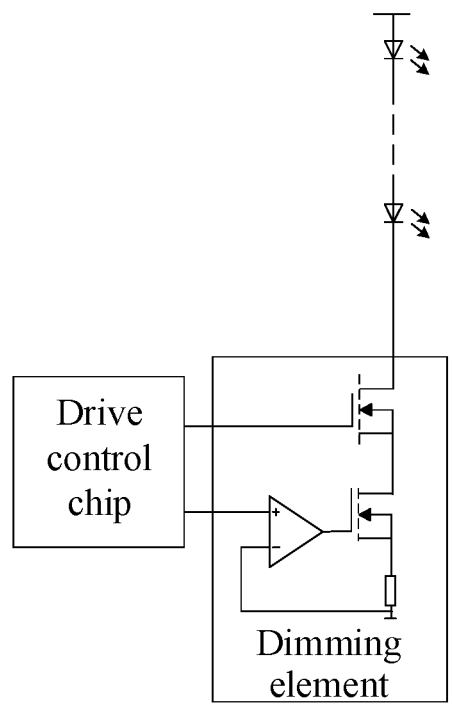
FIG. 2 is a schematic structural diagram of a dimming element according to one or more embodiments of the disclosure.

The backlight driving mode in the display apparatus is usually a Pulse Width Modulation (PWM) dimming mode, such as a Local Dimming (LD) display apparatus. In the PWM dimming mode, the drive control chip controls the brightness of the light emitting element by controlling the on and off time of the light emitting element. FIG. 2 is a schematic structural diagram of a dimming device according to some embodiments of the disclosure. As shown in FIG. 2, the display apparatus has a drive control chip, a positive terminal of the light emitting element is connected with a power input, a negative terminal of the light emitting element is connected in series with two switch transistors, and the second switch transistor is grounded through a sampling resistor. A drain of the first switch transistor is connected with a first output terminal of the drive control chip. Moreover, a second output terminal of the drive control chip is connected with a first port of a comparator. A second port of the comparator is connected with one terminal of the sampling resistor, and an output terminal of the comparator is connected with a drain of the second switch transistor. Here, the first switch transistor is used to receive a duty ratio signal of the drive control signal, and then adjust the duty ratio of the current flowing through the light emitting element. The first port of the comparator is used to receive an amplitude signal from the drive control chip, and the second port of the comparator is used to collect an amplitude of the current flowing through the light emitting element. The second switch transistor is controlled by comparing two amplitudes, so that the amplitude of the current flowing through the light emitting element meets the requirement of the current amplitude from the drive control chip. When the driving mode of the backlight is PWM dimming, the first switch transistor is always turned on and off periodically during the light emitting process of the light emitting diode.

When the display apparatus is in the variable refresh rate mode and adopts the PWM dimming mode, since the field frequency signal is always in the changing state, the light emitting diode is always in the switching mode of on or off when emitting light in the PWM dimming mode. When the flickering frequency of the light emitting element is inconsistent with the refresh rate, the phenomenon of water ripples appears in the picture displayed. In some embodiments, the backlight driving mode that introduces analog dimming is used to solve the above-mentioned problem. That is, two dimming modes are set in the display apparatus, namely, PWM dimming mode and analog dimming mode. When the display apparatus is in the variable refresh rate mode, the traditional PWM dimming mode is converted into the analog dimming mode. In the analog dimming process, when the display apparatus displays a picture, the duty ratio is 1, and the drive control chip changes the brightness of the final display picture by controlling the magnitude of the current flowing through the light emitting element. During the analog dimming process, the first switch transistor in FIG. 2 is always in the conduction state, while the second switch transistor is still used to adjust the amplitude of the signal flowing through the light emitting diode. In this case, since the light emitting diode is always in the light emitting state, there will be no problem that the field frequency signal is out of sync with the light emitting frequency of the light emitting element even if the field frequency signal of the display apparatus changes, so that the final displayed picture will not have poor picture quality due to the constant change of the field frequency signal. However, when two dimming modes in the display apparatus are switched, due to the sudden change of the current flowing through the light emitting element in the display apparatus, it may cause the excessive loss and high temperature rise of the switch transistor connected with the light emitting element, thereby causing the problem that the switch transistor is damaged and the light emitting element cannot emit light.

In some embodiments, when the dimming mode is changed from the PWM dimming mode to the analog dimming mode, the amplitude of the current flowing through the light emitting element will suddenly decrease. Since the power supply has a certain response time, the output voltage of the power supply will not change immediately when the current in the loop suddenly changes, while the voltage applied to both ends of the light emitting element also suddenly drops because the current becomes smaller, so that the voltage value across both ends of the switch transistor connected in series with the light emitting element becomes larger, the loss on the switch transistor increases and the temperature rise increases. During the above-mentioned switching process of the dimming mode, it may cause damage to the switch transistor. During the subsequent backlight driving process, the light emitting element will not be able to emit light due to the failure of the switch transistor, thereby causing the display apparatus to fail to work normally.

Figure 3:
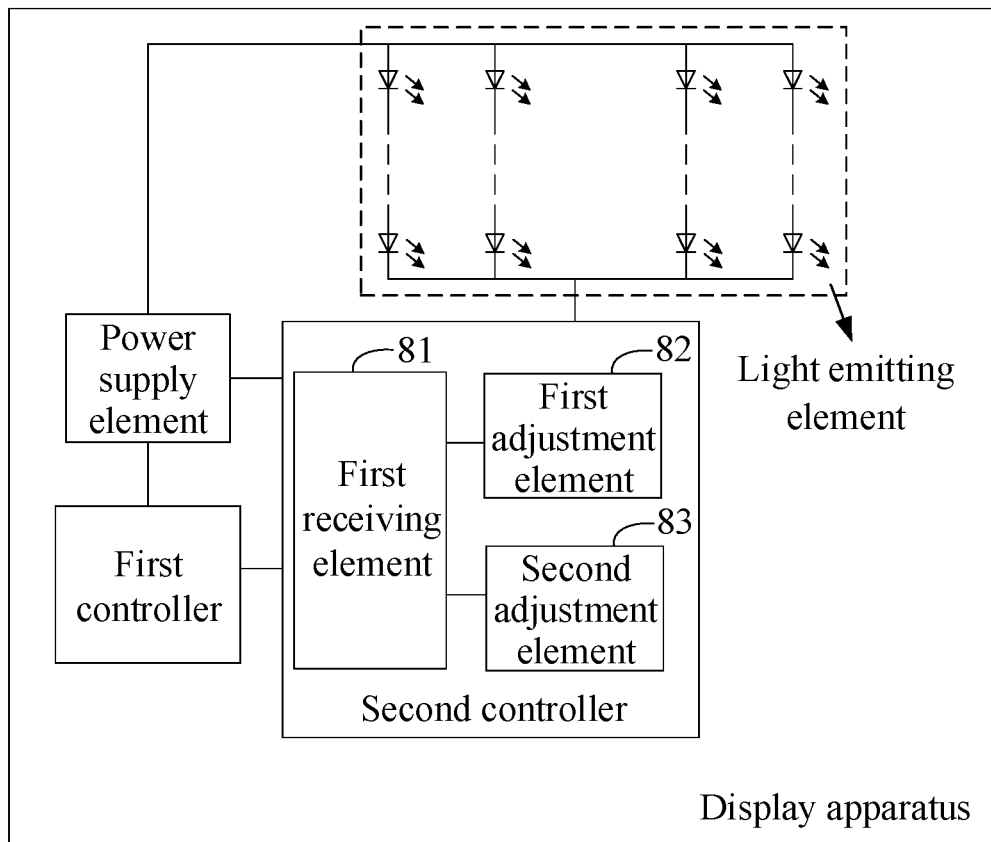
FIG. 3 is a schematic structural diagram of a display apparatus according to one or more embodiments of the disclosure.

The display apparatus according to some embodiments of the disclosure aims to solve the above issues. Specifically, FIG. 3 is a schematic structural diagram of a display apparatus according to one or more embodiments of the disclosure. As shown in FIG. 3, the display apparatus includes: a power supply element, a first controller, a second controller, and a light emitting element. The power supply element is respectively connected with the first controller, the second controller and the light emitting element. The power supply element is configured to provide power supply signals to the first controller, the second controller and the light emitting element. One end of the light emitting element is connected with the power supply element, and the other end of the light emitting element is connected with the second controller. The first controller is connected with the second controller. A drive control chip in the second controller includes: a first receiving element 81, a first adjustment element 82 and a second adjustment element 83. The first receiving element 81 is configured to receive a switching command from the first controller, where the switching command is used to instruct to switch the dimming mode of the backlight drive. In some embodiments, the display apparatus has a variable refresh rate function, that is, the display apparatus has two work modes: one is an ordinary fixed refresh rate mode, and the other is a variable refresh rate mode. In the ordinary fixed refresh rate mode, the PWM dimming mode is selected as the backlight driving mode. In the variable refresh rate mode, the analog dimming mode is selected. When the first receiving element 81 receives the switching command from the first controller, the second controller in the display apparatus may be instructed to switch the dimming mode.

In some embodiments, the above switching command may be generated through selecting a related operation on the display interface of the display apparatus from a user. The first adjustment element 82 is configured to, if the switching command is a first switching command, adjust an amplitude of the current flowing through the light emitting element to a preset first target current amplitude according to a predetermined first stepsize, and adjust a duty ratio of the current flowing through the light emitting element to 1; where the first switching command is used to instruct to switch from the PWM dimming mode to the analog dimming mode. Exemplarily, when the backlight driving mode is converted from the PWM dimming mode to the analog dimming mode, in order to avoid the sudden change of the current flowing through the light emitting element and the problem of too large loss of the switch transistor due to the response latency of the power supply, the amplitude of the current can be adjusted according to the preset first stepsize when adjusting the current flowing through the light emitting element, so that the current amplitude is finally reduced to the first target current amplitude, and the duty ratio of the current flowing through the light emitting element is adjusted to 1.

In some embodiments, a current amplitude is adjusted by a step-down method according to a preset first stepsize.

When the current amplitude is adjusted by the step-down method according to the first stepsize, the first stepsize during each drop may be inconsistent. In some embodiments, when adjusting the current amplitude, the current amplitude may also drop according to a certain slope. When adjusting the current, the amplitude and the duty ratio of the current can be adjusted separately, for example, the amplitude is firstly adjusted to a specified first amplitude, and then the duty ratio is adjusted to 1. When adjusting the current, the amplitude and the duty ratio of the current can be adjusted simultaneously, that is, the duty ratio of the current is changed while the amplitude is adjusted according to the first stepsize. In some embodiments, the first switching command is sent from the first controller when detecting that the frame rate of the image to be displayed is different from the frequency of the current field frequency signal and the current dimming mode is the PWM dimming mode.

The second adjustment element 83 is configured to, if the switching command is a second switching command, adjust the amplitude of the current flowing through the light emitting element to a preset second target current amplitude according to a predetermined second stepsize; and adjust the duty ratio of the current flowing through the light emitting element to a predetermined target duty ratio; where the second switching command is used to instruct to switch from the analog dimming mode to the PWM dimming mode; and where the second target current amplitude is greater than the first target current amplitude. Exemplarily, when the backlight driving mode is converted from the analog dimming mode to the PWM dimming mode, the amplitude of the current flowing through the light emitting element can be increased to the preset second target current amplitude according to the predetermined second stepsize, and the duty ratio of the current is adjusted to the predetermined duty ratio.

In some embodiments, the predetermined second stepsize may be the same as or different from the predetermined first stepsize in the first adjustment element 82. When the current amplitude is adjusted by the step-up method according to the second stepsize, the second stepsize during each rise may be inconsistent. In some embodiments, when adjusting the current amplitude, the current amplitude may also rise according to a certain slope. When adjusting the current, the amplitude and the duty ratio of the current can be adjusted separately, for example, the duty ratio is firstly adjusted to the target duty ratio, and then the amplitude of the current is adjusted according to the second stepsize. In some embodiments, when adjusting the current, the amplitude and the duty ratio of the current can be adjusted simultaneously, that is, the duty ratio of the current is changed while the amplitude is adjusted according to the second stepsize.

In some embodiments, the second switching command is sent from the first controller when detecting that the frame rate of the image to be displayed is the same as the frequency of the current field frequency signal and the current dimming mode is the analog dimming mode.

In some embodiments, the second controller includes a microprocessor, a drive control chip, and a dimming element. In combination with the architecture shown in FIG. 1, the first receiving element, the first adjustment element and the second adjustment element in the second controller can be integrated in the drive control chip. Here, the first controller is configured to process an image signal received from external to obtain a brightness signal, and send the brightness signal to the microprocessor on the drive board. The first receiving element receives the first switching command (which may be the first switching command parsed by the microprocessor) from the first controller, and then receives the brightness signal processed by the microprocessor, so that the first adjustment element can determine the first target current amplitude and the duty ratio based on the brightness signal. The first adjustment element controls the frequency of the switch transistor connected with the light emitting element in the dimming element, to thereby change the current flowing through the light emitting element. The second receiving element receives the second switching command (which may be the second switching command parsed by the microprocessor) from the first controller, and receives the brightness signal parsed by the microprocessor, so that the second adjustment element can determine the second target current magnitude and the predetermined duty ratio based on the parsed brightness signal. The second adjustment element controls the frequency of the switch transistor connected with the light emitting element to change the current flowing through the light emitting element. In addition, the power supply element can be configured to provide power supply signals to the devices on the drive board, the first controller and the light emitting element.

In some embodiments of the disclosure, during the switching process of the dimming mode, in order to avoid the problem of excessive loss of the switch transistor due to the sudden change of the amplitude of the current flowing through the light emitting element, in some embodiments of the disclosure, the first adjustment element or the second adjustment element in the display apparatus adjusts the amplitude of the current flowing through the light emitting element according to the preset stepsize, thereby avoiding excessive loss of the switch transistor.

Figure 4:
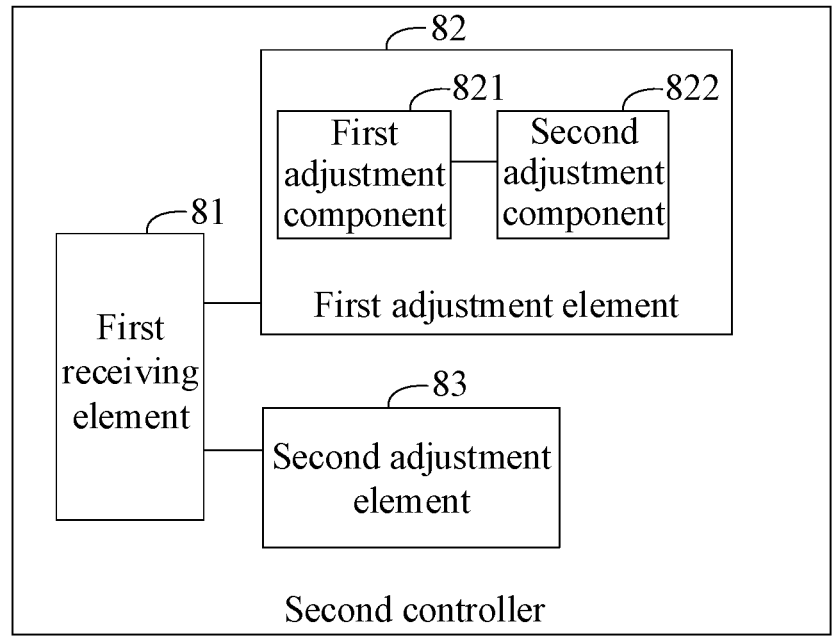
FIGS. 4-7 are schematic structural diagrams of a second controller according to one or more embodiments of the disclosure.

In some embodiments, FIGS. 4-7 are schematic structural diagrams of a second controller according to one or more embodiments of the disclosure. As shown in FIG. 4, in some embodiments of the disclosure, when the backlight drive mode is switched from the PWM dimming mode to the analog dimming mode, that is, when the first adjustment element adjusts the current flowing through the light emitting element, the first adjustment element 82 may specifically include: a first adjustment component 821 configured to adjust the amplitude of the current flowing through the light emitting element to a preset first target current amplitude according to a predetermined first stepsize if the switching command is the first switching command; and a second adjustment component 822 configured to adjust a duty ratio of the current flowing through the light emitting element to 1 if the amplitude of the current currently flowing through the light emitting element reaches the first target current amplitude.

In some embodiments of the disclosure, when the PWM dimming mode is switched to the analog dimming mode, since the amplitude of the current flowing through the light emitting element finally presents a downward trend while the duty ratio of the current is increasing, the current amplitude and duty ratio may be adjusted in order of precedence. When adjusting the amplitude and duty ratio of the current flowing through the light emitting element, if the duty ratio of the current is increased firstly, the average value of the current flowing through the light emitting element will still increase suddenly, causing an instantaneous impact on the power supply, causing the overcurrent protection of the power supply, stopping outputting signals to outside, and then causing the light emitting element to stop emitting light. Therefore, it may firstly choose to adjust the amplitude of the current, that is, reducing the amplitude of the current flowing through the light emitting element to the first target current amplitude according to the predetermined first stepsize, and then increasing the duty ratio to 1. When the amplitude of the current is reduced to the first target current amplitude, then the duty ratio of the current is increased. Although the average value of the current will still increase, the impact of the increased current value after the average value increases on the power supply is relatively small, which will not cause the overcurrent protection of the power supply.

In some embodiments of the disclosure, in order to avoid the overcurrent protection of the power supply caused by the excessive impact of the current increase on the power supply during the current adjustment process, the first adjustment element 82 is provided with the first adjustment component 821 and the second adjustment component 822, so that the amplitude of the current flowing through the light emitting element can be firstly adjusted, that is, the first adjustment component 821 is firstly implemented, and then the second adjustment component 822 is used to adjust the duty ratio of the current.

Figure 5:
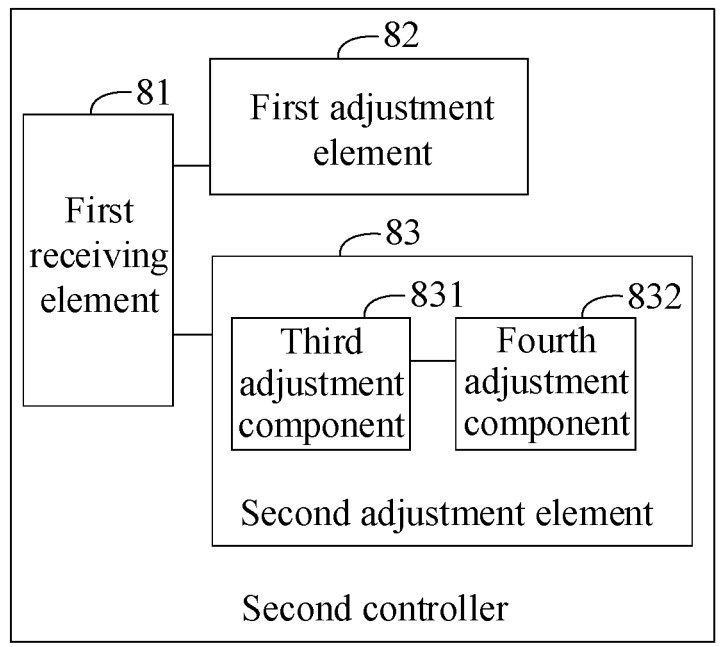

In some embodiments, as shown in FIG. 5, the second adjustment element 83 includes: a third adjustment component 831 configured to adjust the duty ratio of the current flowing through the light emitting element to the predetermined target duty ratio if the switching command is the second switching command; and a fourth adjustment component 832 configured to adjust the amplitude of the current flowing through the light emitting element to the preset second target current amplitude according to the predetermined second stepsize if the duty ratio of the current currently flowing through the light emitting element reaches the target duty ratio. Exemplarily, when switching from the analog dimming mode to the PWM dimming mode, the amplitude of the current flowing through the light emitting element tends to increase, and the duty ratio of the current decreases. When adjusting the current flowing through the light emitting element, the current amplitude and duty ratio can be selected to be adjusted in order of precedence. In order to avoid the overcurrent protection of the power supply caused in the process of firstly increasing the amplitude of the current, the duty ratio of the current is firstly reduced to the target duty ratio through the third adjustment component 831 in this case, and then the current amplitude is increased to the second target amplitude according to the preset step size through the fourth adjustment component 832, so that the current change is relatively small when the amplitude of the current is subsequently increased according to the step, thereby reducing the impact on the power supply and avoiding the overcurrent protection of the power supply.

In some embodiments of the disclosure, the duty ratio of the current flowing through the light emitting element is firstly adjusted to the predetermined target duty ratio through the third adjustment component 831, so that the current change is relatively small when the amplitude of the current is subsequently increased according to the predetermined second stepsize, thereby reducing the impact on the power supply and avoiding the overcurrent protection of the power supply.

Figure 6:
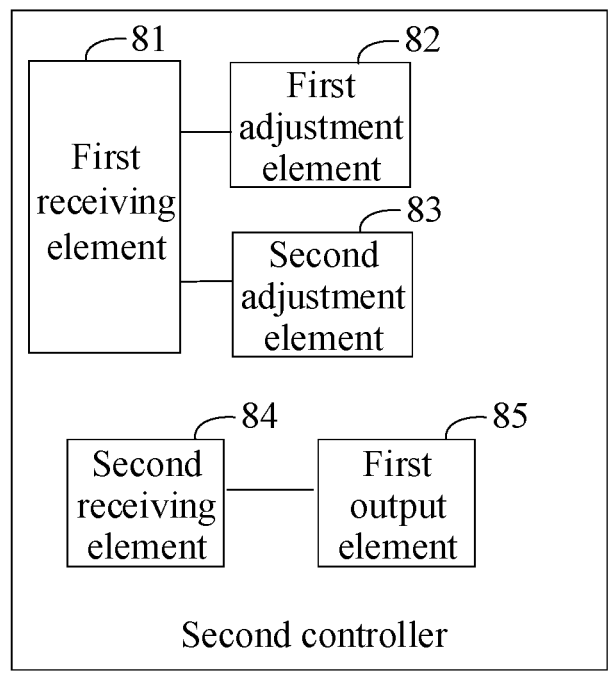

In some embodiments, as shown in FIG. 6, if the current dimming mode is the PWM dimming mode, the second controller further includes: a second receiving element 84 configured to receive a field frequency signal and a brightness signal from the first controller; and a first output element 85 configured to output a corresponding drive signal according to the field frequency signal and the brightness signal, where the drive signal is used to control the duty ratio of the current flowing through the light emitting element and the second target current amplitude. Exemplarily, during the PWM dimming process (that is, when the refresh rate of the display apparatus is in the fixed state), the duty ratio of the current flowing through the light emitting element is controlled by the switch transistor connected in series with the light emitting element after the field frequency signal and the brightness signal from the first controller are parsed by the second controller, and the duty ratio of the current flowing through the light emitting element in this case (which can be expressed as the frequency at which the light emitting element is turned on and off) needs to be synchronized with the frequency of the field frequency signal. Also, the second target current amplitude of the current flowing through the light emitting element can also be determined by the brightness signal and the field frequency signal.

Figure 7:
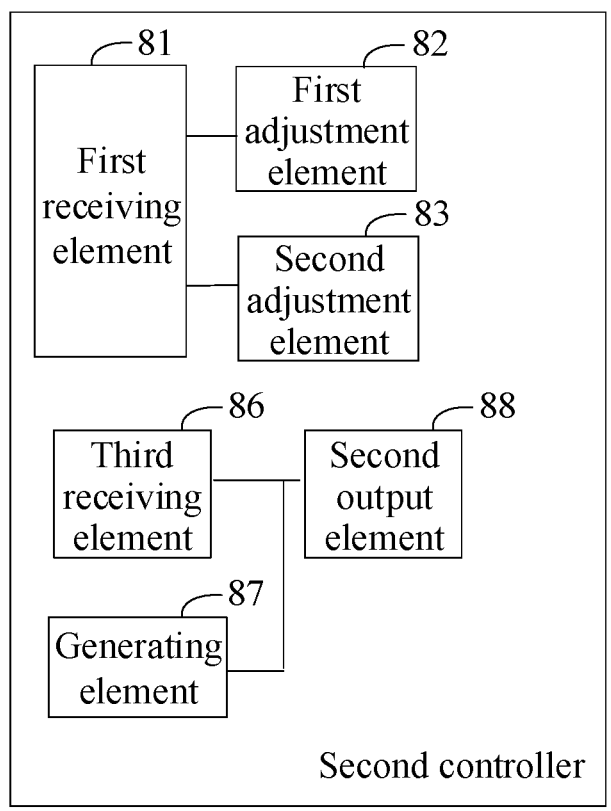

In some embodiments, as shown in FIG. 7, if the current dimming mode is the analog dimming mode, the second controller further includes: a third receiving element 86 configured to receive a brightness signal from the first controller; a generating element 87 configured to generate a field frequency signal according to a preset signal parameter; and a second output element 88 configured to output a corresponding drive signal according to the brightness signal and the generated field frequency signal, where the drive signal is used to control the duty ratio of the current flowing through the light emitting element and the first target current amplitude.

Exemplarily, when the dimming mode is the analog dimming mode (that is, when the refresh rate of the display apparatus is variable), since the duty ratio of the current flowing through the light emitting element is 1 during the analog dimming process, the first controller no longer sends the field frequency signal but only sends the brightness signal to the second controller in this case. Moreover, in this case, the second controller may generate the field frequency signal according to the preset signal parameter (for example, the frequency of the signal), and then the second controller generates a drive signal for controlling the duty ratio of the current flowing through the light emitting element to 1 after parsing the brightness signal and the field frequency signal. Moreover, the first target current amplitude of the current flowing through the light emitting element is also determined by the field frequency signal and the brightness signal.

In some embodiments, in order to determine the predetermined first stepsize when the PWM dimming mode is converted to the analog dimming mode, the second controller further includes: a preset element configured to set a plurality of current amplitude variations; an obtaining element configured to, for each current amplitude variation, obtain response time of the power supply and discharge time of the capacitor under the plurality of current amplitude variations by performing the following steps: reducing the amplitude of the current flowing through the light emitting element according to the current amplitude variation, and determining a corresponding voltage amplitude variation; and obtaining the response time of the power supply and the discharge time of the capacitor under the current amplitude variation, where the response time of the power supply is the time required for reducing the output voltage of the power supply by the voltage amplitude variation, and the discharge time of the capacitor is the time required for reducing the voltage across the capacitor by the voltage amplitude variation; where one end of the capacitor is connected with the output terminal of the power supply, and the other end of the capacitor is grounded; and a determining element configured to select a first current amplitude variation from the plurality of current amplitude variations as the first stepsize, where the discharge time of the capacitor is shorter than the response time of the power supply under the first current amplitude variation.

Exemplarily, when the PWM dimming mode is changed to the analog dimming mode, the output voltage of the power supply will also change due to current change of the current flowing through the light emitting element; the response of the power supply has a time delay, and the output voltage of the power supply can achieve a stable output state after a period of time. A capacitor is usually connected with the output terminal of the power supply, that is, one end of the capacitor is connected with the output terminal of the power supply and the other end of the capacitor is grounded, which can filter and shape the output signal of the power supply, etc. The capacitor itself is an energy storage element. When the output voltage of the power supply changes, the capacitor itself will also discharge, and the energy released by the capacitor due to the voltage change will be borne by the switch transistor. When the discharge time of the capacitor is longer than the response time of the power supply, the time for the switch transistor to bear the energy will be increased, so that the loss of the switch transistor is increased, and the time for the switch transistor to withstand the impact is prolonged.

Therefore, in order to reduce the loss of the switch transistor and reduce the loss time of the switch transistor, it is necessary to satisfy that the discharge time of the capacitor is shorter than the response time of the power supply. The discharge time of the capacitor and the response time of the power supply are both related to the amplitude variation of the current in the light emitting element. When determining the predetermined first stepsize during changing the current amplitude, a plurality of current amplitude variations can be firstly set by the preset element. Under each current amplitude variation, the voltage amplitude variation is determined according to the current amplitude signal, and the time required for reducing the output voltage of the power supply by the voltage amplitude variation (i.e., the response time of the power supply) and the time required for reducing the voltage across the capacitor by the voltage amplitude variation (i.e., the response time of the capacitor) under each current amplitude variation are obtained by the obtaining element. Afterwards, the determining element selects the current amplitude variation under which the discharge time of the capacitor is shorter than the response time of the power supply from the current amplitude variations as the first stepsize.

In some embodiments of the disclosure, an appropriate first stepsize is selected, so that the discharge time of the capacitor is shorter than the response time of the power supply, which can reduce the extended time caused by the impact on the switch transistor due to the discharge of the capacitor. This embodiment effectively reduces the time for the switch transistor to withstand the impact, thereby reducing the loss of the switch transistor, realizing the protection of the switch transistor, and avoiding the problem of damage to the switch transistor when the switch transistor withstands the impact for a long time.

Figure 8:
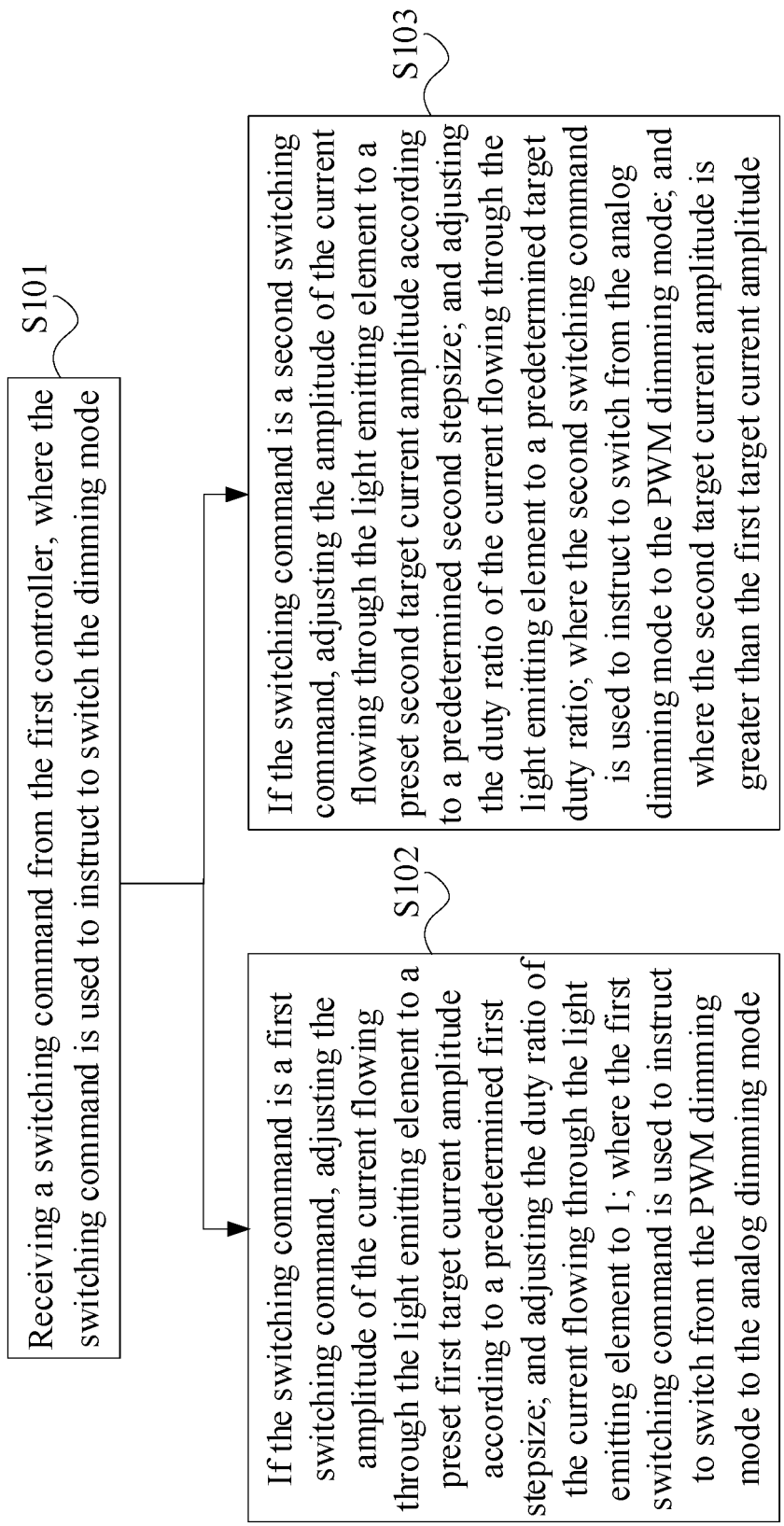
FIG. 8 is a schematic flowchart of a backlight driving control method according to one or more embodiments of the disclosure.

FIG. 8 is a schematic flowchart of a backlight driving control method according to one or more embodiments of the disclosure. As shown in FIG. 8, the method is applied to the second controller in the display apparatus shown in FIG. 3, and the method includes the following steps.

S101: receiving a switching command from the first controller, where the switching command is used to instruct to switch the dimming mode. Exemplarily, the display apparatus in the disclosure has a variable refresh rate function, that is, the display apparatus has two work modes: one is an ordinary fixed refresh rate mode, and the other is a variable refresh rate mode. In the fixed refresh rate mode, the backlight driver selects the PWM dimming mode. In the variable refresh rate mode, the analog dimming mode is selected. When the switching command is received, the second controller in the display apparatus may be instructed to switch the dimming mode. In some embodiments, the above switching command may be generated by the user through selecting a related control on the display interface of the display apparatus.

S102: if the switching command is a first switching command, adjusting the amplitude of the current flowing through the light emitting element to a preset first target current amplitude according to a predetermined first stepsize; and adjusting the duty ratio of the current flowing through the light emitting element to 1; where the first switching command is used to instruct to switch from the PWM dimming mode to the analog dimming mode. Exemplarily, when the backlight driving mode is switched from the PWM dimming mode to the analog dimming mode, in order to avoid the sudden change of the current flowing through the light emitting element and the problem of too large loss of the switch transistor due to the response latency of the power supply, the amplitude of the current can be adjusted according to the preset first stepsize when adjusting the current flowing through the light emitting element, so that the current amplitude is finally reduced to the first target current amplitude, and the duty ratio of the current flowing through the light emitting element is adjusted to 1.

S103: if the switching command is a second switching command, adjusting the amplitude of the current flowing through the light emitting element to a preset second target current amplitude according to a predetermined second stepsize; and adjusting the duty ratio of the current flowing through the light emitting element to a predetermined target duty ratio; where the second switching command is used to instruct to switch from the analog dimming mode to the PWM dimming mode; and where the second target current amplitude is greater than the first target current amplitude. Exemplarily, when the backlight driving mode is converted from the analog dimming mode to the PWM dimming mode, the amplitude of the current flowing through the light emitting element can be increased to the preset second target current amplitude according to the predetermined second stepsize, and the duty ratio of the current is adjusted to the predetermined duty ratio. In some embodiments, the second stepsize in S103 may be the same as or different from the first stepsize in the step S102. In some embodiments of the disclosure, during the switching process of the dimming mode, in order to avoid the problem of excessive loss of the switch transistor due to the sudden change of the amplitude of the current flowing through the light emitting element, in some embodiments of the disclosure, the amplitude of the current flowing through the light emitting element is adjusted according to the preset stepsize, thereby avoiding the problem of excessive loss of the switch transistor.

Figure 9:
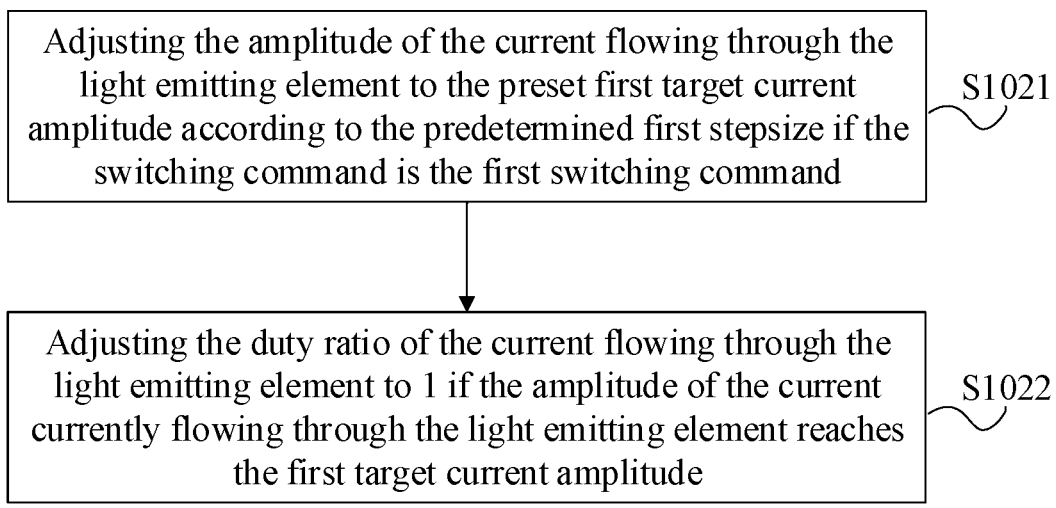
FIG. 9 is a schematic flowchart of switching a dimming mode according to one or more embodiments of the disclosure.

In some embodiments, when the backlight driving mode is switched from the PWM dimming mode to the analog dimming mode, the current may be adjusted by the following steps (that is, when S102 is performed, S102 may be specifically implemented by the following steps). As shown in FIG. 9, which is a schematic flowchart of switching the dimming mode according to one or more embodiments of the disclosure, S102 includes: S1021: adjusting the amplitude of the current flowing through the light emitting element to the preset first target current amplitude according to the predetermined first stepsize if the switching command is the first switching command; and S1022: adjusting the duty ratio of the current flowing through the light emitting element to 1 if the amplitude of the current currently flowing through the light emitting element reaches the first target current amplitude. Exemplarily, in some embodiments of the disclosure, when the PWM dimming mode is switched to the analog dimming mode, since the amplitude of the current flowing through the light emitting element finally presents a downward trend while the duty ratio of the current is increasing, the current amplitude and duty ratio may be adjusted in order of precedence. When adjusting the amplitude and duty ratio of the current flowing through the light emitting element, if the duty ratio of the current is increased firstly, the average value of the current flowing through the light emitting element will still increase suddenly, causing an instantaneous impact on the power supply, causing the overcurrent protection of the power supply, stopping outputting signals to outside, and further causing the light emitting element to stop emitting light. Therefore, it may choose to adjust the amplitude of the current, that is, reducing the amplitude of the current flowing through the light emitting element to the first target current amplitude according to the predetermined first stepsize, and then increasing the duty ratio to 1. When the amplitude of the current is reduced to the first target current amplitude, then the duty ratio of the current is increased. Although the average value of the current will still increase, the impact of the increased current value after the average value increases on the power supply is relatively small, which will not cause the overcurrent protection of the power supply. In some embodiments of the disclosure, in order to avoid the overcurrent protection of the power supply caused by the excessive impact of the current increase on the power supply during the current adjustment process, it may firstly adjust the amplitude of the current flowing through the light emitting element and then adjust the duty ratio of the current.

Figure 10:
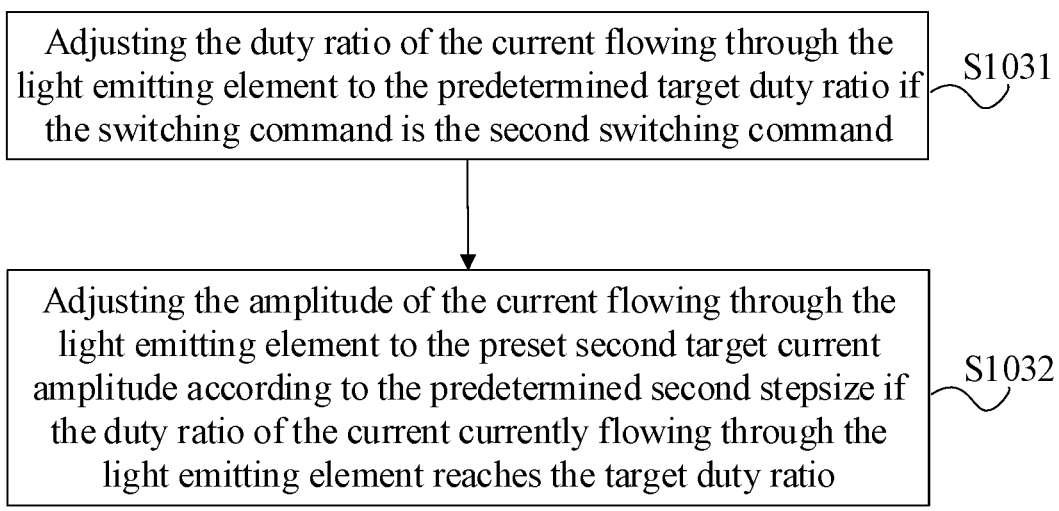
FIG. 10 is another schematic flowchart of switching a dimming mode according to one or more embodiments of the disclosure.

In some embodiments, when the backlight driving mode is switched from the analog dimming mode to the PWM dimming mode, the current may be adjusted by the following steps (that is, when S103 is performed, S103 may be specifically implemented by the following steps). As shown in FIG. 10, which is another schematic flowchart of switching the dimming mode according to one or more embodiments of the disclosure, S103 includes: S1031: adjusting the duty ratio of the current flowing through the light emitting element to the predetermined target duty ratio if the switching command is the second switching command; and S1032: adjusting the amplitude of the current flowing through the light emitting element to the preset second target current amplitude according to the predetermined second stepsize if the duty ratio of the current currently flowing through the light emitting element reaches the target duty ratio. Exemplarily, when switching from the analog dimming mode to the PWM dimming mode, the amplitude of the current flowing through the light emitting element tends to increase, and the duty ratio of the current decreases. When adjusting the current flowing through the light emitting element, the current amplitude and duty ratio can be selected to be adjusted in order of precedence. In order to avoid the overcurrent protection of the power supply caused in the process of firstly increasing the amplitude of the current, the duty ratio of the current is firstly reduced, so that the current change is relatively small when the amplitude of the current is subsequently increased according to the stepsize, thereby reducing the impact on the power supply and avoiding the overcurrent protection of the power supply. In some embodiments of the disclosure, the duty ratio of the current flowing through the light emitting element is firstly adjusted to the predetermined target duty ratio, so that the current change is relatively small when the amplitude of the current is subsequently increased according to the predetermined second stepsize, thereby reducing the impact on the power supply and avoiding the overcurrent protection of the power supply.

In some embodiments, the switching command received in step S101 may be generated by the first controller. Specifically, the first switching command is sent from the first controller when detecting that the frame rate of the image to be displayed is different from the frequency of the field frequency signal of the current display apparatus and the current dimming mode is the PWM dimming mode. The second switching command is sent from the first controller when detecting that the frame rate of the image to be displayed is the same as the frequency of the current field frequency signal and the current dimming mode is the analog dimming mode.

In some embodiments, if the current dimming mode is the PWM dimming mode, the backlight driving control method further includes: receiving a field frequency signal and a brightness signal from the first controller; and outputting a corresponding drive signal according to the field frequency signal and the brightness signal, where the drive signal is used to control the duty ratio of the current flowing through the light emitting element and the second target current amplitude. Exemplarily, during the PWM dimming process (that is, when the refresh rate of the display apparatus is in the fixed state), the duty ratio of the current flowing through the light emitting element is controlled by the field frequency signal and the brightness signal from the first controller after being parsed by the second controller, and the duty ratio of the current flowing through the light emitting element in this case (which can be expressed as the frequency at which the light emitting element is turned on and off) needs to be synchronized with the frequency of the field frequency signal. Also, the second target current amplitude of the current flowing through the light emitting element is also determined by the brightness signal and the field frequency signal.

In some embodiments, if the current dimming mode of the display apparatus is the analog dimming mode, the backlight drive control method further includes: receiving a brightness signal from the first controller; generating a field frequency signal according to a preset signal parameter; and outputting a corresponding drive signal according to the brightness signal and the generated field frequency signal, where the drive signal is used to control the duty ratio of the current flowing through the light emitting element and the first target current amplitude. Exemplarily, when the dimming mode is the analog dimming mode (that is, when the refresh rate of the display apparatus is variable), since the duty ratio of the current flowing through the light emitting element is 1 during the analog dimming process, the first controller no longer sends the field frequency signal but only sends the brightness signal to the second controller at this time. Moreover, in this case, the second controller may generate the field frequency signal according to the preset signal parameter (for example, the frequency of the signal), and then generate a drive signal for controlling the duty ratio of the current flowing through the light emitting element to 1 after parsing the brightness signal and the field frequency signal. Moreover, the first target current amplitude of the current flowing through the light emitting element is also determined by the field frequency signal and the brightness signal.

In some embodiments, in order to determine the predetermined first stepsize when the PWM dimming mode is switched to the analog dimming mode, the process may comprise: setting a plurality of current amplitude variations; for each current amplitude variation, obtaining the response time of the power supply and the discharge time of the capacitor under the plurality of current amplitude variations by performing the following steps: reducing the amplitude of the current flowing through the light emitting element according to the current amplitude variation, and determining a corresponding voltage amplitude variation; and obtaining the response time of the power supply and the discharge time of the capacitor under the current amplitude variation, where the response time of the power supply is the time required for reducing the output voltage of the power supply by the voltage amplitude variation, and the discharge time of the capacitor is the time required for reducing the voltage across the capacitor by the voltage amplitude variation; where one end of the capacitor is connected with the output terminal of the power supply, and the other end of the capacitor is grounded; and selecting a first current amplitude variation from the plurality of current amplitude variations as the first stepsize, where the discharge time of the capacitor is shorter than the response time of the power supply under the first current amplitude variation.

Figure 11:
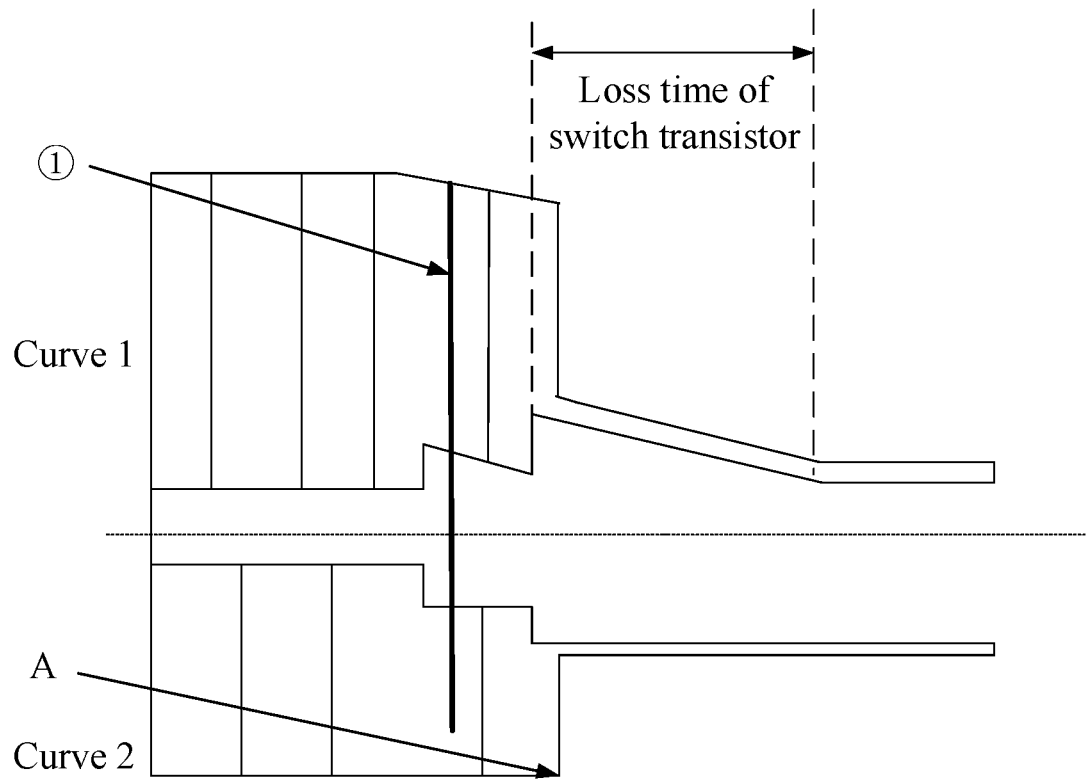
FIG. 11 is a schematic diagram of a waveform change when switching to analog dimming according to one or more embodiments of the disclosure.

As shown in FIG. 11, FIG. 11 is a schematic diagram of a waveform change when switching to analog dimming according to one or more embodiments of the disclosure. In FIG. 11, the curve 1 represents a voltage drop curve on the switch transistor, and the curve 2 represents a schematic diagram of the change in current flowing through the light emitting element (the step-like change in FIG. 11 mainly shows the amplitude change of the current. Since the frequency of the current signal is usually high, the adjustment change of the duty ratio is not directly shown in the figure, where the vertical line between the upper contour line and the lower contour line corresponding to the curve 1 only represents that the voltage drop change has a duty ratio and does not represent the change frequency of the duty ratio, and the vertical lines in the remaining curve outlines have similar meaning). In the curve 2, the current amplitude of the current signal is firstly decreased stepwise, and then the duty ratio of the current signal is changed (combined with the diagram, the duty ratio starts to be adjusted after the point A in FIG. 11, and the duty ratio is adjusted to 1). When the amplitude of the current drops every time, the switch transistor will bear a certain impact in this case, and the voltage drop value across two ends of the switch transistor will increase. Due to the influence of the capacitor discharge, the time for the switch transistor to suffer the impact will be prolonged. The distance between two dotted lines in FIG. 11 represents the loss time of the switch transistor when the amplitude drops for the second time. At the mark ① in FIG. 11, the current and the signal on the switch transistor disappear transitorily, because the first controller stops sending the field frequency signal to the second controller during the switching process from the PWM dimming mode to the analog dimming mode. The second controller is required to generate a field frequency signal with the preset signal parameter, so there will be a momentary signal loss.

Therefore, in order to reduce the loss on the switch transistor and reduce the loss time of the switch transistor, it is necessary to satisfy that the discharge time of the capacitor is shorter than the response time of the power supply. The discharge time of the capacitor and the response time of the power supply are both related to the amplitude variation of the current in the light emitting element.

Specifically, when determining the predetermined first stepsize during changing of the current amplitude, a plurality of current amplitude variations may be set firstly. Under each current amplitude variation, the voltage amplitude variation is determined according to the current amplitude signal, and the time required for reducing the output voltage of the power supply by the voltage amplitude variation (i.e., the response time of the power supply) and the time required for reducing the voltage across the capacitor by the voltage amplitude variation (i.e., the response time of the capacitor) under each current amplitude variation are obtained. The current amplitude variation, under which the discharge time of the capacitor is shorter than the response time of the power supply, is selected from the current amplitude variations as the first stepsize.

Figure 12:
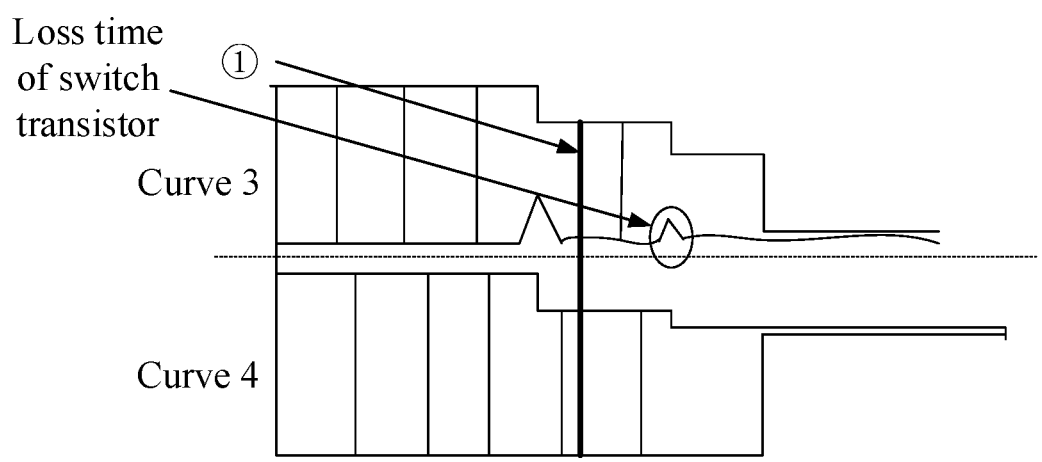
FIG. 12 is a schematic diagram of another waveform change when switching to analog dimming according to one or more embodiments of the disclosure.

FIG. 12 is a schematic diagram of another waveform change when switching to analog dimming according to one or more embodiments of the disclosure. In FIG. 12, the curve 3 represents a voltage drop curve when the second switch transistor is turned on, and the curve 4 represents a schematic diagram of the change in current flowing through the light emitting element. In the curve 4, the current amplitude of the current signal is firstly decreased stepwise, and then the duty ratio of the current signal is changed. Every time the amplitude of the current drops, the switch transistor will still bear a certain impact. The time consumed by two peaks circled in FIG. 12 represents the impact time on the switch transistor every time the current drops stepwise. At the mark ① in FIG. 12, the current and the output signal of the power supply disappear transitorily, because the first controller stops sending the field frequency signal to the second controller during the switching process from the PWM dimming mode to the analog dimming mode. The second controller is required to generate a field frequency signal with the preset signal parameter, so there will be a momentary signal loss. In this embodiment, an appropriate first stepsize is selected, so that the discharge time of the capacitor is shorter than the response time of the power supply, which can reduce the extended time of the impact on the switch transistor due to the discharge of the capacitor. In combination with FIG. 11 and FIG. 12, the distance between two dotted lines in FIG. 11 represents the impact time of the switch transistor, and the stage circled in FIG. 12 is a period during which the switch transistor is subjected to impact under the implementation of this embodiment. As can be seen from the comparison, this embodiment effectively reduces the time for the switch transistor to withstand the impact, thereby reducing the loss of the switch transistor, realizing the protection of the switch transistor, and avoiding the problem of damage to the switch transistor when the switch transistor withstands the impact for a long time.

Figure 13:
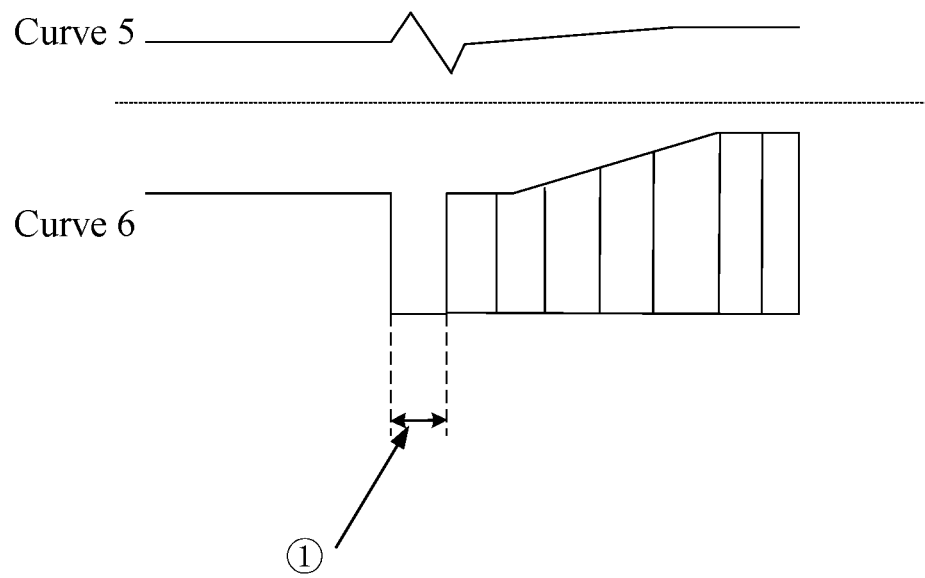
FIG. 13 is a schematic diagram of a waveform change when switching to PWM dimming according to one or more embodiments of the disclosure.

FIG. 13 is a schematic diagram of a waveform change when switching to PWM dimming according to one or more embodiments of the disclosure. In FIG. 13, the curve 5 represents a change curve of the output voltage of the power supply, and the curve 6 represents a schematic diagram of the change in current flowing through the light emitting element. When the dimming mode is switched, the duty ratio of the current signal is reduced firstly, and then the amplitude of the current is increased at a certain rate. Moreover, during the above-mentioned process of changing the current signal, the voltage signal output by the power supply does not exceed the maximum output voltage value of the power supply, avoiding the problem that the power supply interrupts output due to overcurrent protection. At the mark ① in FIG. 13, the current signal disappears transitorily, because the first controller starts to send the field frequency signal to the second controller during the switching process from the analog dimming mode to the PWM dimming mode, and the second controller needs to perform the process of converting from automatically generating the field frequency signal to receiving and processing the field frequency signal from the first controller, resulting in a momentary loss of signal.

The display apparatus is connected with an external device, and the display apparatus and the external device serve as a receiving end (Sink end) and a sending end (source end) respectively. For example, the external device can be a game device. When a user uses the game device, the game device can output the video data and audio data in real time for the game process, and send the video data and audio data to the display apparatus, so as to output the video data and audio data as the video picture and sound through the display apparatus. In this case, the game device acts as the sending end, and the display apparatus acts as the receiving end. Usually, the game device inputs a video source with a variable refresh rate to the display apparatus, and the display apparatus can switch to the variable refresh rate mode in this case.

Figure 14:
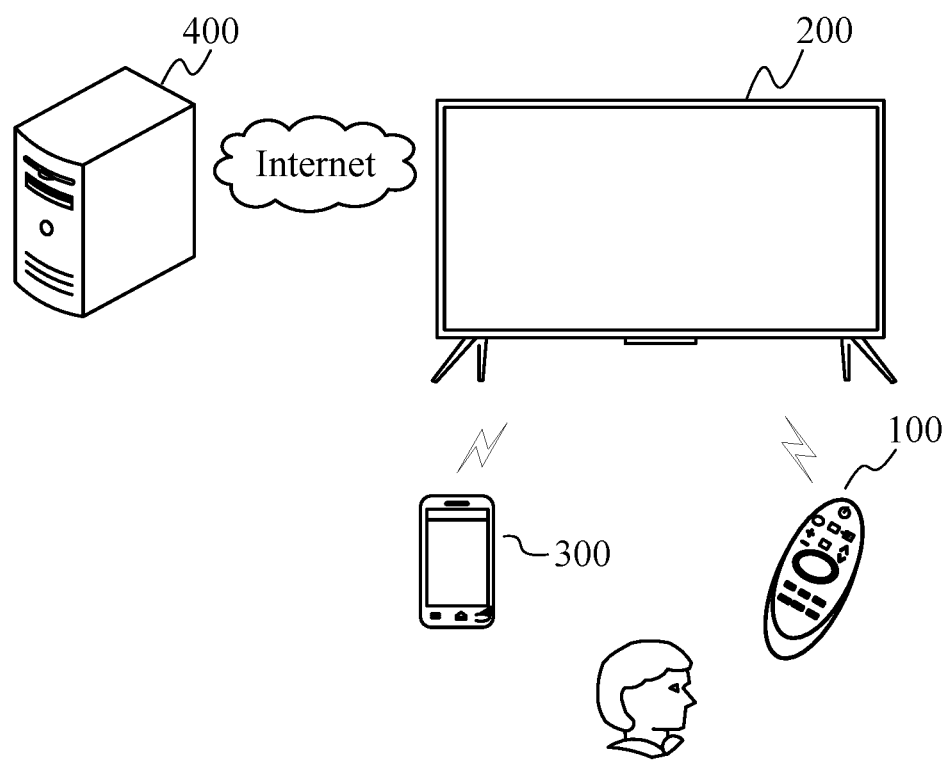
FIG. 14 is a schematic diagram of an operation scenario between a display apparatus and a control device according to one or more embodiments of the disclosure.

In some embodiments, FIG. 14 is a schematic diagram of an operation scenario between a display apparatus and a control device according to one or more embodiments of the disclosure. As shown in FIG. 14, a user can operate a display apparatus 200 through a mobile terminal 300 and a control device 100. The control device 100 may be a remote control, and the communication between the remote control and the display apparatus includes infrared protocol communication and Bluetooth protocol communication. The display apparatus 200 is controlled in the wireless or other wired manner. The user may input user commands through he keys on the remote controller, voice inputs, control panel inputs, etc. to control the display apparatus 200. In some embodiments, a mobile terminal, tablet computer, computer, laptop and other smart devices may also be used to control the display apparatus 200.

In some embodiments, the mobile terminal 300 and the display apparatus 200 may install software applications, and implement the connection and communication through the network communication protocols, achieving one-to-one control operation and data communication. The audio and video content displayed on the mobile terminal 300 may also be transmitted to the display apparatus 200 to realize the synchronous display function. The display apparatus 200 also performs data communication with the server 400 in numerous communication manners. The display apparatus 200 may be allowed to perform the communication and connection through a Local Area Network (LAN), a Wireless Local Area Network (WLAN), and other networks. The server 400 may provide various contents and interactions to the display apparatus 200. The display apparatus 200 may be a liquid crystal display, an OLED display, or a projection display apparatus. In addition to the broadcast receiving TV function, the display apparatus 200 may additionally provide the smart network TV function that computer supports.

Figure 15:
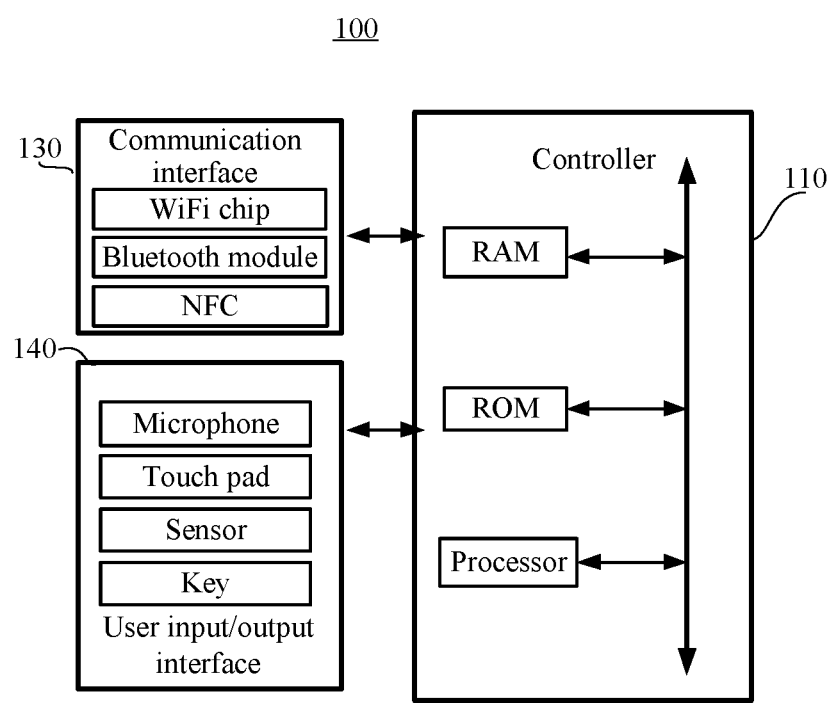
FIG. 15 is a block diagram of a hardware configuration of the control device according to one or more embodiments of the disclosure.

FIG. 15 is a block diagram of the hardware configuration of the control device according to one or more embodiments of the disclosure. As shown in FIG. 15, the control device 100 includes a controller 110, a communication interface 130, a user input/output interface 140, a memory, and a power supply. The control apparatus 100 may receive an input operation command from a user and convert the operation command into an instruction that can be recognized and responded by the display apparatus 200, playing an intermediary role between the user and the display apparatus 200. The communication interface 130 is configured to communicate with external devices, and the communication interface 130 includes at least one of a WIFI chip, a Bluetooth module, an NFC or alternative module. The user input/output interface 140 includes at least one of microphone, trackpad, sensor, button or alternative module.

Figure 16:
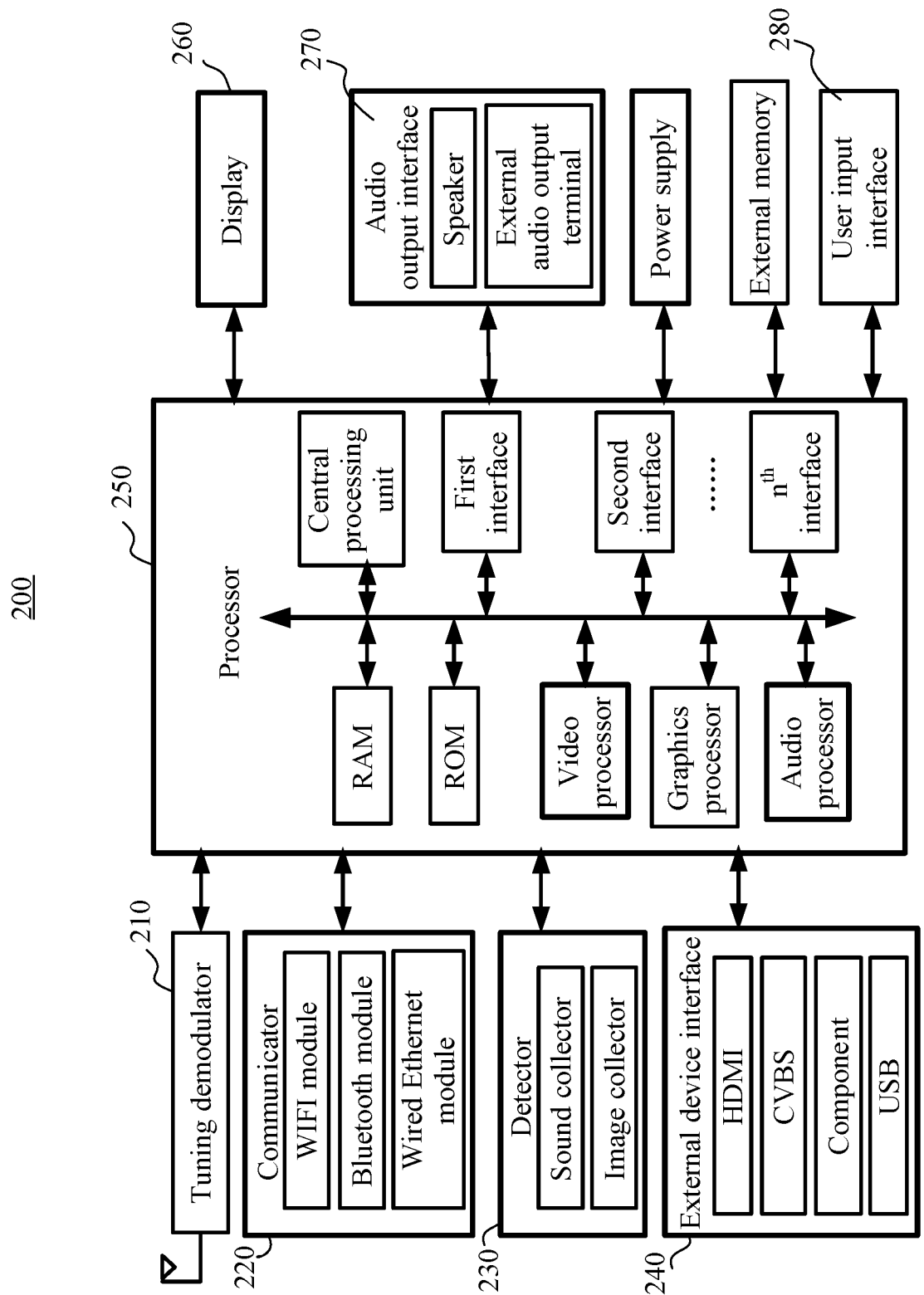
FIG. 16 is a block diagram of a hardware configuration of the display apparatus according to one or more embodiments of the disclosure.

FIG. 16 is a block diagram of the hardware configuration of the display apparatus according to one or more embodiments of the disclosure. As shown in FIG. 16, the display apparatus 200 includes at least one of a tuning demodulator 210, a communicator 220, a detector 230, an external device interface 240, a processor 250, a display 260, an audio output interface 270, a memory, a power supply, or a user input interface 280. The processor includes a central processing unit, a video processor, an audio processor, a graphics processor, an RAM, an ROM, and the first to $n^{th}$ interfaces for input/output. The display 260 may be at least one of a liquid crystal display, an OLED display, a touch display and a projection display, and may also be a projection device and a projection screen. The tuning demodulator 210 receives broadcast television signals in a wired or wireless receiving manner, and demodulates audio and video signals, such as EPG data signals, from a plurality of wireless or wired broadcast television signals. The detector 230 is used to collect the external environment or interactive signals with outside. The processor 250 and the tuning demodulator 210 may be located in different separate devices, that is, the tuning demodulator 210 may also be located in an external device (such as an external set-top box, etc.) of the main device where the processor 250 is located.

In some embodiments, the processor 250 controls the operations of the display apparatus and responds to an operation from the user through various software control programs stored in the memory. The processor 250 controls the overall operation of the display apparatus 200. The user may input a user command on the Graphical User Interface (GUI) displayed on the display 260, and the user input interface receives the user input command through the Graphical User Interface (GUI). Alternatively, the user may input a user command by inputting the particular sound or gesture, and the user input interface recognizes the sound or gesture through the sensor to receive the user input command.

Figure 17:
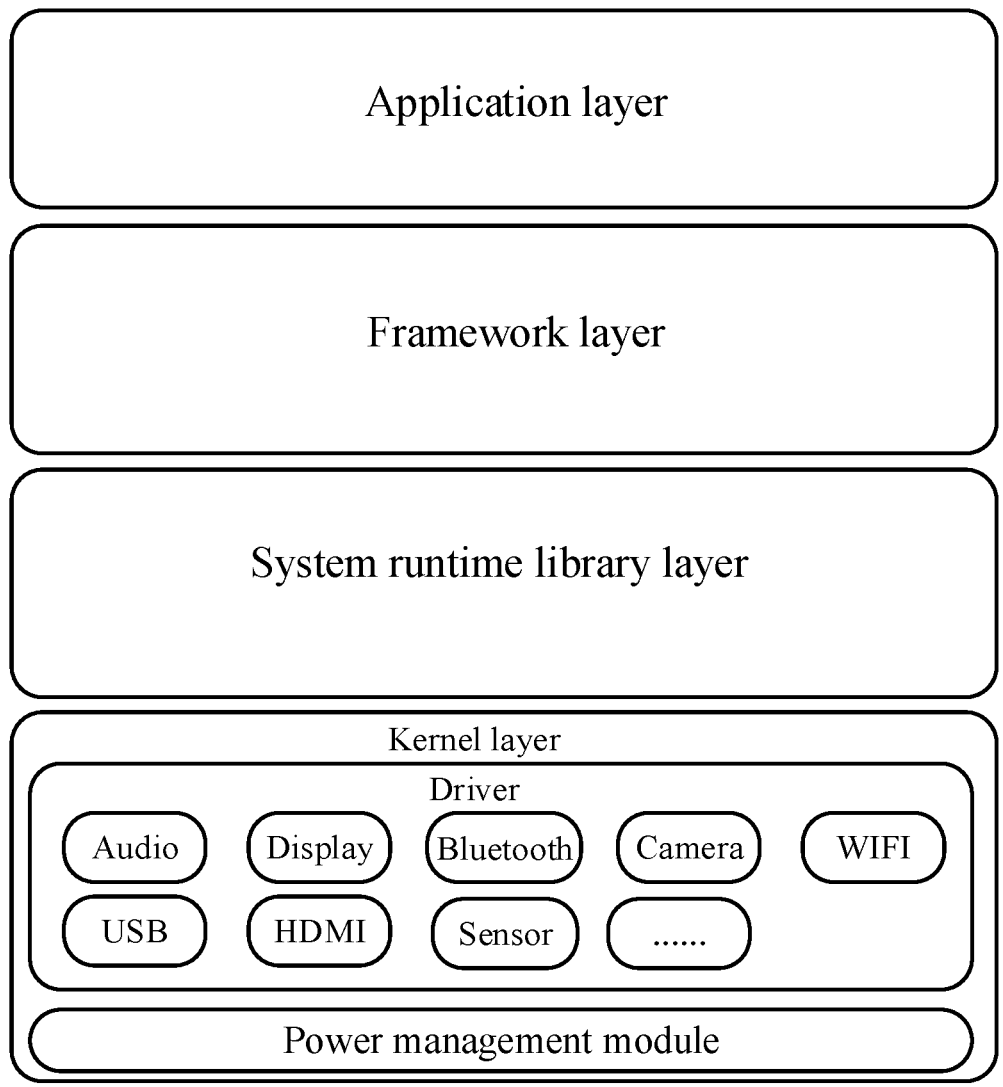
FIG. 17 is a schematic diagram of a software configuration in the display apparatus 200 according to one or more embodiments of the disclosure.

FIG. 17 is a schematic diagram of a software configuration in the display apparatus 200 according to one or more embodiments of the disclosure. As shown in FIG. 17, the system is divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer. The kernel layer includes at least one of: audio driver, display driver, Bluetooth driver, camera driver, WIFI driver, USB driver, HDMI driver, sensor driver (such as fingerprint sensor, temperature sensor, pressure sensor, etc.), and power driver, etc.

Figure 18:
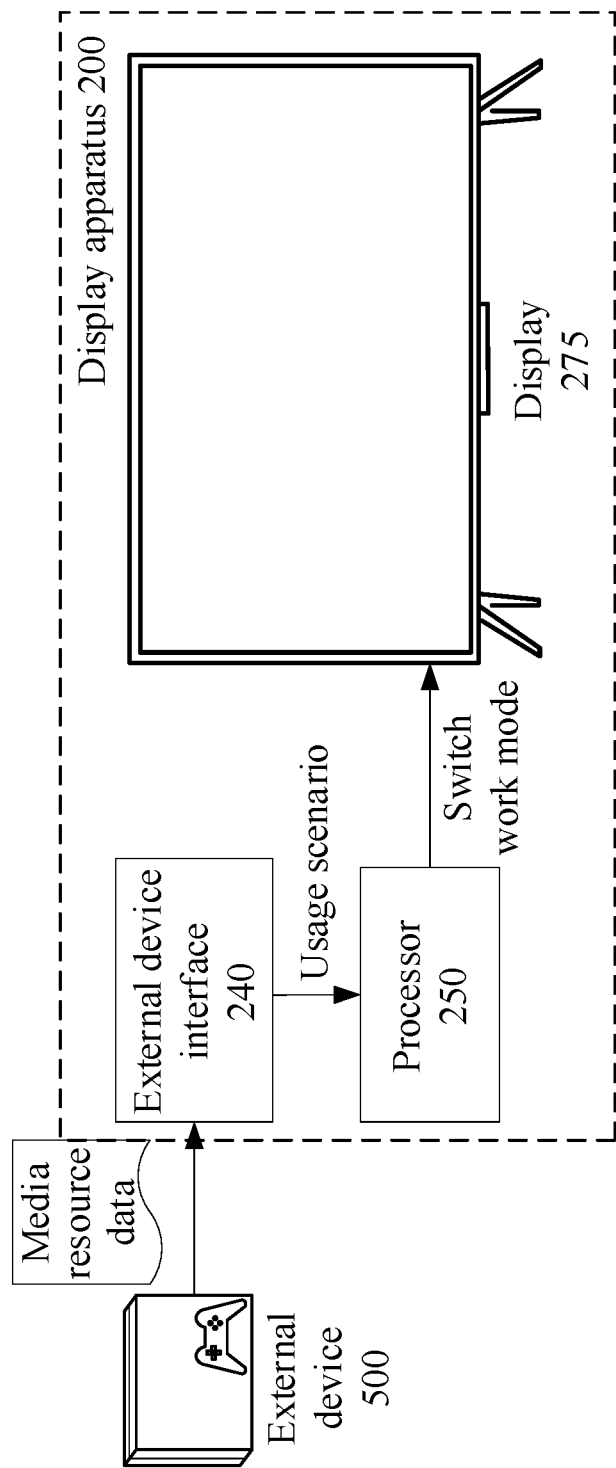
FIG. 18 is a schematic flowchart of adaptive parameters of the display apparatus according to one or more embodiments of the disclosure.

When the connection between the display apparatus and the game device through the HDMI interface is established, the game device is responsible for running a game application and forming the video data and audio data according to the user's interactive operation, while the display apparatus can only passively obtain the audio data and video data output from the game device. The game device requires different video and audio output modes in different game modes to obtain the better image quality and sound quality. However, the game device cannot directly adjust the output mode of the display apparatus, causing the output mode to be inconsistent with the usage scenario, and affecting the video and audio effects. In order to adapt to the usage scenario of the external device, FIG. 18 is a schematic flowchart of adaptive parameters of the display apparatus according to one or more embodiments of the disclosure. As shown in FIG. 18, some embodiments of the disclosure provide a display apparatus 200, including a display 275, a communicator, a memory, and an external device interface 240 and a processor 250, where the display is configured to present a user interface and a picture based on a video signal from the external device 500; the communicator is configured to establish a communication connection with the external device, so as to receive video data and/or audio data from the external device, a memory configured to store computer instructions and data associated with the display; and the processor is configured to execute the computer instructions to cause the display apparatus to detect the received video data and/or audio data, so as to determine scenario information of the external device according to the video data and/or audio data, and adjust the output mode according to the scenario information to implement adaptive parameter method.

In some embodiments, the display apparatus may have a built-in Low-latency Mode (LLM), and the external device may have a built-in Auto Low-latency Mode (ALLM). The low-latency mode of the display apparatus at the Sink end may be automatically enabled or disabled by the source end according to a preset rule in the case where the display apparatus at the Sink end does not need to be manually set by the user. For example, when the user receives a video call while watching a movie, the external device as the source end will automatically stop playing the movie and notify the display apparatus at the Sink end to switch to the low-latency mode, to ensure the real-time interactive performance of the video call. After the user finishes answering the video call, the external device at the source end can resume the movie playing, and notify the display apparatus at the sink end to exit the low-latency mode. In the process of transmitting video signals and audio signals from the external device to the display apparatus, the display apparatus can detect the use mode of the external device by performing the adaptive parameter adjustment method, and automatically adjust the output mode according to different use modes.

In some embodiments, the processor of the display apparatus may be configured to execute the computer instructions to perform: receiving media resource information from the external device, and detecting the use mode of the external device according to the media resource information. Every time an external device is connected with the display apparatus, the display apparatus can detect the behavior of the external device in real time, thereby determining the use mode of the external device. The specific detection method may include: the display apparatus reads a data frame in the media resource information, and determines the use mode of the external device according to the reading result. For example, the HDMI protocol specifies a data frame (SPD) that describes the information of the device itself, and the external device can send the data frame according to a preset time interval while transmitting the media resource information data. After receiving the data frame, the display apparatus reads the device classification at a specific byte position from the data frame, for example, "8" represents "game device", "9" represents "host device", "10" represents "DVD device", etc.

Before determining the use mode of the external device, the display apparatus may also determine whether the external device supports the function of sending the use mode. For example, whether the external device supports the ALLM can be determined by reading the value of an ALLM flag position in the VSIF (Vendor Specific info Frame). If the ALLM flag position in the VSIF is 1 at a certain moment, this means that the device supports the ALLM. Therefore, the SPD description information of the external device is then read and recorded in the database, so as to automatically enable the ALLM function of the display apparatus when this type of device accesses again.

If the external device supports the ALLM, the display apparatus will automatically enable the ALLM processing mechanism, so as to dynamically update the picture quality and sound quality parameters of the display apparatus according to the ALLM state from the external device. For example, when the ALLM state of the game device is 0, meaning that no game is being played but a movie may be played, the picture quality and sound quality parameters of the display apparatus should remain in the user-defined state; when the ALLM state of the game device is 1, meaning that a game is being played, the display apparatus can further classify game types through image recognition, and set the picture quality and sound quality parameters corresponding to the display apparatus according to a preset value of the game type, to obtain a better display effect. If the external device does not support the ALLM, the display apparatus can obtain the SPD information of the external device. If it is determined in the SPD information that the external device is a game device, it can be assumed that the external device is always playing a game. In this case, the display apparatus further classifies the game type through image recognition, and sets the picture quality and sound quality parameters corresponding to the display apparatus according to the game type preset value.

Figure 19:
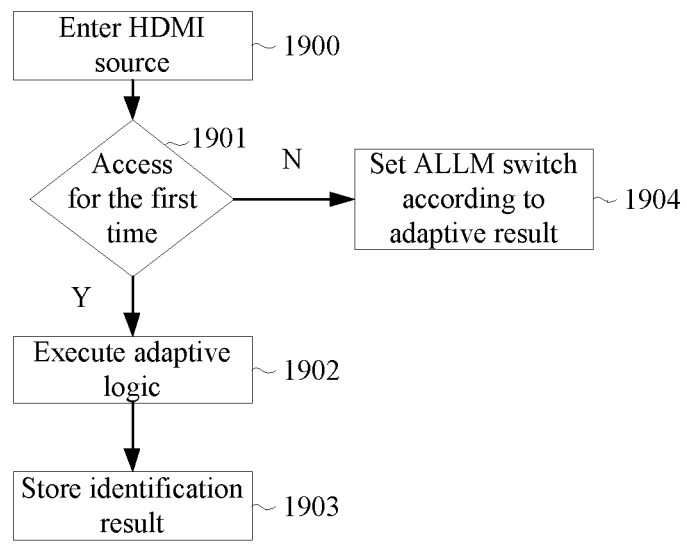
FIG. 19 is a schematic flowchart for determining the first access state according to one or more embodiments of the disclosure.

In some embodiments, when the external device is connected with the display apparatus for the first time, the adaptive logic may also be executed, and the recognition result may be saved. Therefore, FIG. 19 is a schematic flowchart of determining the first access state according to one or more embodiments of the disclosure. As shown in FIG. 19, when an external device is connected with the display apparatus, the display apparatus can firstly make a determination on the connected external device to determine whether the current external device is connected with the display apparatus for the first time (S1900: Enter HDMI source; and S1901: Access for the first time). If the external device is connected with the display apparatus for the first time, the SPD description information of the external device can be extracted, and the above determinations of the picture and sound quality parameters are performed, and the adjusted parameters are stored and recorded (S1902: Execute adaptive logic; and S1903: Store identification result). When the external device is connected with the display apparatus, the stored adjustment parameters can be directly called according to the device information to directly obtain the adaptive result if it is determined that the current external device is not connected with the display apparatus for the first time. In this case, the display apparatus can also set an ALLM switch according to the adaptive result, and execute different picture quality and sound quality adjustment programs according to the switch state of the ALLM (S1904: Set ALLM switch according to adaptive result).

In some embodiments, when the ALLM switch is in the on state, the display apparatus can detect the change of the ALLM state of the external device in real time through a thread loop. If the ALLM state changes to ALLM=1, then the video data and/or audio data from the external device is/are further obtained, so as to detect the usage scenario of the external device according to the data. For example, the display apparatus can obtain a game picture of the external device at this time, perform image analysis processing on the game picture to determine the game type to which the current game picture belongs, and set different picture quality and sound quality parameters according to different game types. For example, for shooting, sport and action game types, it is necessary to reduce the delay of the game picture to make the game experience smoother. If the ALLM state changes to 0, the processing on the picture quality and sound quality can be stopped, and the picture quality and sound quality parameters are restored to the user-defined values, so as to ensure the normal viewing experience of the user.

In some embodiments, when the ALLM switch is in the off state, the display apparatus cannot directly obtain the usage scenario of the external device according to ALLM part in the protocol, so the SPD information of the external device can be obtained. That is, if the media resource data from the external device contains the SPD information, the SPD information can be parsed, to obtain the device type of the external device firstly, and then select different picture quality and sound quality adjustment methods according to different types of external devices. For example, the display apparatus can determine whether the external device is a game device by parsing the SPD information. If the external device is a game device, the type of the currently-run game can be determined according to the game picture, and different picture quality and sound quality parameters can be set according to different game types. If the external device is not a game device, the picture quality and sound quality parameters can be restored to the user-defined values, so as to ensure the normal viewing experience of the user.

In some embodiments, the gaming device may run in the Variable Refresh Rate (VRR) mode. In the variable frame rate mode, the sending cycle of each frame is not fixed, but is synchronized according to the notification of the GPU, that is, the sending of the next frame must wait for the trigger signal of the GPU to complete the rendering of the current frame before proceeding. The sending frame rate in this case is dynamically changing to match with the rendering speed of the GPU, to finally realize the lossless transmission of the picture. External devices can implement different variable frame rate modes by running different rendering algorithms. For example, the variable frame rate mode applicable to the game device may include the Free Sync standard and the VRR standard, where the Free Sync standard and the VRR standard can establish a channel for transmitting a dynamic frame rate between the external device and the display apparatus, so that the display apparatus can dynamically adjust the screen refresh rate of the display apparatus according to the output frame rate of the external device. When the output frame of the graphics card of the external device is lower than the refresh rate of the display apparatus, the time between video frames can be forced to be extended, so that the display apparatus continues displaying the previous frame without any operation, and then allows the occurrence of frame delivery after completing the rendering of the graphics card. In this way, the refresh rate of the display apparatus can dynamically match with the output frame of the graphics card.

The ultimate goal of the two standards is to achieve the low-latency and tear-free transmission of pictures to the sink device by adjusting the output video frame rate. However, different variable frame rate modes can have their own characteristics. For example, the VRR standard mode supports the Quick Frame Transmission (QFT) technology, which can greatly reduce the transmission delay of the video content by reducing the time consumption of Vactive during picture transmission; and the Free Sync mode can quickly switch among signal formats such as Software Definition Radio (SDR), High-Dynamic Range (HDR) and Native Color without transient flash screen and blurred screen. In different variable frame rate modes, the characteristics of the media resource data sent from the external device to the display apparatus are also different, so it is necessary for the display apparatus to keep in the playing state adapting to the variable frame rate mode in order to obtain a better picture display effect. However, when the playing state of the display apparatus is not consistent with the variable frame rate mode of the external device, the variable frame rate mode will fail, and even the playing error will occur, reducing the playing quality.

In order to improve the playing quality of the display apparatus, some embodiments of the disclosure provide a display apparatus, including: a display, an external device interface, a memory, and a processor in connection the display, the external device interface and the memory. Here, the display is configured to present one or more images and/or one or more user interfaces from a broadcast system or network. The external device interface is configured to be connected with an external device to receive media resource data from the external device, the memory is configured to store computer instructions and data associated with the display, and the display is further configured to display a picture of the media resource data from the external device. The processor is configured to execute the computer instructions to perform a method of displaying a variable frame rate, so that both the display apparatus and the external device adopt a relative variable frame rate mode to improve the display effect.

Figure 20:
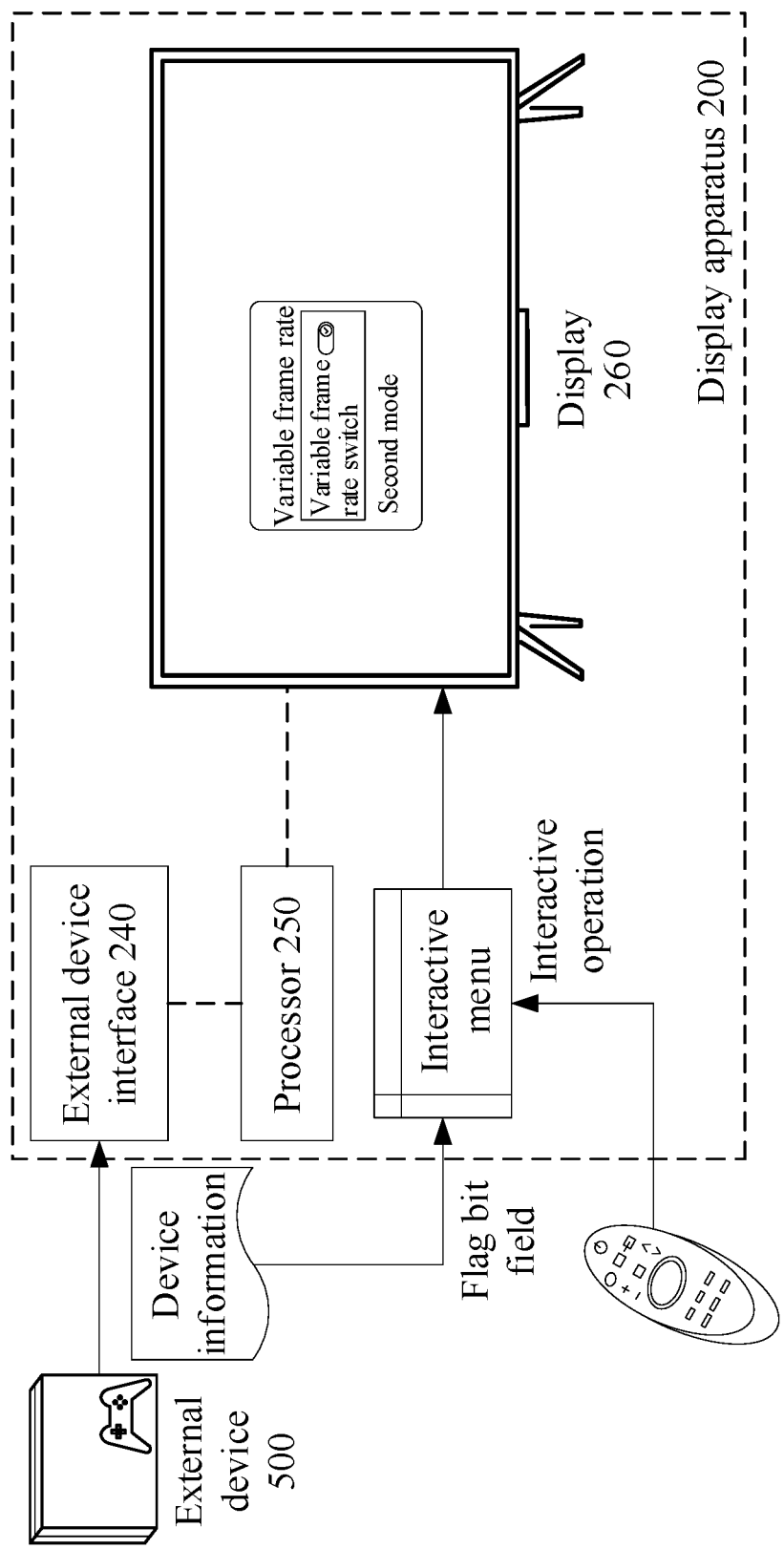
FIG. 20 is a schematic flowchart of a method of displaying a variable frame rate according to one or more embodiments of the disclosure.

In some embodiments, FIG. 20 is a schematic flowchart of a method for displaying a variable frame rate according to one or more embodiments of the disclosure. As shown in FIG. 20, the method of displaying the variable frame rate includes: obtaining the device information of the external device. After the external device 500 is connected with the external device interface 240 to establish a connection between the display apparatus 200 and the external device 500, the display apparatus can obtain the device information of the external device, where the device information may be used to indicate the variable frame rate mode supported by the external device. The device information can be added to the data transmitted from the external device to the display apparatus. For example, for the VRR standard mode, the external device can transmit its work state in the VRR standard mode in the Emergency Management Port (EMP) data packet. Therefore, after receiving the data from the external device, the display apparatus can extract the EMP packet data from the data, and extract the support situation of the external device for the variable frame rate mode from the EMP data packet.

In order to enable the display apparatus to obtain the device information of the external device, a data monitoring module for the external device interface can be run in the display apparatus, and the data monitoring module can detect the data received by the external device interface in real time to extract a specific package data from the received data, so as to obtain the device information of the external device by parsing the extracted data. In some embodiments, the display apparatus also supports to actively obtain the device information of the external device, that is, during use, the display apparatus can receive a control command for obtaining the device information, and then send an information obtaining request to the external device in response to the control command, so that the external device can feed back the supported variable frame rate mode according to the information obtaining request. By actively obtaining the device information of the external device, there is no need to transmit the device information-related data between the external device and the display apparatus, or the data obtaining requirement of the display apparatus can be met through the low-frequency device information data transmission, reducing the amount of data transmitted between the external device and the display apparatus.

Apparently, the above control command for obtaining the device information can also be used to activate the data monitoring module of the display apparatus. That is, during the normal data transmission process, the display apparatus can set the data monitoring module to remain in the sleep state, without detecting the data transmitted from the external device. When the user enters the control command for obtaining the device information, the data monitoring module is then activated to detect the received data within a set detection period, to obtain the device information of the external device. In some embodiments, the display apparatus may also obtain the device information of the external device in other ways. For example, when the external device accesses for the first time, the display apparatus can read the device information in the above way, and store the information table of the device in the database, so as to extract the device information of the external device directly from the database when the external device is connected with the display apparatus again, that is, the display apparatus can obtain the device information of the external device from the database.

After obtaining the device information of the external device, the display apparatus can parse the variable frame rate mode supported by the external device from the device information by traversing a flag bit field in the device information. For example, the display apparatus can read information such as "VRR-EN" from the byte: MD0, bit: 0 position of the EMP packet data, so as to determine the VRR standard mode supported by the current external device. Similarly, the display apparatus can read the flag bit field from the device description (Specific Product Description (SPD)) packet data from the external device, and determine that the current external device supports the Free Sync mode after reading that the byte: PB6, bit: 2 position includes the "Free Sync Active" field. It should be noted here that the VRR standard mode and the Free Sync mode can also be referred to as work mode and variable frame rate mode.

According to different device types of external devices, the variable frame rate modes supported by the external devices obtained through the flag bit field of the device information are also different. That is, some external devices do not support variable frame rate mode, some external devices support only one variable frame rate mode, and some external devices can support a plurality of variable frame rate modes. Therefore, after parsing and obtaining the variable frame rate mode supported by the external device, the display apparatus can set a playing mode adapting to the variable frame rate mode currently used by the external device according to the parsing result. That is, after obtaining the variable frame rate mode supported by the external device, the display apparatus can control the display to present an interactive menu. The interactive menu can be used for the user to perform interactive operations such as selection operation, and is used to select the playing mode adapting to the variable frame rate mode of the external device, so the at least one option of the variable frame rate mode can be included in the interactive menu.

Figure 21:
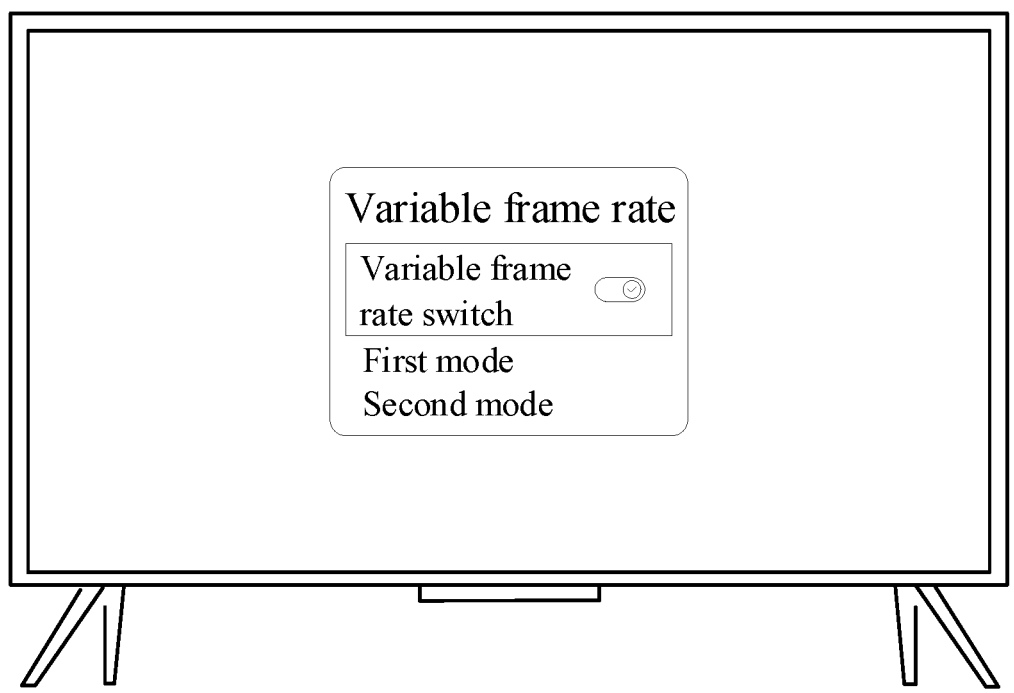
FIG. 21 is a schematic diagram of an interactive menu including two mode options according to one or more embodiments of the disclosure.

After the interactive menu is displayed, the display apparatus may receive an interactive operation from the user through the interactive menu within a display period of the interactive menu. For example, FIG. 21 is a schematic diagram of an interactive menu including two mode options according to one or more embodiments of the disclosure. As shown in FIG. 21, after parsing that the external device supports the VRR standard mode and Free Sync mode, the display apparatus can display the interactive menu with the VRR standard mode option and Free Sync mode option through the display. The user can select one of the VRR standard mode option and Free Sync mode option through the interactive menu. When the variable frame rate mode currently used by the external device is the VRR standard mode, the user can select the VRR standard mode option in the interactive menu. After receiving the interaction action from the user through the interaction menu, the display apparatus can set the display parameter of the display apparatus according to the variable frame rate mode specified by the interaction operation. For example, when the user's interactive operation specifies that the VRR standard mode option is selected, the display apparatus may, in response to the interactive operation, control the display apparatus to adjust the current display parameter to a form adapting to the VRR standard mode. That is, in order to adapt to the VRR standard mode to support the Quick Media Select (QMS) of VRR and non-VRR signals and support the Quick Frame Transport (QFT) characteristic under the VRR signal, the display apparatus can turn off the (Motion Estimation and Motion Compensation (MEMC) and other picture quality processing functions that can generate the relatively large delay, and switch the decoding mode of the video frames in the video signal to adapt to the video frame signal with an extremely short period that may be from the VRR signal.

Through the user's interactive operation, the display apparatus can accurately obtain the picture display mode that adapts to the external device, that is, the user can uniformly set the variable frame mode on the external device and the display apparatus, so that the media resource data of the variable frame rate from the external device to the display apparatus can be played correctly on the display apparatus, alleviating the phenomenon of picture tearing at individual time points due to factors such as rendering time. In some embodiments described above, the display apparatus can enable the user to set the display parameter of the display apparatus according to the variable frame rate mode of the external device by displaying the interactive menu.

Figure 22:
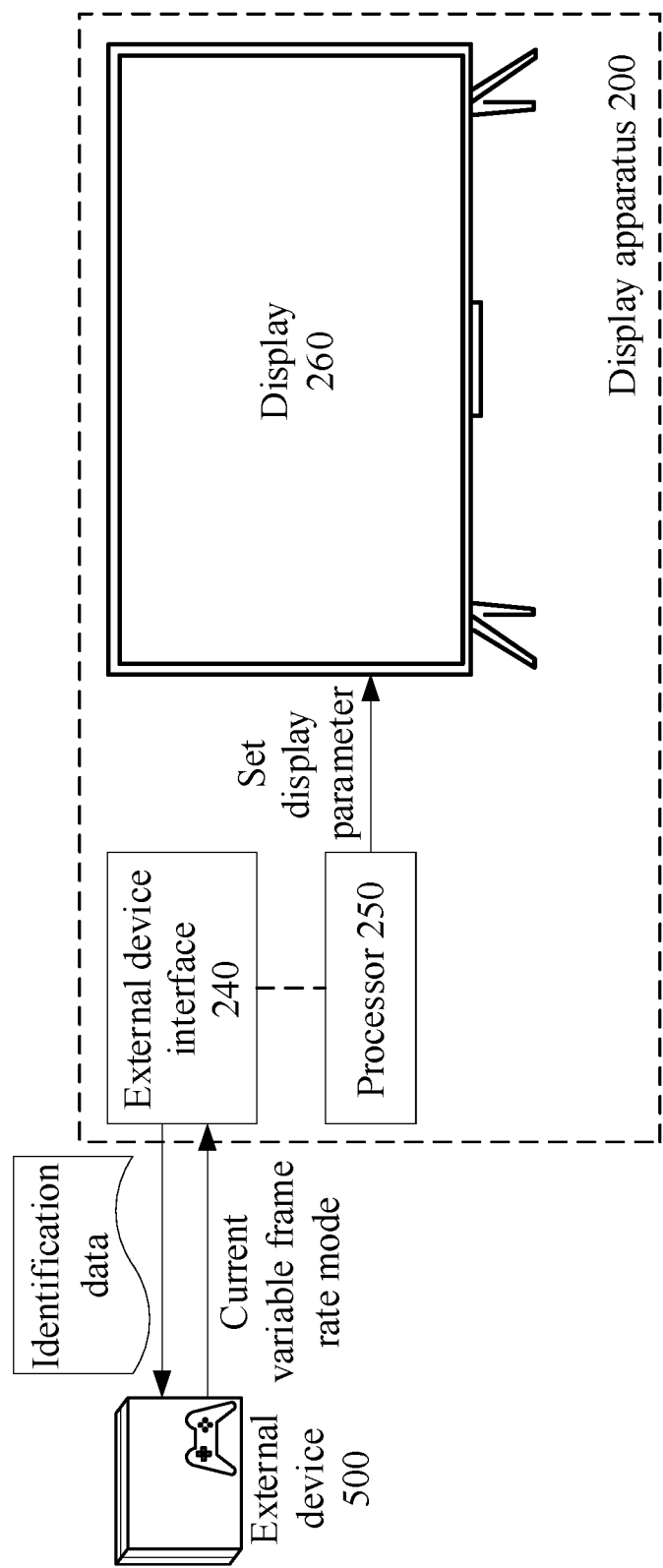
FIG. 22 is a schematic flowchart for automatically identifying the current variable frame rate mode according to one or more embodiments of the disclosure.

In order to adapt to the media resource data transmission process of the external device, the display apparatus can also automatically detect the current variable frame rate mode of the external device according to the set detection frequency in some embodiments. FIG. 22 is a schematic flowchart for automatically determining the current variable frame rate mode according to one or more embodiments of the disclosure. As shown in FIG. 22, the display apparatus 200 can send identification data to the external device 500 to cause the external device 500 to feed back the current variable frame rate mode. The identification data from the display apparatus to the external device may be a type of Extended Display Identification Data (EDID) configured with a field for describing the variable frame rate mode supported by the display apparatus. For example, when the display apparatus supports the VRR standard mode, the display apparatus may specify that it supports the VRR standard mode in the High Frequency Vendor Specific Data Block (HF-VSDB) field in the EDID.

Figure 23:
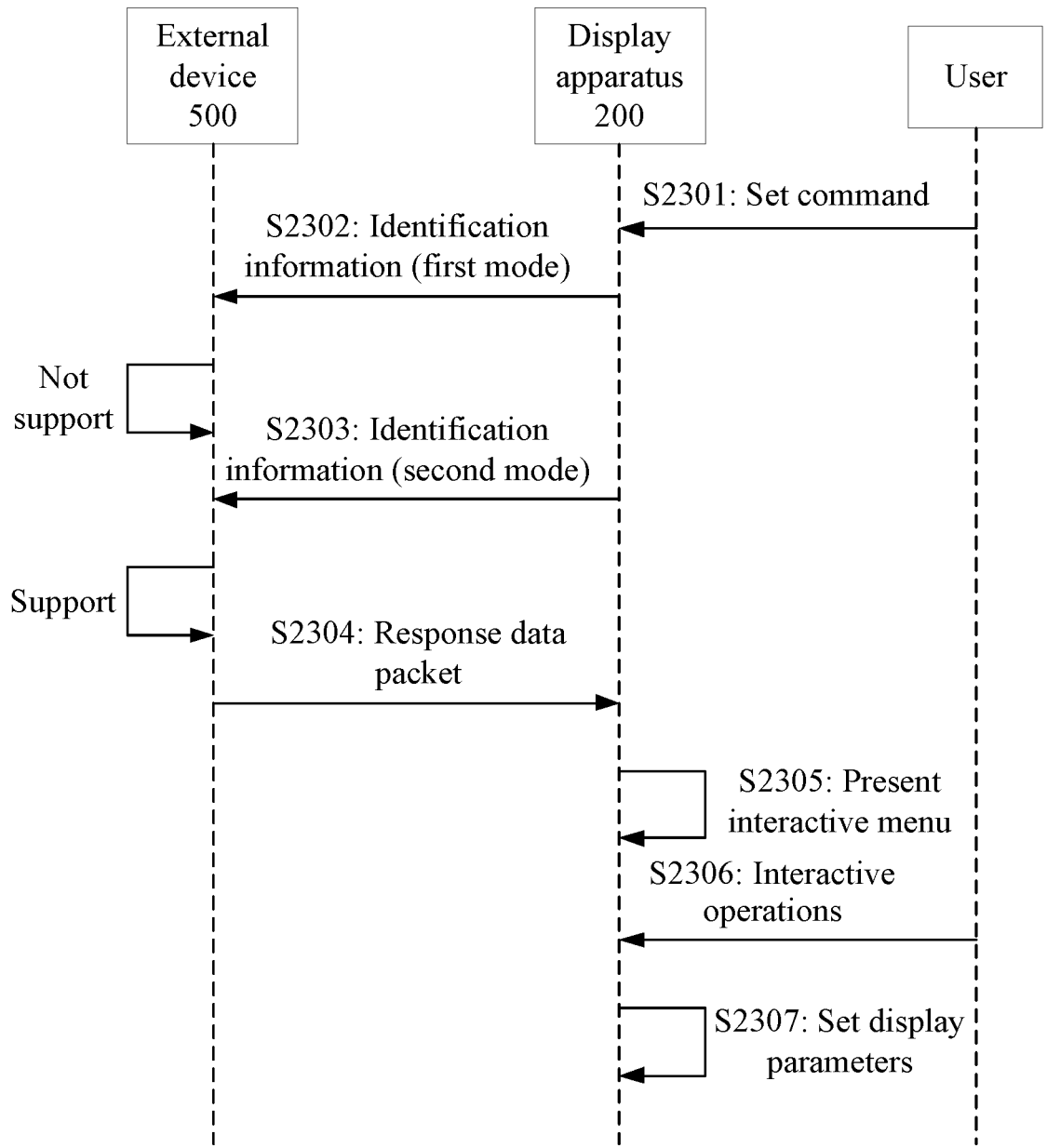
FIG. 23 is a flowchart for detecting a variable frame rate mode supported by an external device according to one or more embodiments of the disclosure.

The display apparatus can design multiple sets of EDIDs for different variable frame rate modes, and configure them for different variable frame rate mode requirements respectively. For example, when the display apparatus supports the Free Sync mode, the display apparatus can configure the detailed information specifying that it supports Free Sync in the Vendor Specific Data Block (VSDB) field. After the identification data is sent to the external device, the external device may feed back a response data packet for the corresponding identification data according to the supported variable frame rate mode. For example, FIG. 23 is a flowchart of detecting the variable frame rate mode supported by the external device according to one or more embodiments of the disclosure. As shown in FIG. 23, the external device sequentially reads multiple sets of EDIDs from the display apparatus. If the external device can correctly send a corresponding data packet for any EDID, it indicates that the external device supports the variable frame rate mode.

In some embodiments, as shown in FIG. 23, the flowchart of detecting the variable frame rate mode supported by the external device includes the following operations.

S2301: a setting command is input to the display apparatus 200.

S2302: the display apparatus 200 sends identification information (first mode) to the external device 500.

S2303: if the external device 500 does not support the first mode, the display apparatus 200 sends identification information (send mode) to the external device 500.

S2304: if the external device 500 supports the second mode, the external device 500 sends the response data packet to the display apparatus 200.

S2305: the display apparatus 200 presents the interactive menu.

S2306: interactive operations are performed with the display apparatus 200.

S2307: the display apparatus 200 sets display parameters.

In some embodiments, the display apparatus can obtain the current variable frame rate mode of the external device by receiving a response data packet fed back by the external device for the identification data. For example, when the received response data packet is a response data packet fed back by the external device for the EDID with an HF-VSDB field added with the VRR standard mode information, it can be determined that the current variable frame rate mode of the current external device is the VRR standard mode; when the received response data packet is a response data packet fed back by the external device for the EDID with a VSDB field added with the Free Sync mode information, it can be determined that the current variable frame rate mode of the current external device is the Free Sync mode. After determining the current variable frame rate mode of the external device, the display apparatus can automatically set the display parameter of the display apparatus according to the current variable frame rate mode of the external device, to adapt to the variable frame rate mode of the external device. It can be seen that the display apparatus in this embodiment can detect the current variable frame rate mode of the external device according to the set frequency, monitor the variable frame rate mode of the external device continuously, and adjust the display parameter automatically to adapt to the external device after obtaining the current variable frame rate mode, to obtain the better output effect.

Obviously, in addition to the above method of sending the identification data to the external device according to the set frequency, in order to enable the display apparatus to adapt to the variable frame rate mode of the external device in time, a plurality of key time points can also be determined, so that the identification data is sent to the external device when detecting that the running state of the external device meets a key time point, to detect the current variable frame rate mode of the external device. Here, the key time point may be a time point when the external device accesses initially or establishes connection with the display apparatus for the first time, a time point when the content from the media resource of the external device is changed, or a time point when the external device may change the variable frame rate mode. By executing the above display parameter adjustment at the key time point, when the external device changes the variable frame rate mode, the display apparatus can adjust the display parameter in time to adapt to the changed variable frame rate mode.

When the display apparatus parses the results of different variable frame rate modes supported by the external device, the display apparatus may present interactive menus in different forms. That is, in some embodiments, the display apparatus can traverse the number of variable frame rate modes supported by the external device when controlling the display to display the interactive menu. Then the number of options in the interactive menu is controlled according to the number of variable frame rate modes obtained by traversal. If the number of variable frame rate modes determined by traversal is greater than or equal to 1, the options of the variable frame rate modes supported by the external device are added to the interaction menu.

In some embodiments, the device information includes the first package data and the second package data; the variable frame rate modes include a first mode and a second mode, and the display apparatus can obtain a traversal result of a flag bit field in the device information, and a feature field; if the flag bit of the first package data contains the feature field for describing the first mode, the first mode option is added to the interactive menu; if the flag bit of the second package data contains the feature field for describing the second mode, the second mode option is added to the interaction menu. For example, the first packet data is the response data packet fed back by the external device for the EDID with the HF-VSDB field added with the VRR standard mode information, and correspondingly the VRR standard mode is the first mode; the second packet data is the response data packet fed back by the external device for the EDID with the VSDB field added with the Free Sync mode information, and correspondingly the Free Sync mode is the second mode. Then the display apparatus can traverse the number of received response data packets after receiving the response data packets fed back by the external device. When the display apparatus receives the first packet data and the second packet data respectively, the display apparatus can determine that the current external device supports two variable frame rate modes: VRR standard mode and Free Sync mode. In this case, two options of "VRR standard mode" and "Free Sync mode" can be displayed in the interactive menu.

Figure 24:
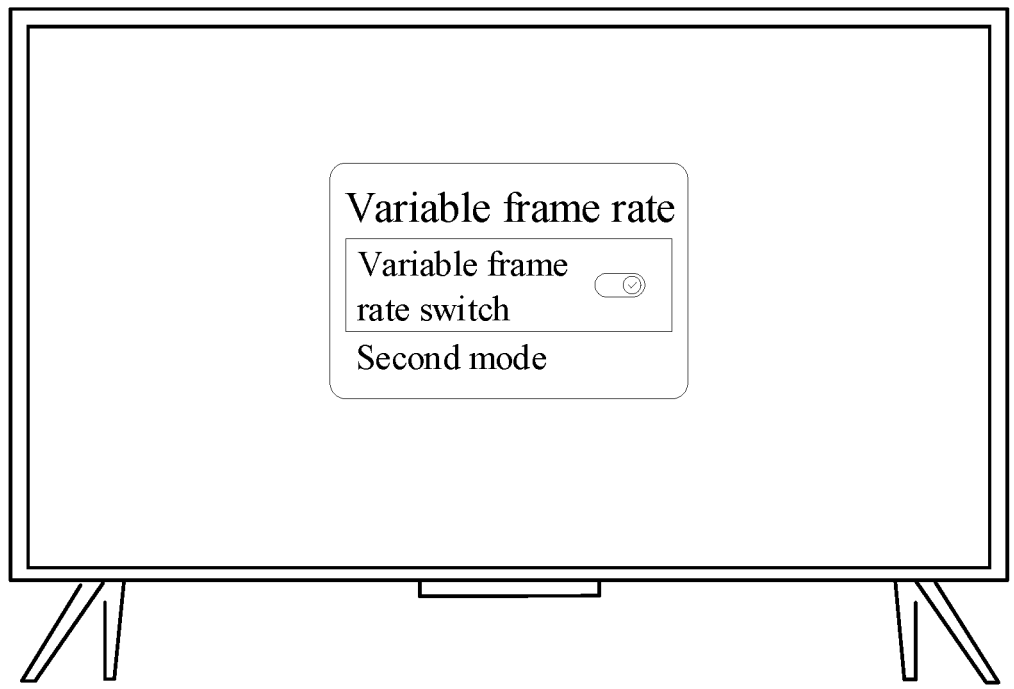
FIG. 24 is a schematic diagram of an interactive menu including a second mode option according to one or more embodiments of the disclosure.
Figure 25:
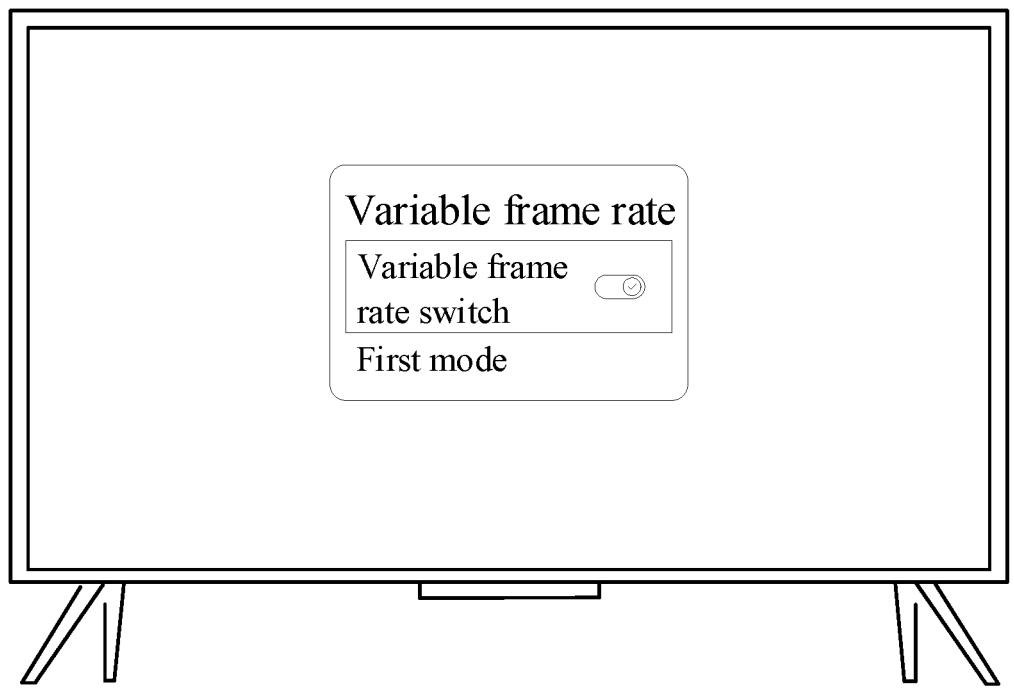
FIG. 25 is a schematic diagram of an interactive menu including a first mode option according to one or more embodiments of the disclosure.
Figure 26:
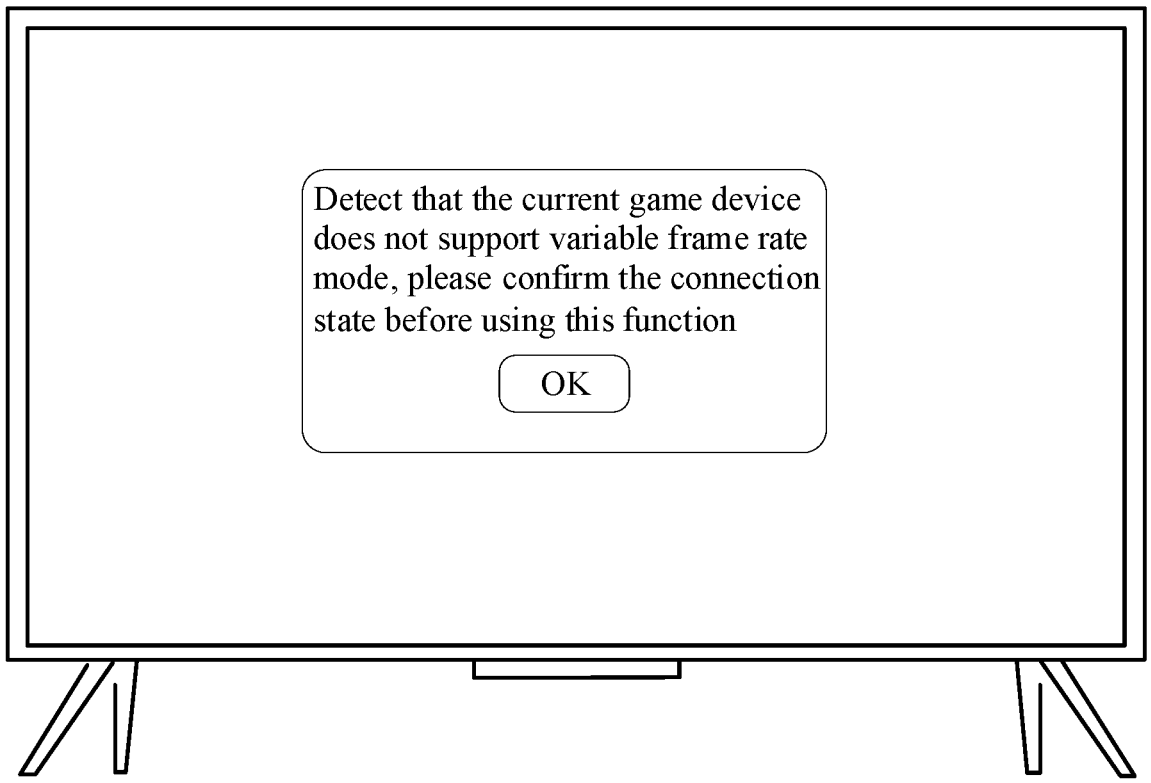
FIG. 26 is a schematic diagram of an interactive menu of the external device that supports no variable frame rate mode according to one or more embodiments of the disclosure.

If the number of variable frame rate modes supported by the external device is 1, that is, when the display apparatus only receives the second packet data, the display apparatus can determine that the current external device supports one variable frame rate mode: Free Sync mode, so only one option of "Free Sync mode" can be displayed on the interactive menu. FIG. 24 is a schematic diagram of the interactive menu including the second mode option, as shown in FIG. 24. Similarly, when the display apparatus only receives the first packet data, and when it is determined according to the response data packet that the external device only supports one variable frame rate mode: VRR standard mode, only one option of "VRR standard mode" can be displayed in the interactive menu. FIG. 25 is a schematic diagram of the interactive menu including the first mode option, as shown in FIG. 25. When the display apparatus receives no response data packet from the external device, the display apparatus can determine that the current external device supports no variable frame rate mode, that is, the number of variable frame rate modes is equal to 0. In this case, the display apparatus can prompt the user through the interactive menu that the current external device supports no variable frame rate mode, that is, add a prompt text in the interactive menu. FIG. 26 is a schematic diagram of an interactive menu of the external device that supports no variable frame rate mode. As shown in FIG. 26, the added prompt text may be: "Detect that the current game device does not support variable frame rate mode, please confirm the connection state before using this function", etc.

In some embodiments, before sending the identification data to the external device, the display apparatus may firstly generate the identification data, that is, detect the variable frame rate mode supported by itself. If the display apparatus supports the first mode, a field for describing the first mode is configured in the first flag bit of the identification data; if the display apparatus supports the second mode, a field for describing the second mode is configured in the second flag bit of the identification data.

Figure 27:
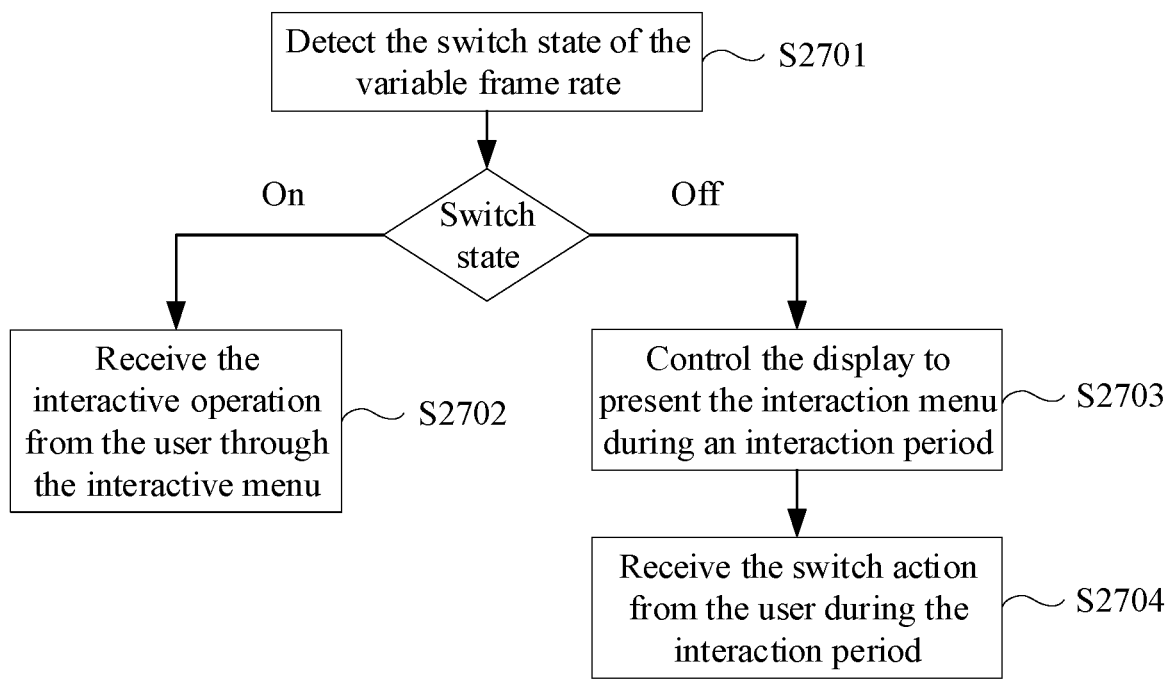
FIG. 27 is a schematic diagram of a switch state operation according to one or more embodiments of the disclosure.

In some embodiments, in addition to the above options for indicating the variable frame rate modes, the interactive menu may also include a switch for turning on or turning off variable frame rate for controlling whether the display apparatus starts a corresponding playing parameter mode. Therefore, FIG. 27 is a schematic diagram of a switch state operation according to one or more embodiments of the disclosure. As shown in FIG. 27, when the interactive menu is presented, the display apparatus can also detect the switch state of the variable frame rate (S2701). If the switch state is on, the step of receiving the interactive operation from the user through the interactive menu is performed (S2702), so as to set the playing parameter according to the interactive action from the user. If the switch state is off, the display may be controlled to present the interaction menu during an interaction period (S2703), to receive the switch action from the user during the interaction period (S2704). When the user inputs the switch action during the interaction period to turn on the display apparatus to adapt to the variable frame rate mode, the display apparatus receives the user's interaction action for the option of the variable frame rate mode, to adjust the display parameter according to the variable frame rate mode selected by the user.

When the user inputs no switch action during the interaction period, the display apparatus may stop displaying the interaction menu after displaying the interaction menu for a certain period of time, and continue to output the media resource data from the external device according to the original display parameter. For example, without affecting the user's normal viewing process, the interaction period is 5 s to 10 s, that is, the display apparatus can display the interactive menu for 5 s to 10 s after obtaining the variable frame rate mode supported by the external device. If the user inputs the switch action for turning on during the display of the interaction menu, the display time of the interactive menu can be extended, so as to receive the interactive action from the user for the option of the variable frame rate mode. The interaction menu is no longer displayed until the user selects the variable frame rate mode, while the display parameter of the display apparatus is adjusted to the state adapting to the selected variable frame rate mode.

In some embodiments described above, the first mode refers to the VRR standard mode or a mode that supports fast switching of media resource signal and fast frame transmission; and the second mode refers to the Free Sync mode or a mode that has a higher input delay requirement and requires a higher brightness effect for video in the HDR format. Therefore, in order to enable the display apparatus to adapt to the variable frame rate mode of the external device, the display apparatus can set the display parameter by reading the variable frame rate mode specified by the interactive operation when setting the display parameter in some embodiments.

If the interactive operation specifies the second mode, a real-time frame rate value is obtained, and a video signal is displayed according to the real-time frame rate value. The display apparatus can also close the frame buffer mechanism of the video image, so as to reduce the sending and receiving delays of the video signal. At the same time, the dynamic backlight function is turned off, and the backlight brightness of the display is adjusted to the highest state to improve the performance effect of HDR. For example, after determining that the user specifies the Free sync mode, the buffer mechanism of the video image can be turned off, that is, the PQ Bypass can be turned off, to ensure the minimum delay between signal in and out. Meanwhile, all dynamic backlight functions of the display apparatus are automatically turned off, and the backlight brightness is set to the brightest state, to ensure that the signal in the HDR format has a better performance effect under free sync. The display apparatus can also obtain the real-time frame rate value and dynamically display the frame rate value through the UI.

If the interactive operation specifies the first mode, the signal lock mechanism and the decoding mode are switched to adapt to the short-period video signal. In this case, the display apparatus can also turn off the high-latency picture quality processing function. For example, after determining that the user specifies the VRR standard mode, the display apparatus can retain the frame buffer mechanism of the video image, and ensure that there is no transient process of signal interruption when switching between the VRR signal and non-signal by turning off the MEMC and other picture quality processing functions that cause a large delay while switching the signal lock mechanism. The display apparatus can also switch the decoding mode of the HDMI module for video vactive, so as to adapt to the very short-period vactive signal that may be from the VRR signal.

In order to enable the display apparatus to quickly obtain the variable frame rate mode supported by the external device, the display apparatus can store the information about each connected external device to obtain the variable frame rate mode of the external device directly from the stored information when the external device is connected again or later in some embodiments. Therefore, when the external device is connected for the first time, the display apparatus can automatically send the identification data to the external device, where the identification data is configured with a field for describing the variable frame rate mode supported by the display apparatus. Then the response data packet fed back by the external device for the identification data is received to obtain the current variable frame rate mode of the external device, so as to set the display parameter of the display apparatus according to the current variable frame rate mode of the external device. The display apparatus stores the information on the variable frame rate mode supported by the external device in the database, so that the display apparatus can obtain the variable frame rate mode supported by the external device directly from the database when connecting to the external device subsequently.

Based on this, when receiving a control command for obtaining the device information, the display apparatus can firstly detect whether the external device is connected for the first time; and if so, the display apparatus can obtain the variable frame rate mode supported by the external device from the device information in the ways described in some above embodiments. If the external device is not connected for the first time, the variable frame rate mode supported by the external device can be searched in the database according to the identification information such as a device ID of the external device, so as to display different options in the interactive interface according to different search results.

Some embodiments of the disclosure further provide a work mode setting method of a display apparatus, including: obtaining device information of the external device; parsing work modes supported by the external device from the device information by traversing a flag bit field in the device information; causing the display to present an interactive menu, and receiving an interactive operation from a user through the interactive menu, where the interactive menu includes an option of at least one of the work modes; and setting a display parameter of the display apparatus according to a variable frame rate mode specified by the interactive operation.

In some embodiments, when the display is controlled to present the interactive menu, the number of work modes supported by the external device is traversed; if the number of work modes is greater than or equal to 1, the options of the work modes supported by the external device are added to the interactive menu; if the number of work modes is equal to 0, a prompt text is added to the interactive menu.

In some embodiments, the device information includes the first package data and the second package data; the work modes include a first mode and a second mode; if the number of work modes is equal to 1, the method further includes: obtaining a traversal result of a flag bit field in the device information; adding a first mode option to the interactive menu if a flag bit of the first package data contains a feature field for describing the first mode; and adding a second mode option to the interaction menu if a flag bit of the second package data contains a feature field for describing the second mode.

In some embodiments, when setting the display parameter of the display apparatus, the work mode specified by the interactive operation is read; if the interactive operation specifies the first mode, the signal lock mechanism and decoding mode are switched to adapt to a short-period video signal; if the interactive operation specifies the second mode, a real-time frame rate value is obtained, and a video signal is displayed according to the real-time frame rate value.

In some embodiments, after reading the work mode specified by the interactive operation, if the interactive operation specifies the first mode, the high-delay picture quality processing function is turned off; if the interactive operation specifies the second mode, the frame buffer mechanism of the video picture is turned off to reduce the sending and receiving delays of the video signal.

In some embodiments, when the display apparatus is connected with the external device, the display apparatus also has a VRR function and an FVA function, in order to improve the user's experience. Here, the VRR (Variable Refresh Rate) function can effectively solve the screen tearing or freezing phenomenon. In some embodiments of the disclosure, the VRR function is denoted as the first function. The FVA (Fast VActive) function can reduce the delay between the display apparatus and the external device. In some embodiments of the disclosure, the FVA function is denoted as the second function. The user can control the display apparatus to enable the VRR function and/or the FVA function to achieve different experience effects. The display apparatus can also have a picture quality adjustment function and a sound effect adjustment function. The picture quality degree of the picture played by the display apparatus can be controlled by the picture quality adjustment function, for example, the picture quality is adjusted to high picture quality, medium picture quality or low picture quality to meet the user requirement. Through the sound effect adjustment function, the audio played by the display apparatus can be set to different sound effects, such as Dolby sound effect or DPS sound effect.

In some embodiments, the display apparatus can be configured with different work modes. In different work modes, the display apparatus can enable different functions to meet different requirements of the user. The display apparatus can be configured with a high performance mode. When the display apparatus is in the high performance mode, the display apparatus will turn on the VRR function and the FVA function at the same time, which can effectively prevent screen tearing or freezing, and reduce the delay between the display apparatus and the external device, so that the display apparatus is in the high performance state. In some embodiments of the disclosure, the high performance mode is denoted as the first work mode. The display apparatus can be configured with a VRR mode and an FVA mode. When the display apparatus is in the VRR mode, the display apparatus will only enable the VRR function and not enable the FVA function. When the display apparatus is in the FVA mode, the display apparatus will only enable the FVA function and not enable the VRR function. In some embodiments of the disclosure, the VRR mode is denoted as the second work mode, and the FVA mode is denoted as the third work mode. The display apparatus can also be configured with an energy saving mode. When the display apparatus is in the energy saving mode, the VRR function and the FVA function will be turned off at the same time, thereby saving the energy consumption. In some embodiments of the disclosure, the energy saving mode is denoted as the fourth work mode. The display apparatus can also be configured with an adaptive mode. When the display apparatus is in the adaptive mode, the display apparatus can automatically determine whether to enable various functions according to the external device. For example, when detecting that the external device has enabled a certain function, the display apparatus may also enable the corresponding function. The display apparatus can also be configured with a specific picture quality mode or sound effect mode, etc.

In some embodiments, the display apparatus can detect the video data and/or audio data from the external device, so as to determine the usage scenario information of the external device, and adjust its own output mode according to the usage scenario information, for example, adjust the work mode or function, etc.

Figure 28:
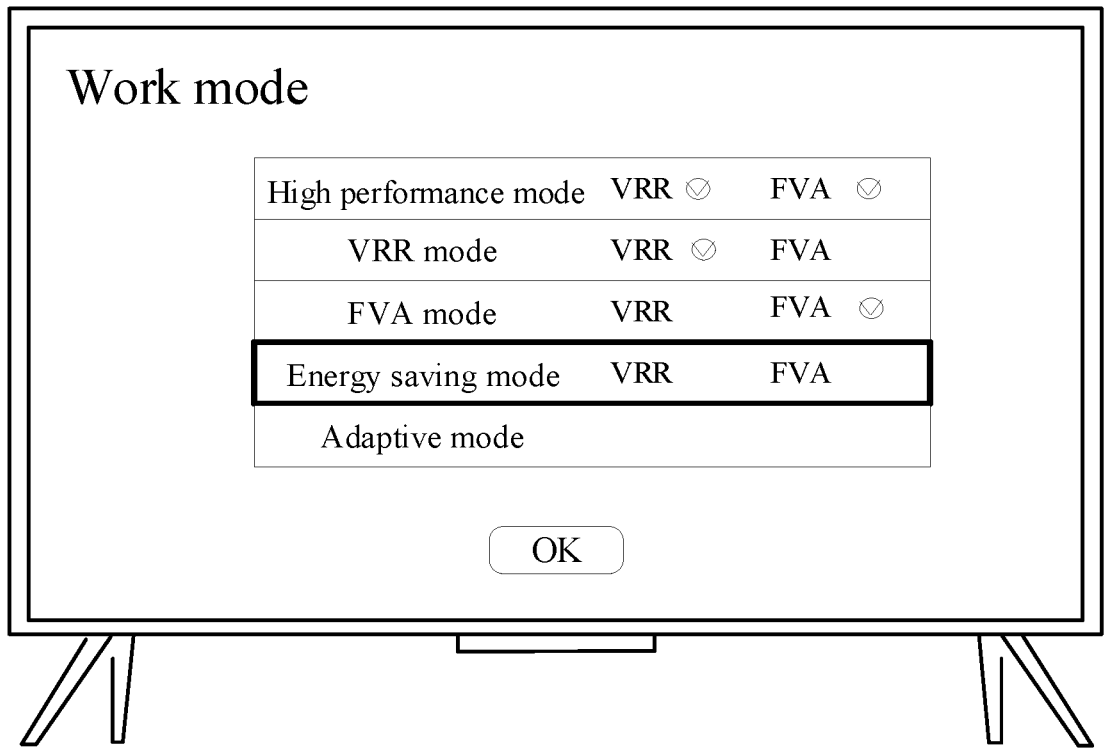
FIG. 28 is a schematic diagram of a work mode interface according to one or more embodiments of the disclosure.

In some embodiments, the user may send a query command for query the work mode to the display apparatus, so as to set the work mode of the display apparatus. After receiving the query command, the processor can control the display to present the work mode interface. FIG. 28 is a schematic diagram of a work mode interface according to one or more embodiments of the disclosure, where the work mode interface includes work modes supported by the display apparatus and the current work mode of the display apparatus. The user can touch or click the work mode interface to select a certain work mode, and the processor can control the display apparatus to enter the work mode selected by the user.

Figure 29:
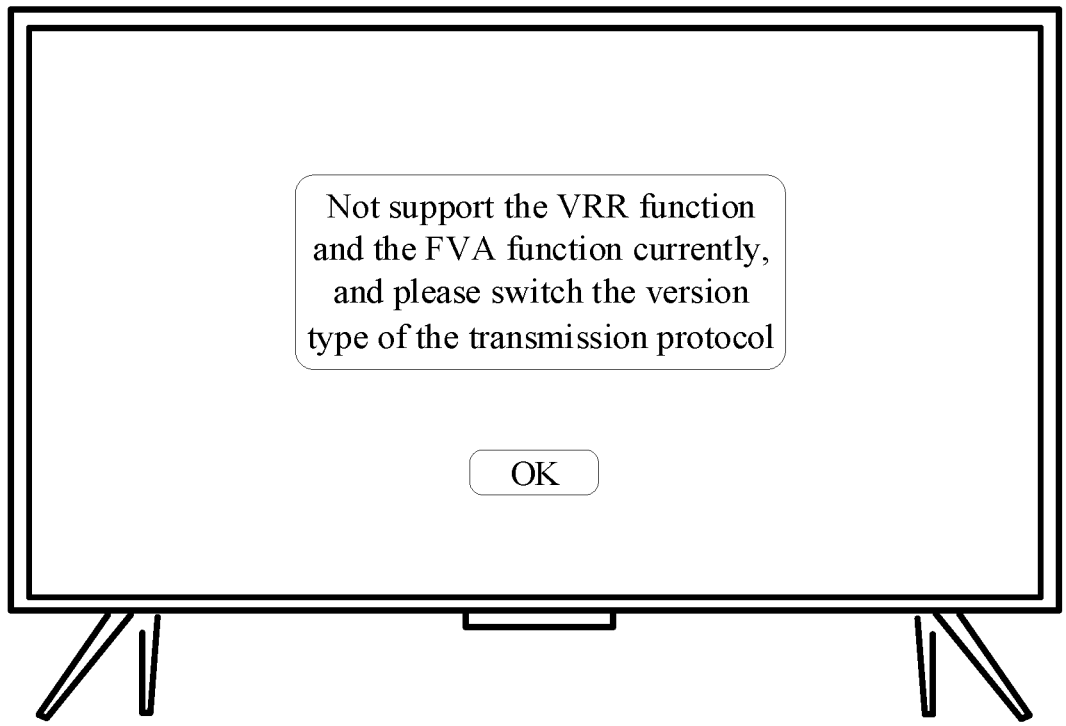
FIG. 29 is a schematic diagram of a first prompt interface according to one or more embodiments of the disclosure.

In some embodiments, the version of the transmission protocol of the display apparatus may not support the VRR function and the FVA function, therefore, when receiving the query command from the user, the processor may firstly obtain the version type of the current transmission protocol of the display apparatus. Taking the HDMI transmission protocol as an example, the transmission protocol can be divided into a plurality of version types according to the iterative order of version update. In some embodiments of the disclosure, the first type of version refers to the HDMI enhanced version, i.e., a newer version in the transmission protocol, which may be HDMI 2.0 and HDMI 2.1, or a new version that will be released later. In some embodiments of the disclosure, the second type of version is used to refer to the HDMI standard version, and is a version other than the first type of version, i.e., the traditional version in the transmission protocol, which may be HDMI 1.0 and HDMI 1.4. If it is detected that the transmission protocol is the first type of version, it is determined that the current transmission protocol of the display apparatus supports the VRR function and the FVA function, and in this case, the processor can control the display to present the work mode interface. If the transmission protocol is the second type of version, it is determined that the current transmission protocol of the display apparatus does not support the VRR function and the FVA function, and in this case, the processor can control the display to show a first prompt interface. FIG. 29 is a schematic diagram of a first prompt interface according to one or more embodiments of the disclosure, where the first prompt interface is used to prompt the user that the display apparatus currently does not support the VRR function and the FVA function. If the user wants to use the VRR function and the FVA function, it is necessary to switch the transmission protocol of the display apparatus to the first type of version. It should be noted that the external device may continuously send the VRR signal and/or FVA signal value to the display apparatus when the display apparatus turns on the VRR function and/or FVA function. Once the signal sent from the external device is not a standard signal, the display apparatus is abnormal and cannot work normally, so the display apparatus needs to detect whether the signal from the external device is standard, and then decide whether to enter the corresponding work mode.

In some embodiments, the display apparatus has an external device detection function. When the user selects a work mode, the display apparatus can detect the external device to determine whether the signal from the external device is standard and whether the external device has enabled the corresponding function, so as to meet the requirement of the current work mode. Specifically, the display apparatus can be configured with an external device detection mode. In the external device detection mode, the display apparatus can detect the external device for the work mode selected by the user.

In some embodiments, the user can send a command for detecting the mode of the external device mode to the display apparatus by operating a certain key on the remote control. In some embodiments, the correspondence between the command for detecting the mode of the external device and a key on the remote control is bound in advance. It may establish the correspondence between the command for detecting mode of the external device and a plurality of keys on the remote control in advance. When the user touches the plurality of keys associated with the command for detecting the mode of the external device, the remote control sends the command for detecting the mode of the external device. In some embodiments, the user can use a sound collector (such as microphone) of the display apparatus, and send the command for detecting the mode of the external device to the display apparatus through voice input, so as to control the display apparatus to enter the external device detection mode. In some embodiments, the user may send the command to the display apparatus through a preset gesture. In some embodiments, when the user uses a smart device to control the display apparatus, the command may also be sent to the display apparatus via the smart device. The option of the external device detection mode can also be set on the UI interface of the display apparatus. When the user selects this option, the display apparatus can be controlled to enter or exit the external device detection mode.

Figure 30:
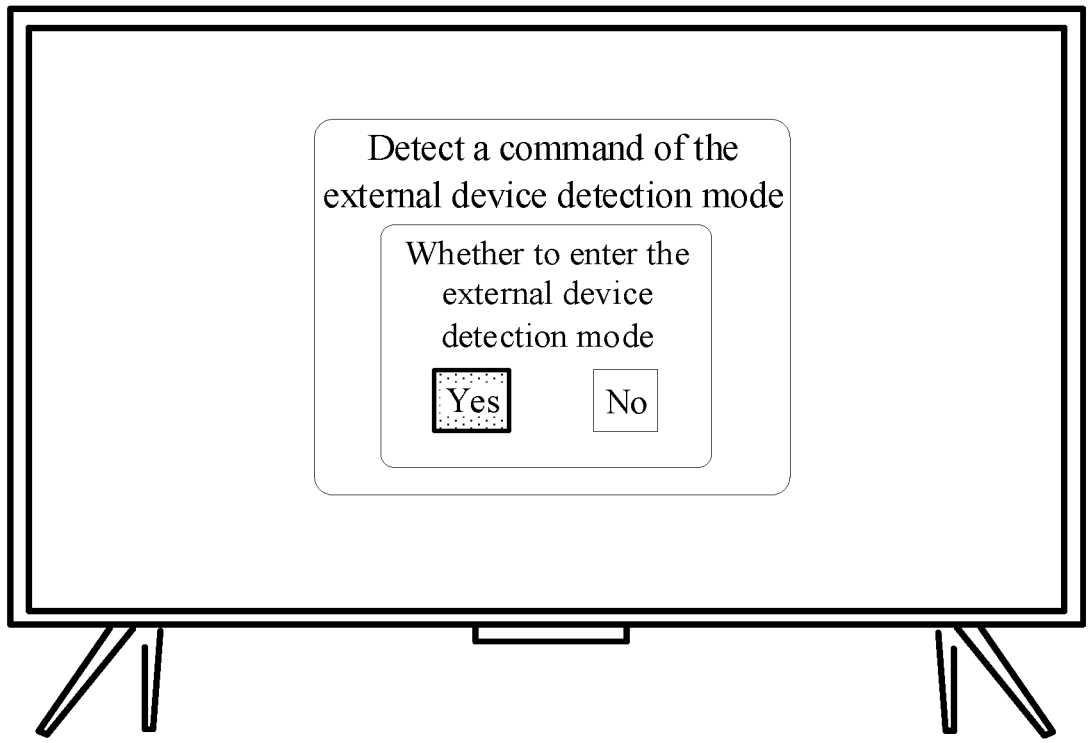
FIG. 30 is a schematic diagram for displaying the confirmation information of the external device detection mode in the display according to one or more embodiments of the disclosure.

In some embodiments, FIG. 30 is a schematic diagram of displaying the confirmation information of the external device detection mode on the display according to one or more embodiments of the disclosure. As shown in FIG. 30, in order to prevent the user from accidentally selecting the external device detection mode, the processor can control the display to present the confirmation information of the external device detection mode when receiving the command for detecting the mode of the external device, so that the user confirms twice whether to control the display apparatus to enter the external device detection mode.

Figure 31:
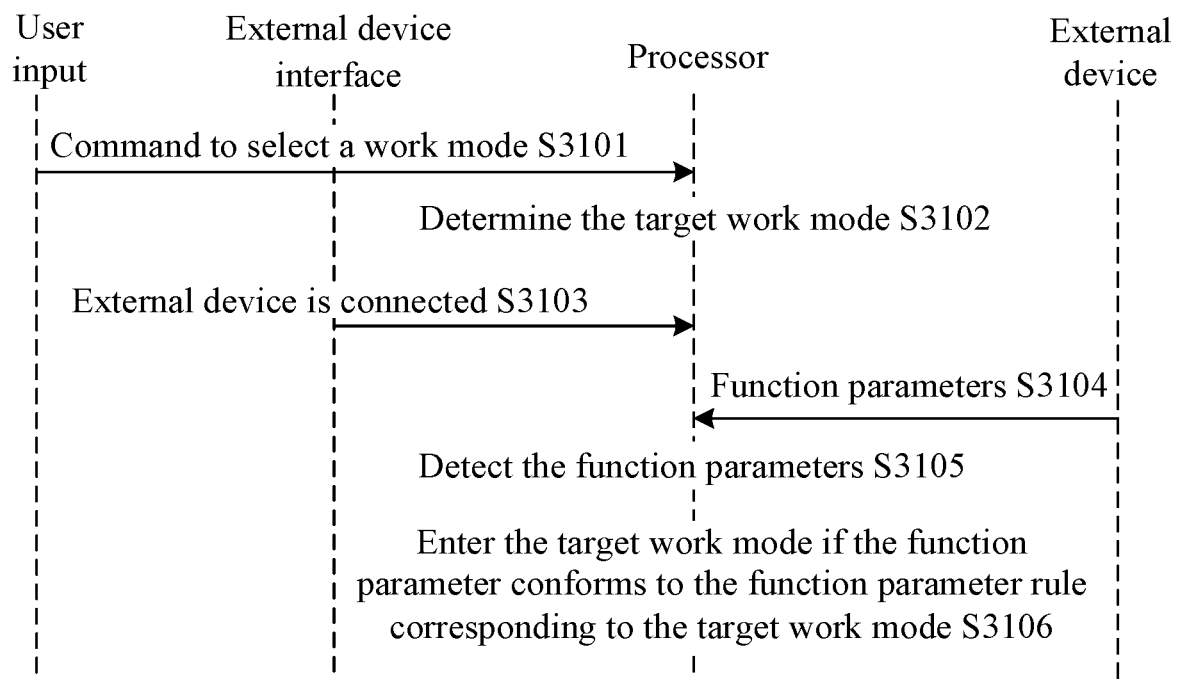
FIG. 31 is an interaction flowchart of components of the display apparatus according to one or more embodiments of the disclosure.

In some embodiments, when the display apparatus enters the external device detection mode, the user can select one of the work modes, and the display apparatus can detect the external device to determine whether to enter this work mode. FIG. 31 is an interaction flowchart of components of the display apparatus according to one or more embodiments of the disclosure. As shown in FIG. 31, in some embodiments, when the display apparatus is in the external device detection mode, the user can select a work mode (S3101), and in this case, the processor can determine the target work mode (S3102) selected by the user and set the HF-VSDB field of the display apparatus to adjust the function currently supported by the display apparatus. The HF-VSDB field may include four parameters: A, B, C, and D, where the parameter A and parameter B indicate minimum and maximum refresh rates allowed by the display apparatus respectively; the parameter C indicates whether the display apparatus supports the VRR function, where the parameter C indicates that the display apparatus currently supports the VRR function when the parameter C is set to 1; and the parameter D indicates whether the display apparatus supports the FVA function, where the parameter D indicates that the display apparatus currently supports the FVA function when the parameter D is set to 1.

When the user selects the first work mode, the processor can set the parameter C and parameter D to 1 so that the display apparatus currently supports both the VRR function and the FVA function, and set the parameter A and parameter B according to the capability value of the display apparatus. When the user selects the second work mode, the processor can set the parameter C to 1 and the parameter D to 0 so that the display apparatus currently supports the VRR function but not the FVA function, and set the parameter A and parameter B according to the capability value of the display apparatus. When the user selects the third work mode, the processor can set the parameter C to 0 and the parameter D to 1 so that the display apparatus currently does not support the VRR function but supports the FVA function, and meanwhile set the parameter A and parameter B to 0. When the user selects the fourth work mode, the processor can set the parameter C and parameter D to 0 so that the display apparatus currently supports neither the VRR function nor the FVA function, and meanwhile set the parameter A and parameter B to 0.

In some embodiments, after determining the target work mode selected by the user, the processor can detect whether the external device interface is connected with an external device. When the external device is connected with the external device interface (S3103), a voltage change at the external device interface can be triggered, so the display apparatus can determine whether the external device is connected by monitoring the voltage change at the external device interface. For example, the display apparatus may start a signal detection thread for HDMI to detect an incoming call. When an external device is connected, the display apparatus can detect the voltage of 5V provided by the external device, thereby it is determined that the external device is connected. After the external device is connected with the display apparatus, the external device can transmit various signals, such as function parameters (S3104), to the display apparatus.

When detecting that the external device is connected with the external device interface, the display apparatus can perform data transmission with the external device. The display apparatus can receive the media resource data from the external device, and can also receive the function parameters from the external device. The external device can support the VRR function and the FVA function, so as to send the VRR signal and the FVA signal to the display apparatus for normal work. The external device can also send the function parameters to the display apparatus to indicate a currently enabled function of the external device, where the function parameters may include a first function parameter, namely a VRR function parameter (VRR_en), and a second function parameter, namely an FVA function parameter (FVA_Factor_M1). If the value of the VRR function parameter from the external device is 1, it means that the external device currently enables the VRR function. If the value of the FVA function parameter from the external device is greater than 0, it means that the external device currently enables the FVA function. The display apparatus can decide whether to enter the target work mode according to the function parameter from the external device. Specifically, the processor can detect the function parameters (S3105); and if the function parameter conforms to the function parameter rule corresponding to the target work mode, the processor can control the display apparatus to enter the target work mode to enable the corresponding function (S3106).

In some embodiments, when detecting the function parameter, the processor can determine whether the function currently supported by the display apparatus matches with the function enabled by the external device when the user selects the target work mode. If so, the function parameter is determined to conform to the function parameter rule corresponding to the target work mode. In this case, the processor can control the display apparatus to enter the target work mode. Specifically, it may determine whether the function currently supported by the display apparatus matches with the function enabled by the external device by determining whether the VRR function parameter conforms to a preset first function parameter rule and whether the FVA function parameter conforms to a preset second function parameter rule.

In some embodiments of the disclosure, the first function parameter rule is set as: the value of the VRR function parameter is 1; and the second function parameter rule is set as: the value of the FVA function parameter is greater than 0. When the VRR function parameter conforms to the first function parameter rule, it is determined that the external device has enabled the VRR function. When the FVA function parameter conforms to the second function parameter rule, it is determined that the external device has enabled the FVA function.

In some embodiments, the function parameter rule may be set as: the function currently supported by the display apparatus matches with the function enabled by the external device.

In some embodiments, when the target work mode selected by the user is the first work mode, the display apparatus supports both the VRR function and the FVA function. The processor can detect the function parameters sent from the external device to determine whether the display apparatus enters the first work mode.

Figure 32:
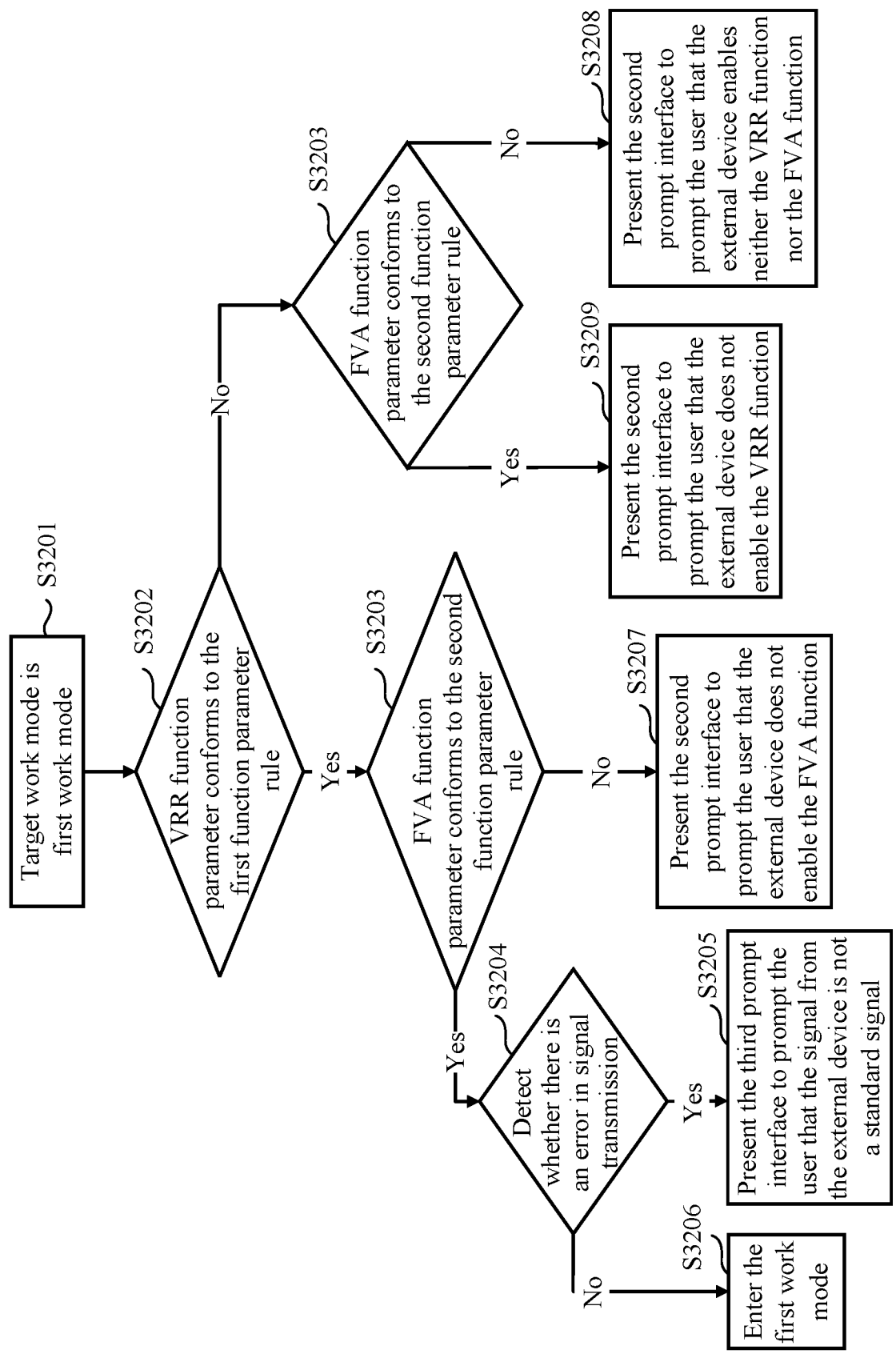
FIG. 32 is a flowchart for determining whether to enter the first work mode according to one or more embodiments of the disclosure.

FIG. 32 is a flowchart for determining whether to enter the first work mode according to one or more embodiments of the disclosure. As shown in FIG. 32, when the display apparatus supports both the VRR function and the FVA function, the external device also enables both the VRR function and the FVA function, indicating that the functions currently supported by the display apparatus match with the functions enabled by the external device. In this case, the display apparatus can work normally when entering the first work mode (S3201). Therefore, the processor can also detect: whether the VRR function parameter conforms to the first function parameter rule (S3202), and whether the FVA function parameter conforms to the second function parameter rule (S3203).

Figure 33:
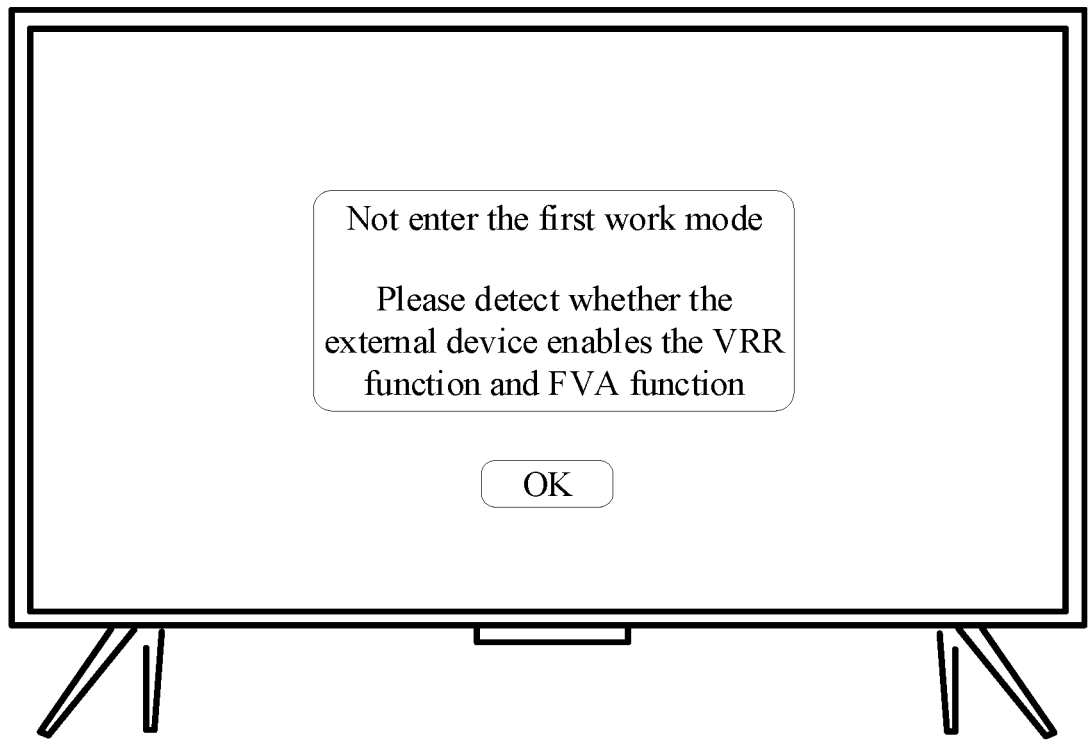
FIG. 33 is a schematic diagram of a second prompt interface according to one or more embodiments of the disclosure.

If any one of the two conditions is not satisfied, meaning that the functions currently supported by the display apparatus do not match with the functions enabled by the external device, the display apparatus cannot work properly. In this case, the display apparatus will not enter the first work mode. Meanwhile the processor can control the display to present a second prompt interface. FIG. 33 is a schematic diagram of a second prompt interface according to one or more embodiments of the disclosure. As shown in FIG. 33, the second prompt interface is used to prompt the user that the display apparatus does not enter the target work mode, that is, the display apparatus does not enter the first work mode, meaning that the external device does not enable the VRR function and/or the FVA function, or the external device does not support the VRR function and/or the FVA function. The user needs to further check the external device and enable the VRR function and FVA function, or replace the external device. The user can also choose to make the display apparatus enter another work mode.

Figure 34:
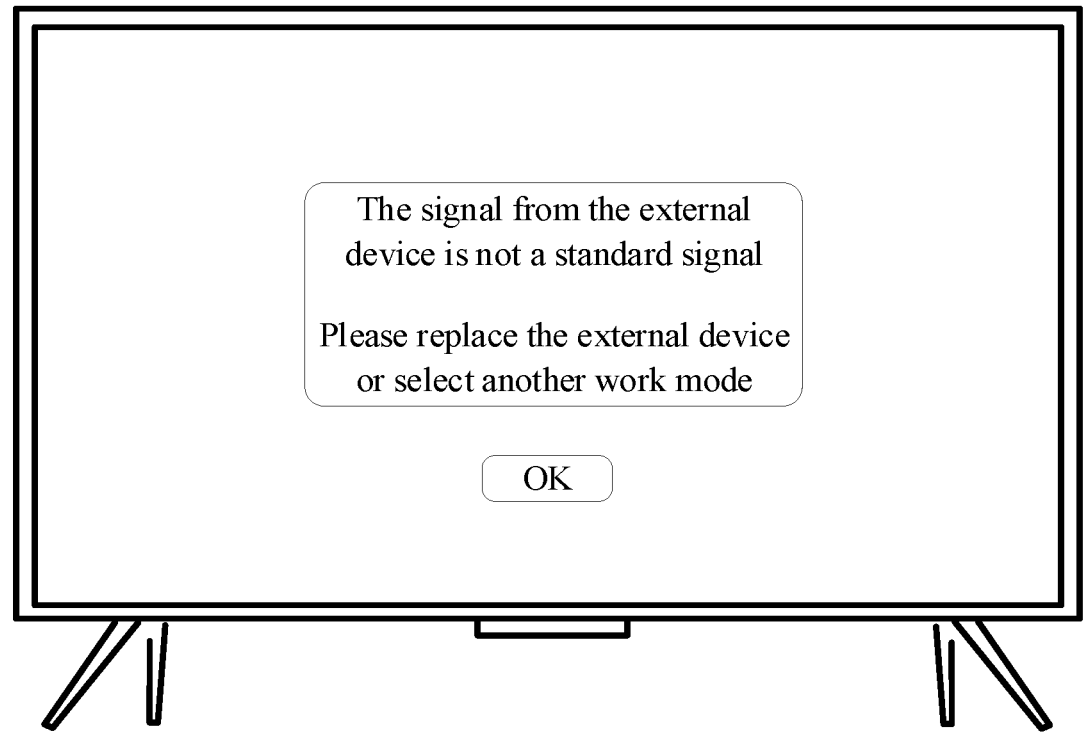
FIG. 34 is a schematic diagram of a third prompt interface according to one or more embodiments of the disclosure.

If both conditions are satisfied, meaning that the functions currently supported by the display apparatus match with the functions enabled by the external device, the display apparatus can work normally. The processor can further detect: whether there is an error in signal transmission (VRR signal and FVA signal) between the external device and the display apparatus (S3204). If there is an error, meaning that the signal from the external device is not a standard signal, the processor can control the display to present a third prompt interface in this case (S3205). FIG. 34 is a schematic diagram of a third prompt interface according to one or more embodiments of the disclosure. As shown in FIG. 34, the third prompt interface is used to prompt the user that the signal from the external device is not a standard signal. In this case, the user needs to replace the external device, or the user can choose to make the display apparatus enter another work mode.

If there is no error, meaning that the external device has sent a standard signal, the processor can control the display apparatus to enter the first work mode in this case (S3206), and the display apparatus will enable the VRR function and the FVA function at the same time. If the FVA function parameter does not conform to the second function parameter rule, the second prompt interface to prompt the user that the external device does not enable the FVA function is presented (S3207), or the second prompt interface for prompting the user that the external device enables neither the VRR function nor the FVA function is presented (S3208). In some embodiments, if the FVA function parameter conforms to the second function parameter rule, the second prompt interface for prompting the user that the external device does not enable the VRR function is presented (S3209).

Figure 35:
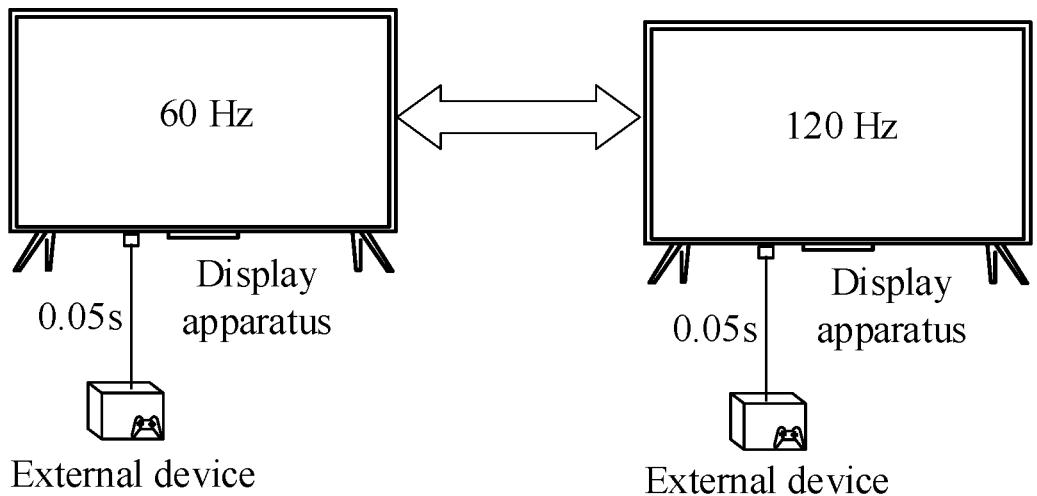
FIG. 35 is a schematic diagram of the display apparatus in the first work mode according to one or more embodiments of the disclosure.

FIG. 35 is a schematic diagram of the display apparatus in the first work mode according to one or more embodiments of the disclosure. As shown in FIG. 35, the display apparatus has enabled the VRR function and the FVA function at the same time, which can effectively prevent screen freezing and tearing and reduce the delay. Here, the refresh rate of the display picture of the display apparatus can be automatically adjusted, for example, from 60 Hz to 120 Hz, so as to adapt to the external device. Meanwhile, the delay between the display apparatus and the external device is relatively low. Assuming that the delay is 0.1 s when the FVA function is not enabled, the delay may be 0.05 s when the display apparatus enters the first work mode, thereby improving the user experience.

In some embodiments, when the target work mode is the first work mode and the functions currently supported by the display apparatus do not match with the functions enabled by the external device, the processor can set the second prompt interface according to the function parameters that do not meet the rules. When the VRR function parameter conforms to the preset rule but the FVA function parameter does not conform to the preset rule, the second prompt interface may prompt the user that the external device does not enable the FVA function. When the VRR function parameter does not conform to the preset rule but the FVA function parameter conforms to the preset rule, the second prompt interface may prompt the user that the external device does not enable the VRR function. When neither the VRR function parameter nor the FVA function parameter conforms to the preset rule, the second prompt interface may prompt the user that the external device enables neither the VRR function nor the FVA function.

In some embodiments, when the target work mode selected by the user is the second work mode, the display apparatus supports the VRR function but does not support the FVA function. The processor can detect the function parameters from the external device to determine whether the display apparatus can enter the second work mode.

Figure 36:
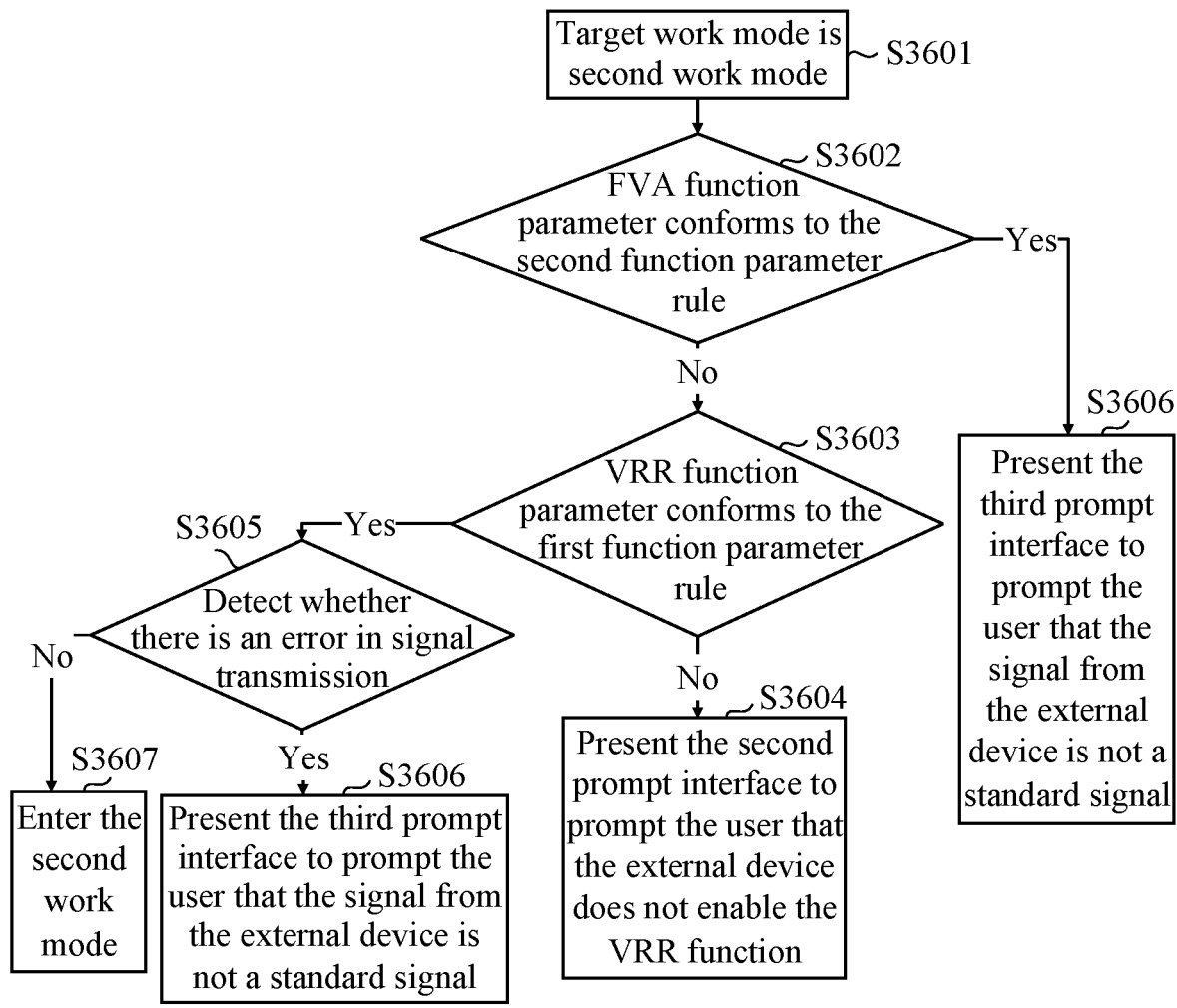
FIG. 36 is a flowchart for determining whether to enter the second work mode according to one or more embodiments of the disclosure.

FIG. 36 is a flowchart for determining whether to enter the second work mode (S3601) according to one or more embodiments of the disclosure. As shown in FIG. 36, when the display apparatus only supports the VRR function, the external device also enables the VRR function and disables the FVA function, meaning that the function currently supported by the display apparatus matches with the function enabled by the external device. In this case, the display apparatus can work normally when entering the second work mode.

Therefore, the processor may firstly detect: whether the FVA function parameter conforms to the second function parameter rule (S3602). Since the external device needs to disable the FVA function when the display apparatus enters the second work mode, the signal from the external device is determined to be not a standard signal as long as the external device enables the FVA function, that is, the FVA function parameter conforms to the preset second function parameter rule. In this case, the functions currently supported by the display apparatus do not match with the functions enabled by the external device, and the display apparatus will not enter the second work mode. Also, the processor can control the display to present a third prompt interface for prompting the user that the signal from the external device is not a standard signal. In this case, the user needs to replace the external device, or the user can choose to make the display apparatus enter another work mode.

If the FVA function parameter does not conform to the second function parameter rule, that is, the external device disables the FVA function, the processor may detect: whether the VRR function parameter conforms to the first function parameter rule (S3603). If the VRR function parameter does not conform to the first function parameter rule, meaning that the external device does not enable the VRR function, the processor controls the display to present the second prompt interface in this case (S3604).

Figure 37:
FIG. 37 is a schematic diagram of a second prompt interface according to one or more embodiments of the disclosure.

FIG. 37 is a schematic diagram of a second prompt interface according to one or more embodiments of the disclosure. As shown in FIG. 37, the second prompt interface is used to prompt the user that the display apparatus does not enter the target work mode, that is, the display apparatus does not enter the second work mode, meaning that the external device does not enable the VRR function, or the external device does not support the VRR function. The user needs to further check the external device and enable the VRR function, or replace the external device. The user can also choose to make the display apparatus enter another work mode. If the VRR function parameter conforms to the first function parameter rule, meaning that the external device has enabled the VRR function, the function currently supported by the display apparatus matches with the function enabled by the external device, and the display apparatus can work normally.

The processor can further detect: whether there is an error in signal transmission (VRR signal) between the external device and the display apparatus (S3605). If there is an error, meaning that the signal from the external device is not a standard signal, the processor can control the display to display a third prompt interface in this case (S3606). If there is no error, meaning that the external device has sent a standard signal, the processor can control the display apparatus to enter the second work mode in this case (S3607), and the display apparatus will enable only the VRR function.

In some embodiments, when the target work mode selected by the user is the third work mode, the display apparatus supports the FVA function but does not support the VRR function. The processor can detect the function parameters from the external device to determine whether the display apparatus can enter the third work mode.

Figure 38:
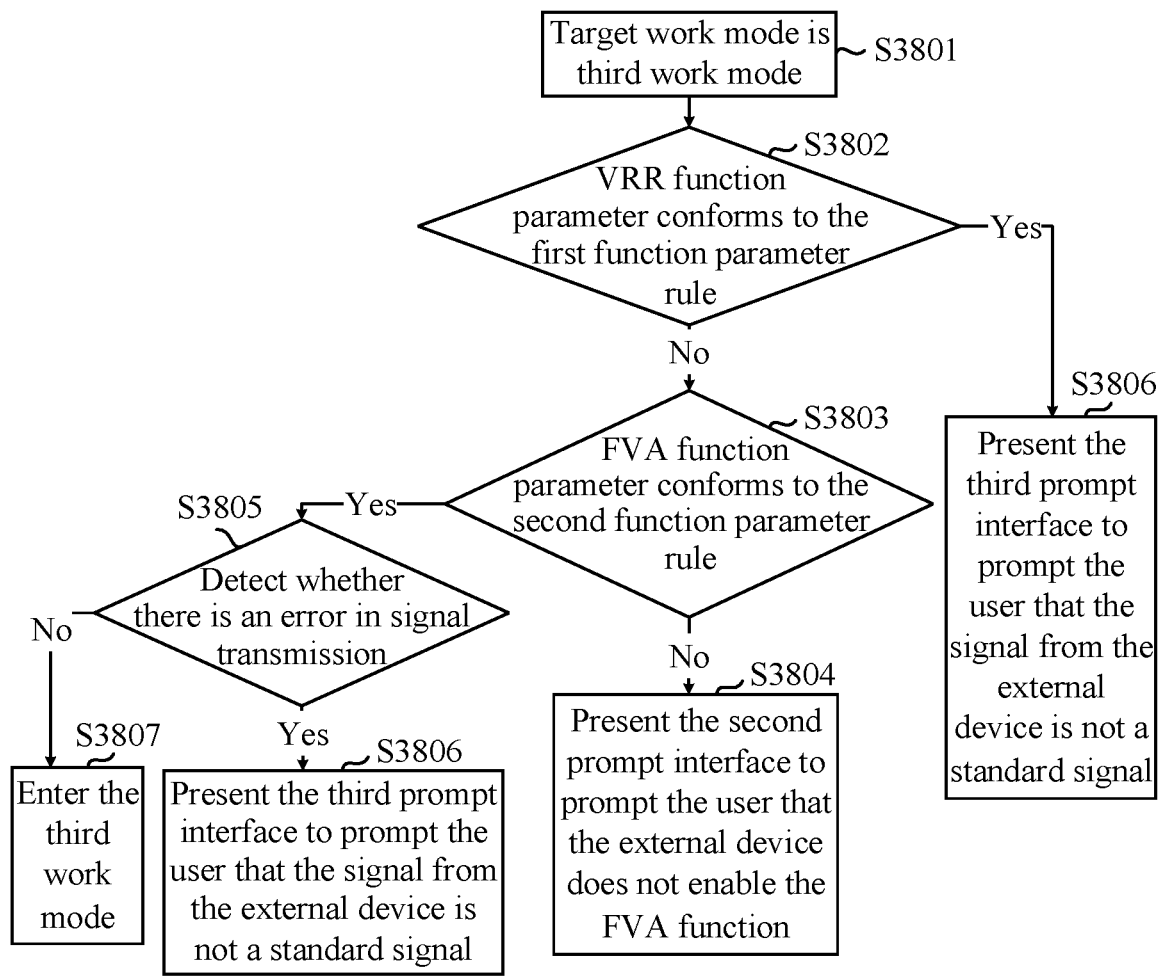
FIG. 38 is a flowchart for determining whether to enter the third work mode according to one or more embodiments of the disclosure.

FIG. 38 is a flowchart for determining whether to enter the third work mode (S3801) according to one or more embodiments of the disclosure. As shown in FIG. 38, when the display apparatus only supports the FVA function, the external device also enables the FVA function and disables the VRR function, meaning that the function currently supported by the display apparatus matches with the function enabled by the external device. In this case, the display apparatus can work normally when entering the third work mode.

Therefore, the processor may firstly detect: whether the VRR function parameter conforms to the first function parameter rule (S3802). Since the external device needs to disable the VRR function when the display apparatus enters the third work mode, the signal from the external device is determined to be not a standard signal as long as the external device enables the VRR function, that is, the VRR function parameter conforms to the preset first function parameter rule. In this case, the functions currently supported by the display apparatus do not match with the functions enabled by the external device, and the display apparatus will not enter the third work mode. Also, the processor can control the display to present a third prompt interface for prompting the user that the signal from the external device is not a standard signal. In this case, the user needs to replace the external device, or the user can choose to make the display apparatus enter another work mode.

If the VRR function parameter does not conform to the first function parameter rule, that is, the external device disables the VRR function, the processor may detect: whether the FVA function parameter conforms to the second function parameter rule (S3803). If not, that is, the FVA function parameter does not conform to the second function parameter rule, meaning that the external device does not enable the FVA function, the processor controls the display to present the second prompt interface in this case (S3804).

Figure 39:
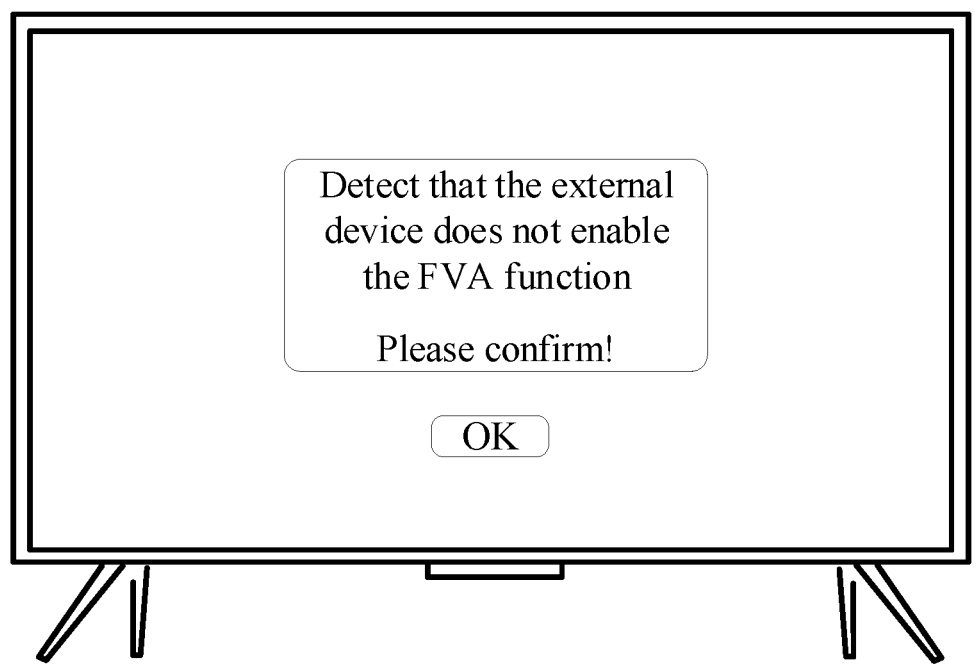
FIG. 39 is a schematic diagram of a second prompt interface according to one or more embodiments of the disclosure.

FIG. 39 is a schematic diagram of a second prompt interface according to one or more embodiments of the disclosure. As shown in FIG. 39, the second prompt interface is used to prompt the user that the display apparatus does not enter the target work mode, that is, the display apparatus does not enter the third work mode, meaning that the external device does not enable the FVA function, or the external device does not support the FVA function. The user needs to further check the external device and enable the FVA function, or replace the external device. The user can also choose to make the display apparatus enter another work mode. If the FVA function parameter conforms to the second function parameter rule, meaning that the external device has enabled the FVA function, the function currently supported by the display apparatus matches with the function enabled by the external device, and the display apparatus can work normally.

The processor can further detect: whether there is an error in signal transmission (FVA signal) between the external device and the display apparatus (S3805). If there is an error, meaning that the signal from the external device is not a standard signal, the processor can control the display to present a third prompt interface in this case (S3806). If there is no error, meaning that the external device has sent a standard signal, the processor can control the display apparatus to enter the third work mode in this case (S3807), and the display apparatus will enable only the FVA function.

In some embodiments, when the target work mode selected by the user is the fourth work mode, the display apparatus supports neither the VRR function nor the FVA function. The processor can detect the function parameters from the external device to determine whether the display apparatus enters the fourth work mode.

Figure 40:
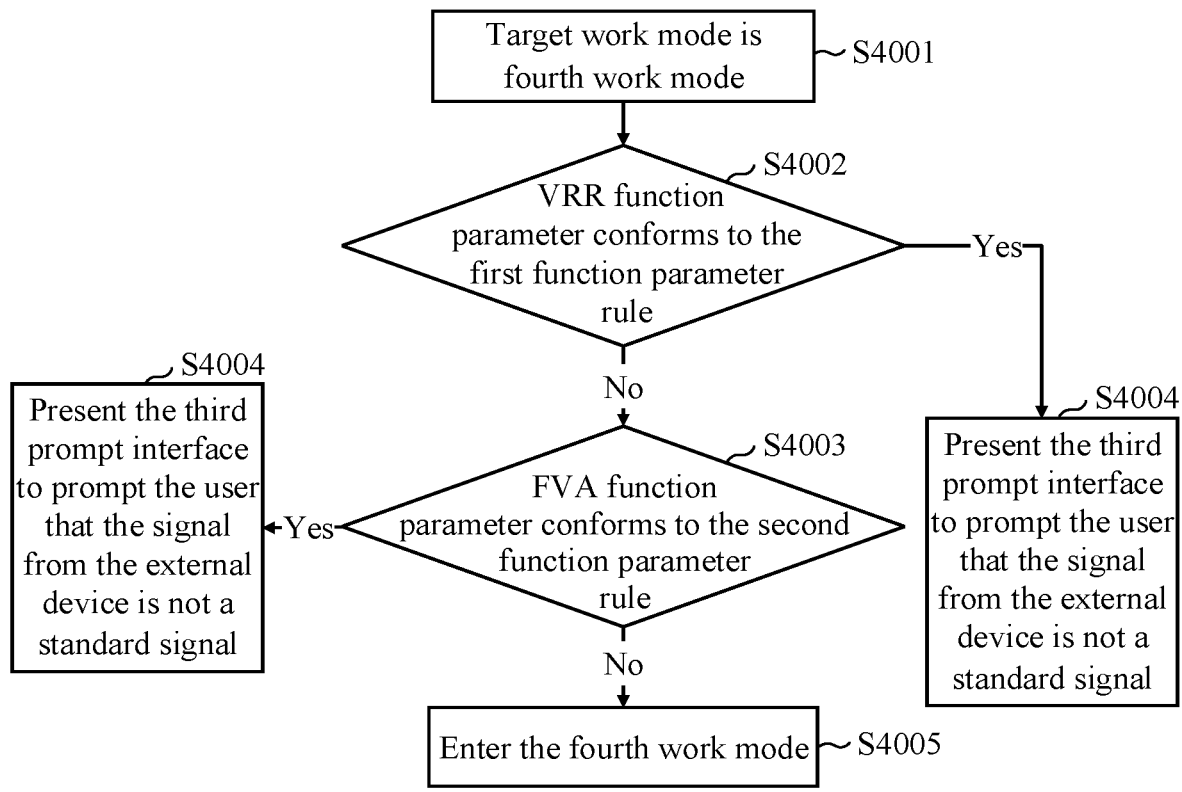
FIG. 40 is a flowchart for determining whether to enter the fourth work mode according to one or more embodiments of the disclosure.

FIG. 40 is a flowchart for determining whether to enter the fourth work mode (S4001) according to one or more embodiments of the disclosure. As shown in FIG. 40, when the display apparatus supports neither the VRR function nor the FVA function, the external device also disables both the VRR function and the FVA function, indicating that the functions currently supported by the display apparatus match with the functions enabled by the external device. In this case, the display apparatus can work normally when entering the fourth work mode.

Figure 41:
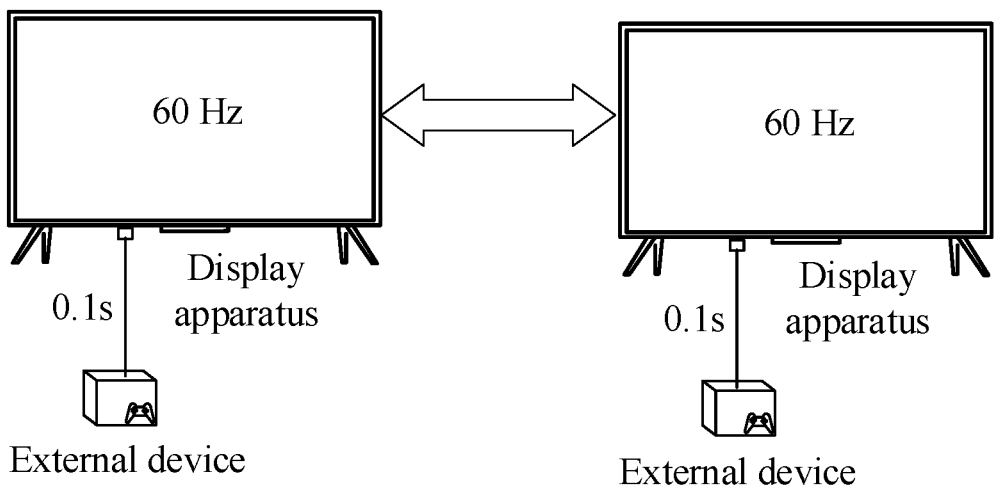
FIG. 41 is a schematic diagram of the display apparatus in the fourth work mode according to one or more embodiments of the disclosure.

Therefore, the processor can simultaneously detect: whether the VRR function parameter conforms to the first function parameter rule (S4002), and whether the FVA function parameter conforms to the second function parameter rule (S4003). If any one of the two conditions is satisfied, meaning that the external device has enabled the VRR function and/or FVA function, the functions currently supported by the display apparatus do not match with the functions enabled by the external device, and the display apparatus cannot work normally. In this case, the display apparatus will not enter the fourth work mode. At the same time, the processor can control the display to present a third prompt interface for prompting the user that the signal from the external device is not a standard signal. In this case (S4004), the user needs to replace the external device, or the user can choose to make the display apparatus enter another work mode. If neither of the two conditions is satisfied, meaning that the functions currently supported by the display apparatus match with the functions enabled by the external device, the display apparatus can work normally. The processor can control the display apparatus to enter the fourth work mode (S4005), and the display apparatus will simultaneously disable the VRR function and the FVA function. FIG. 41 is a schematic diagram of the display apparatus in the fourth work mode according to one or more embodiments of the disclosure. As shown in FIG. 41, the display apparatus disables both the VRR function and the FVA function, and the performance of the display apparatus is relatively low in this case, but the energy consumption can be effectively reduced. Here, the refresh rate of the display picture of the display apparatus cannot be adjusted, and will always remain at 60 Hz. Meanwhile, the display apparatus and the external device always have the initial delay of 0.1 s when transmitting data.

In some embodiments, the user can select the display apparatus to enter a work mode, so that the display apparatus enables different functions to meet the user requirement. The user can also restore the display apparatus to the original work mode, for example, the user can control the display apparatus to restore the factory settings. When receiving a command for restoring the initial work mode of the display apparatus, the processor can detect: whether the current version type of the transmission protocol of the display apparatus is the initial version type, and whether the current on state of the VRR function and the FVA function of the display apparatus is the initial on state. If the two conditions are both met, it means that the current setting of the display apparatus is the initial setting, so the current work mode is the initial work mode of the display apparatus, and then the processor does not need to perform any operation. If any one of the two conditions is not satisfied, it means that the current setting of the display apparatus is not the initial setting. The processor may firstly update the version type of the transmission protocol to the initial version type, and then update the work mode of the display apparatus to the initial work mode.

In some embodiments, after updating the version type of the transmission protocol to the initial version type, the processor may also update the work mode of the display apparatus according to the initial version type. If the initial version type is the second type of version, i.e., HDMI enhanced version (HDMI 2.0 and HDMI 2.1), the processor needs to determine the initial work mode of the display apparatus in this case, and update the work mode to the initial work mode. If the initial version type is the second type of version, i.e., HDMI standard version, the initial transmission protocol of the display apparatus does not support the VRR function and the FVA function, so the initial work mode can only be the fourth work mode (disable the VRR function and the FVA function). In this case, the processor may directly update the work mode of the display apparatus to the fourth work mode. When the user selects a work mode, the disclosure can detect the function parameter from the external device, and determine whether the function currently supported by the display apparatus matches with the function enabled by the external device, so as to determine whether the display apparatus can enter the work mode selected by the user. When the function parameter conforms to the function parameter rule corresponding to the target work mode, the display apparatus can enter the target work mode, thereby ensuring that the display apparatus can work normally without abnormality, and improving the user experience.

Some embodiments of the disclosure further provide a work mode setting method of a display apparatus, including: determining a target work mode selected by a user in response to a command for selecting a work mode from the user; receiving a function parameter from an external device when detecting that an external device interface is connected with the external device, where the function parameter includes a parameter of a function supported by the external device; and detecting the function parameter, and controlling the display apparatus to enter the target work mode if the function parameter conforms to a function parameter rule corresponding to the target work mode.

In some embodiments, before performing determining the target work mode selected by the user, the method further includes: controlling the display to present a work mode interface in response to a query command for querying a work mode from the user, to cause the user to set the work mode of the display apparatus, where the work mode interface includes a current work mode of the display apparatus and all work modes supported by the display apparatus; and determining the target work mode selected by the user when detecting an operation from the user on the work mode interface.

In some embodiments, before controlling the display to present the work mode interface, the method further includes: obtaining a version type of a transmission protocol of the display apparatus; controlling the display to present the work mode interface if the transmission protocol is a first-type version; and controlling the display to present a first prompt interface if the transmission protocol is a second-type version, where the first prompt interface is used to prompt the user that the display apparatus currently does not support a first function and a second function to cause the user to switch the transmission protocol.

In some embodiments, the target work mode is a first work mode; when the display apparatus is in the first work mode, a first function and a second function are enabled; the function parameter includes a first function parameter and a second function parameter; and the step of detecting the function parameter includes: detecting both of whether the first function parameter conforms to a preset first function parameter rule and whether the second function parameter conforms to a preset second function parameter rule; if not both are satisfied, then controlling the display to present a second prompt interface, which is used to prompt the user that the display apparatus does not enter the first work mode, to cause the user to detect whether the external device enables the first function and the second function; if both are satisfied, then detecting whether there is an error in signal transmission between the external device and the display apparatus; if so, then controlling the display to present a third prompt interface, which is used to prompt the user that a signal from the external device is not a standard signal; if not, then controlling the display apparatus to enter the first work mode.

In some embodiments, the target work mode is a second work mode; when the display apparatus is in the second work mode, a first function is enabled and a second function is disabled; the function parameter includes a first function parameter and a second function parameter; and the step of detecting the function parameter includes: detecting whether the second function parameter conforms to a preset second function parameter rule; if so, then controlling the display to present a third prompt interface, which is used to prompt the user that a signal from the external device is not a standard signal; if not, then detecting whether the first function parameter conforms to a preset first function parameter rule; if not, then controlling the display to display a second prompt interface, which is used to prompt the user that the display apparatus does not enter the second work mode, to cause the user to detect whether the external device enables the first function: if so, then detecting whether there is an error in signal transmission between the external device and the display apparatus; if so, then controlling the display to display the third prompt interface; if not, then controlling the display apparatus to enter the second work mode.

In some embodiments, the target work mode is a third work mode; when the display apparatus is in the third work mode, a first function is disabled and a second function is enabled; the function parameter includes a first function parameter and a second function parameter; and the step of detecting the function parameter includes: detecting whether the first function parameter conforms to a preset first function parameter rule; if so, then controlling the display to present a third prompt interface, which is used to prompt the user that a signal from the external device is not a standard signal; if not, then detecting whether the second function parameter conforms to a preset second function parameter rule; if not, then controlling the display to display a second prompt interface, which is used to prompt the user that the display apparatus does not enter the third work mode, to cause the user to detect whether the external device enables the second function: if so, then detecting whether there is an error in signal transmission between the external device and the display apparatus; if so, then controlling the display to present the third prompt interface; if not, then controlling the display apparatus to enter the third work mode.

In some embodiments, the target work mode is a fourth work mode; when the display apparatus is in the fourth work mode, a first function and a second function are both disabled; the function parameter includes a first function parameter and a second function parameter; and the step of detecting the function parameter includes detecting at least one of whether the first function parameter conforms to a preset first function parameter rule and whether the second function parameter conforms to a preset second function parameter rule; if so, then controlling the display to display a third prompt interface, which is used to prompt the user that a signal from the external device is not a standard signal; if not, then controlling the display apparatus to enter the fourth work mode.

In some embodiments, the method further includes: detecting whether a current version type of the transmission protocol of the display apparatus is an initial version type, and whether current enabled states of the first function and the second function of the display apparatus are initial enabled states, in response to a command for restoring an initial work mode of the display apparatus from the user; if both are satisfied, performing no operation; if not both are satisfied, switching the work mode of the display apparatus to the initial work mode.

For the convenience of explanation, the above description has been made in conjunction with specific embodiments. However, the above discussion in some embodiments is not intended to be exhaustive or to limit the embodiments to the specific forms disclosed above. Numerous modifications and variations can be obtained in light of the above teachings.

What is claimed is:
1. A display apparatus, comprising:
a display, configured for presenting one or more images from a broadcast system or network and/or one or more user interfaces;
an external device interface, configured to connect with an external device;
a memory, configured to store instructions and data associated with the display; and
a processor, in connection with the display, the external device interface and the memory, and configured for executing the instructions to cause the display apparatus to perform:
obtaining device information of an external device in connection with the display apparatus;
parsing a variable frame rate mode supported by the external device from the device information by traversing a flag bit field in the device information;
controlling the display to present an interactive menu, and receiving an interactive operation from a user through the interactive menu, wherein the interactive menu comprises at least one option of variable frame rate modes;
setting a display parameter of the display apparatus according to a first variable frame rate mode indicated by the interaction operation;
reading the first variable frame rate mode indicated by the interaction operation;
in response to the first variable frame rate mode being VRR standard mode, switching a signal lock mechanism and a decoding mode to adapt to a short-period video signal; and
in response to the first variable frame rate mode being free sync mode, obtaining a real-time frame rate value and presenting a video signal according to the real-time frame rate value.
2. The display apparatus according to claim 1, wherein the processor is further configured for executing the instructions to cause the display apparatus to perform:
traversing a quantity of variable frame rate modes supported by the external device;

in response to the quantity of variable frame rate modes being greater than or equal to 1, adding options of the variable frame rate modes supported by the external device on the interactive menu; and in response to the quantity of variable frame rate modes being equal to 0, adding a prompt text on the interactive menu.

3. The display apparatus according to claim 1, wherein the device information includes a first package data and a second package data, and the processor is further configured for executing the instructions to cause the display apparatus to perform:

under condition that the quantity of variable frame rate modes is equal to 1, obtaining a traversal result of the traversing the flag bit field in the device information;

in response to a flag bit of the first package data containing a feature field for describing the VRR standard mode, adding VRR standard option on the interactive menu; and in response to a flag bit of the second package data containing a feature field for describing the free sync mode, adding free sync option on the interaction menu.

4. The display apparatus according to claim 1, wherein the processor is further configured for executing the instructions to cause the display apparatus to perform:

in response to the first variable frame rate mode being VRR standard mode, turning off a high-delay picture quality processing function in the display apparatus; and in response to the first variable frame rate mode being free sync mode, turning off a frame buffer mechanism of a video picture, to reduce sending and receiving delays of a video signal.

5. The display apparatus according to claim 4, wherein the processor is further configured for executing the instructions to cause the display apparatus to perform:

in response to the first variable frame rate mode being free sync mode, turning off a dynamic backlight function; and adjusting a backlight brightness of the display to a highest state to improve performance effect of high dynamic range imaging (HDR) on the display apparatus.

6. The display apparatus according to claim 1, wherein the processor is further configured for executing the instructions to cause the display apparatus to perform:

detecting a switch state of a variable frame rate included in the interactive menu;

in response to the switch state being on state, receiving the interactive operation from the user through the interactive menu; and in response to the switch state being off state, controlling the display to present the interaction menu to receive an action for turning on the switch state of the variable frame rate.

7. The display apparatus according to claim 1, wherein the processor is further configured for executing the instructions to cause the display apparatus to perform:

sending identification data to the external device, wherein the identification data comprises a field for describing one or more variable frame rate modes supported by the display apparatus;

receiving a response data packet for the identification data from the external device to obtain a current variable frame rate mode of the external device; and setting a display parameter of the display apparatus according to the current variable frame rate mode of the external device.

8. The display apparatus according to claim 7, wherein the processor is further configured for executing the instructions to cause the display apparatus to perform:

obtaining a variable frame rate mode supported by the display apparatus when the external device establishes a connection with the display apparatus for the first time;

in response to the display apparatus supporting the VRR standard mode, configuring a field for describing the VRR standard mode in a first flag bit of the identification data; and in response to the display apparatus supporting the free sync mode, configuring a field for describing the free sync mode in a second flag bit of the identification data.

9. The display apparatus according to claim 7, wherein the processor is further configured for executing the instructions to cause the display apparatus to perform:

in response to detecting that a running state of the external device meets a key time point, adjusting the display parameter in time to adapt to a changed variable frame rate mode, wherein the key time point comprises at least one of: a time point when the external device establishes connection with the display apparatus for the first time, a time point when a content from a media resource of the external device is changed, or a time point when the external device changes the variable frame rate mode.

10. A method for a display apparatus, comprising:

obtaining device information of an external device in connection with the display apparatus via an external device interface of the display apparatus;

parsing a variable frame rate mode supported by the external device from the device information by traversing a flag bit field in the device information;

controlling a display of the display apparatus to present an interactive menu, and receiving an interactive operation from a user through the interactive menu, wherein the interactive menu comprises at least one option of variable frame rate modes;

setting a display parameter of the display apparatus according to a first variable frame rate mode indicated by the interaction operation;

reading the first variable frame rate mode indicated by the interaction operation;

in response to the first variable frame rate mode being VRR standard mode, switching a signal lock mechanism and a decoding mode to adapt to a short-period video signal; and in response to the first variable frame rate mode being free sync mode, obtaining a real-time frame rate value and presenting a video signal according to the real-time frame rate value.

11. The method according to claim 10, further comprising:

traversing a quantity of variable frame rate modes supported by the external device;

in response to the quantity of variable frame rate modes being greater than or equal to 1, adding options of the variable frame rate modes supported by the external device on the interactive menu; and in response to the quantity of variable frame rate modes being equal to 0, adding a prompt text on the interactive menu.

12. The method according to claim 10, wherein the device information includes a first package data and a second package data, and the method further comprises:

under condition that the quantity of variable frame rate modes is equal to 1, obtaining a traversal result of the traversing the flag bit field in the device information;

in response to a flag bit of the first package data containing a feature field for describing the VRR standard mode, adding VRR standard option on the interactive menu; and in response to a flag bit of the second package data containing a feature field for describing the free sync mode, adding free sync option on the interaction menu.

13. The method according to claim 10, further comprising:

in response to the first variable frame rate mode being VRR standard mode, turning off a high-delay picture quality processing function in the display apparatus; and in response to the first variable frame rate mode being free sync mode, turning off a frame buffer mechanism of a video picture, to reduce sending and receiving delays of a video signal.

14. The method according to claim 13, further comprising:

in response to the first variable frame rate mode being free sync mode, turning off a dynamic backlight function; and adjusting a backlight brightness of the display to a highest state to improve performance effect of high dynamic range imaging (HDR) on the display apparatus.

15. The method according to claim 10, further comprising:

detecting a switch state of a variable frame rate included in the interactive menu;

in response to the switch state being on state, receiving the interactive operation from the user through the interactive menu; and in response to the switch state being off state, controlling the display to present the interaction menu to receive an action for turning on the switch state of the variable frame rate.

16. The method according to claim 10, further comprising:

sending identification data to the external device, wherein the identification data comprises a field for describing one or more variable frame rate modes supported by the display apparatus;

receiving a response data packet for the identification data from the external device to obtain a current variable frame rate mode of the external device; and setting a display parameter of the display apparatus according to the current variable frame rate mode of the external device.

17. The method according to claim 16, further comprising:

obtaining a variable frame rate mode supported by the display apparatus when the external device establishes a connection with the display apparatus for the first time;

in response to the display apparatus supporting the VRR standard mode, configuring a field for describing the VRR standard mode in a first flag bit of the identification data; and in response to the display apparatus supporting the free sync mode, configuring a field for describing the free sync mode in a second flag bit of the identification data.

18. The method according to claim 16, further comprising:

in response to detecting that a running state of the external device meets a key time point, adjusting the display parameter in time to adapt to a changed variable frame rate mode, wherein the key time point comprises at least one of: a time point when the external device establishes connection with the display apparatus for the first time, a time point when a content from a media resource of the external device is changed, or a time point when the external device changes the variable frame rate mode.

* * * * *